US012563557B2

(12) United States Patent
Yamamoto

(10) Patent No.: US 12,563,557 B2
(45) Date of Patent: Feb. 24, 2026

(54) TERMINAL, BASE STATION, AND COMMUNICATION METHOD

(71) Applicant: Panasonic Intellectual Property Corporation of America, Torrance, CA (US)

(72) Inventor: Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 373 days.

(21) Appl. No.: 18/248,034

(22) PCT Filed: Jul. 2, 2021

(86) PCT No.: PCT/JP2021/025199
§ 371 (c)(1),
(2) Date: Apr. 5, 2023

(87) PCT Pub. No.: WO2022/074884
PCT Pub. Date: Apr. 14, 2022

(65) Prior Publication Data
US 2023/0371029 A1 Nov. 16, 2023

(30) Foreign Application Priority Data

Oct. 9, 2020 (JP) ................................. 2020-171394

(51) Int. Cl.
*H04W 72/20* (2023.01)
*H04W 72/0446* (2023.01)
*H04W 72/21* (2023.01)

(52) U.S. Cl.
CPC ....... *H04W 72/21* (2023.01); *H04W 72/0446* (2013.01)

(58) Field of Classification Search
CPC ........... H04B 7/24; H04B 7/26; H04L 1/1664; H04L 1/1861; H04L 1/189; H04L 1/1893;
(Continued)

(56) References Cited

U.S. PATENT DOCUMENTS 12,022,468 B2 * 6/2024 Yoshioka .......... H04W 72/1268
2016/0309510 A1 10/2016 Wong et al.
(Continued)

FOREIGN PATENT DOCUMENTS

JP 2018514163 A 5/2018
WO WO 2020065740 A1 4/2020

OTHER PUBLICATIONS

Moderator (Apple Inc.), Summary of Email discussion [100b-e-NR-L1enh-URLLC-PUSCH-02] on PUSCH enhancements for NR eURLLC (AI 7.2.5.3), 3GPP TSG-RAN WG1 Meeting #100bis-e, R1-2003004, 34 pages, Apr. 20 to Apr. 30, 2020.*
(Continued)

*Primary Examiner* — Frank Duong
(74) *Attorney, Agent, or Firm* — Seed Intellectual Property Law Group LLP

(57) ABSTRACT

This terminal comprises: a control unit which determines, on the basis of the unit of a second symbol in which a plurality of first symbols in at least one of uplink first channel and second channel are associated with one unit, whether to transmit uplink control information on any one of the first channel and the second channel; and a transmission circuit which transmits the uplink control information, by using the determined channel.

9 Claims, 33 Drawing Sheets

(58) Field of Classification Search

CPC ................. H04L 5/0051; H04L 5/0055; H04L 5/0053; H04L 27/26; H04W 72/21; H04W 72/0446

See application file for complete search history.

(56) References Cited

U.S. PATENT DOCUMENTS

| | | | | |
|---|---|---|---|---|
| 2019/0230683 A1* | 7/2019 | Akkarakaran | ........ | H04L 5/0053 |
| 2019/0306922 A1* | 10/2019 | Xiong | ................... | H04W 72/21 |
| 2020/0404651 A1* | 12/2020 | Takeda | .................. | H04L 5/0094 |
| 2021/0258993 A1* | 8/2021 | Takeda | .................. | H04W 76/27 |
| 2022/0053483 A1 | 2/2022 | Yoshioka et al. | | |
| 2023/0118930 A1* | 4/2023 | Zhang | .................. | H04L 1/1671 |
| | | | | 370/329 |

OTHER PUBLICATIONS

Panasonic, Remaining issues on URLLC PUSCH enhancement, TSG RAN WG1 #101-e, R1-2003815, 2 pages, May 25 to Jun. 5, 2020.*

3GPP, "3rd Generation Partnership Project; Technical Specification Group Radio Access Network; NR; Base Station (BS) radio transmission and reception (Release 16)," 3GPP TS 38.104 v16.3.0, Mar. 2020. (258 pages).

3GPP, "3rd Generation Partnership Project; Technical Specification Group Radio Access Network; NR; Multiplexing and channel coding (Release 15)," 3GPP TS 38.212 v15.10.0, Sep. 2020. (101 pages).

3GPP, "3rd Generation Partnership Project; Technical Specification Group Radio Access Network; NR; NR and NG-RAN Overall Description; Stage 2 (Release 15)," 3GPP TS 38.300 v15.6.0, Jun. 2019. (99 pages).

3GPP, "3rd Generation Partnership Project; Technical Specification Group Radio Access Network; NR; Physical channels and modulation (Release 15)," 3GPP TS 38.211 v15.6.0, Jun. 2019. (97 pages).

3GPP, "3rd Generation Partnership Project; Technical Specification Group Radio Access Network; NR; Physical channels and modulation (Release 15)," 3GPP TS 38.211 v15.8.0, Dec. 2019. (97 pages).

3GPP, "3rd Generation Partnership Project; Technical Specification Group Radio Access Network; NR; Physical layer procedures for control (Release 15)," 3GPP TS 38.213 v15.11.0, Sep. 2020. (109 pages).

3GPP, "3rd Generation Partnership Project; Technical Specification Group Radio Access Network; NR; Physical layer procedures for data (Release 15)," 3GPP TS 38.214 v15.11.0, Sep. 2020. (106 pages).

3GPP, "3rd Generation Partnership Project; Technical Specification Group Radio Access Network; NR; Physical layer procedures for data (Release 16)," 3GPP TS 38.214 v16.3.0, Sep. 2020. (166 pages).

3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).

China Telecom, "New SID on NR coverage enhancement," RP-193240, Agenda Item: 9.1.1, 3GPP TSG RAN Meeting #86, Sitges, Spain, Dec. 9-12, 2019. (4 pages).

International Search Report, mailed Sep. 21, 2021, for International Patent Application No. PCT/JP2021/025199. (6 pages) (with English Translation).

International Telecommunication Union, "IMT Vision—Framework and overall objectives of the future development of IMT for 2020 and beyond; M Series; Mobile, radiodetermination, amateur and related satellite services," Recommendation ITU-RM.2083-0, Sep. 2015. (21 pages).

Panasonic, "Baseline coverage performance analysis in FR1," R1-2006990, Agenda Item: 8.8.1.1, 3GPP TSG RAN WG1 #102-e, e-Meeting, Aug. 17-29, 2020. (9 pages).

Panasonic, "Discussion on PUCCH coverage enhancements," R1-2006349, Agenda Item: 8.8.2.2, 3GPP TSG RAN WG1 #102-e, e-Meeting, Aug. 17-29, 2020. (3 pages).

Panasonic, "Discussion on PUSCH coverage enhancements," R1-2006348, Agenda Item: 8.8.2.1, 3GPP TSG RAN WG1 #102-e, e-Meeting, Aug. 17-29, 2020. (4 pages).

* cited by examiner

100

200

1

TERMINAL, BASE STATION, AND COMMUNICATION METHOD

TECHNICAL FIELD

The present disclosure relates to a terminal, a base station, and a communication method.

BACKGROUND ART

In recent years, a dramatic development of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G), which have been undergoing research and development and standardization, can flexibly provide radio communication in response to a wide variety of needs by enhanced mobile broadband (eMBB), massive machine type communication (MTC), and ultra reliable and low latency communication (URLLC).

The 3rd Generation Partnership Project (3GPP) as an international standardizing body has been specifying New Radio (NR) as one of 5G radio interfaces.

CITATION LIST

Non-Patent Literature

NPL 1
3GPP TS38.104 V16.3.0, "NR Base Station (BS) radio transmission and reception (Release 15)," 2020-09.
NPL 2
RP-193240, "New SID on NR coverage enhancement," China Telecom, December 2019.
NPL 3
3GPP TS 38.211 V15.8.0, "NR; Physical channels and modulation (Release 15)," 2019-12.
NPL 4
3GPP TS 38.212 V15.10.0, "NR; Multiplexing and channel coding (Release 15)," 2020-09.
NPL 5
3GPP TS 38.213 V15.11.0, "NR; Physical layer procedure for control (Release 15)," 2020-09.
NPL 6
3GPP TS 38.214 V15.11.0, "NR; Physical layer procedures for data (Release 15)," 2020-09.
NPL 7
3GPP TS 38.214 V16.3.0, "NR; Physical layer procedures for data (Release 16)," 2020-09.
NPL 8
R1-2006348, "Discussion on PUTSCH coverage enhancements," Panasonic, August 2020.
NPL 9
R1-2006990, "Baseline coverage performance analysis in FR1," Panasonic, August 2020.

SUMMARY OF INVENTION

However, there is scope for further study on a method for enhancing uplink transmission efficiency in radio communication.

One non-limiting and exemplary embodiment facilitates providing a terminal, a base station, and a communication method each capable of enhancing uplink transmission efficiency in radio communication.

A terminal according to an exemplary embodiment of the present disclosure includes: control circuitry, which, in operation, determines via which of a first channel or a second channel uplink control information is transmitted, based on a unit of a certain symbol associated with a plurality of first symbols in at least one of the first channel and/or the second channel in uplink as a single unit, the certain symbol being referred to as a second symbol and transmission circuitry, which, in operation, performs transmission of the uplink control information using the determined channel.

It should be noted that general or specific embodiment may be implemented as a system, a method, an integrated circuit, a computer program, a storage medium, or any selective combination thereof.

According to an exemplary embodiment of the present disclosure, it is possible to enhance uplink transmission efficiency in radio communication.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings.

In NR, for example, in addition to a frequency band of 6 GHz or less, mainly within 700 MHz to 3.5 GHz band (e.g., may be referred to as Frequency Range 1 (FR1)), which has been used for cellular communication, a millimeter-wave band such as 28 GHz or 39 GHz band capable of ensuring a wide hand (e.g., may be referred to as FR2) can be utilized (e.g., see Non-Patent Literature (hereinafter referred to as "NPL") 1). Further, for example, in FR1, a high frequency band is possibly used compared with the frequency hand used in Long Term Evolution (LTE) or 3rd Generation mobile communication systems (3G) such as 3.5 GHz band. The higher the frequency band is, the greater a radio wave propagation loss is, and thus, the received quality of radio waves is likely to be deteriorated. Hence, in NR, for example, a method has been studied for ensuring almost the same communication area (or coverage) as to the Radio Access Technology (RAT) such LTE or 3G, in other words, ensuring the appropriate communication when the frequency band higher than that in LTE or 3G is used (e.g., see NPL 2).

[Time Domain Resource]

Figure 1:
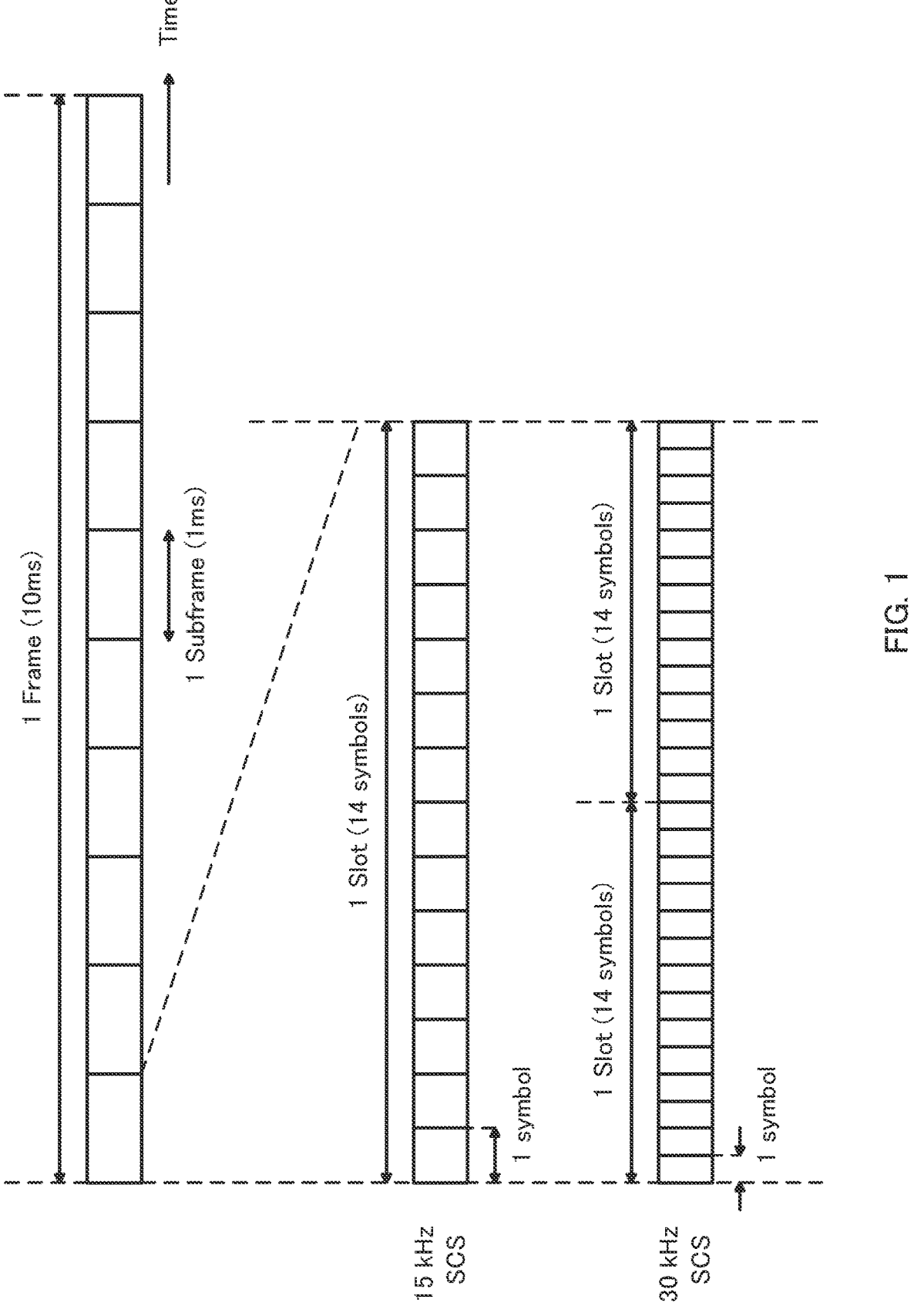
FIG. 1 illustrates a configuration example of a time domain resource.

In NR, a time domain resource such as a slot, a subframe, and a frame may be composed of, for example, time-resource units such as a plurality of Orthogonal Frequency Division Multiplexing (OFDM) symbols. For example, a slot may be composed of a plurality of OFDM symbols (e.g., 14 for Normal cyclic prefix (CP)) regardless of Subcarrier Spacing (SCS), a subframe is defined as a duration of 1 ms, and a frame may be defined by 10 subframes (e.g., see NPL 3). FIG. 1 illustrates configuration an example of a time domain resource such as a symbol (e.g., OFDM symbol), a slot, a subframe, and a frame. As an example, FIG. 1 illustrates a configuration example when the sub-carrier spacing (SCS) is 15 kHz and 30 kHz.

Further, in NR, for example, a terminal (e.g., may be also referred to as User Equipment (UE)) transmits and receives data in accordance with resource allocation indicated by a layer-1 control signal (e.g., Downlink Control Information: DCI) in a downlink control channel (e.g., Physical Down-link Control Channel: PDCCH) from a base station (e.g., may be also referred to as gNB) (e.g., see NPLs 4 to 6).

For example, the terminal may feed back, to the base station, for example, a response signal (e.g., Acknowledgement/Negative Acknowledgement (ACK/NACK) or Hybrid Automatic Repeat Request (HARQ)-ACK) indicating success or failure of decoding for a downlink data channel (e.g., Physical Downlink Shared Channel (PDSCH)) by using, for example, an uplink control channel (e.g., Physical Uplink Control Channel (PUCCH)) (e.g., see NPL 5).

Further, the terminal may use, for example, PUCCH to transmit, in addition to ACK/NACK, downlink channel state information (e.g., Channel State Information (CSI)) and uplink radio resource allocation request (e.g., Scheduling Request (SR)) to the base station. ACK/NACK, CSI, and SR may be also referred to as uplink control information (e.g., Uplink Control Information (UCI)).

Further, for example, when transmitting ACK/NACK for PDSCH assigned by DCI, the terminal may transmit PUCCH including ACK/NACK in accordance with resource allocation indicated by DCI from the base station.

Here, with respect to a PUCCH assignment, the control information included in DCI may include, for example, information on a PUCCH resource. The PUCCH resource may be configured with, for example, a plurality of parameters. Of the parameters configuring the PUCCH resource, the time domain resource information may be, for example, information on a starting symbol position of PUCCH in a slot and on the number of symbols in which PUCCH is transmitted. Moreover, the control information included in DCI may include information on a timing, e.g., how many slots later PUCCH is transmitted since the slot in which PDSCH has been received.

Further, with respect to CSI or SR, a PUCCH resource may be designated (in other words, configured, indicated, or instructed) from the base station by, for example, a higher layer signal (may be also referred to as radio resource control (RRC) signal, higher layer signaling, or higher layer parameter).

Figure 2:
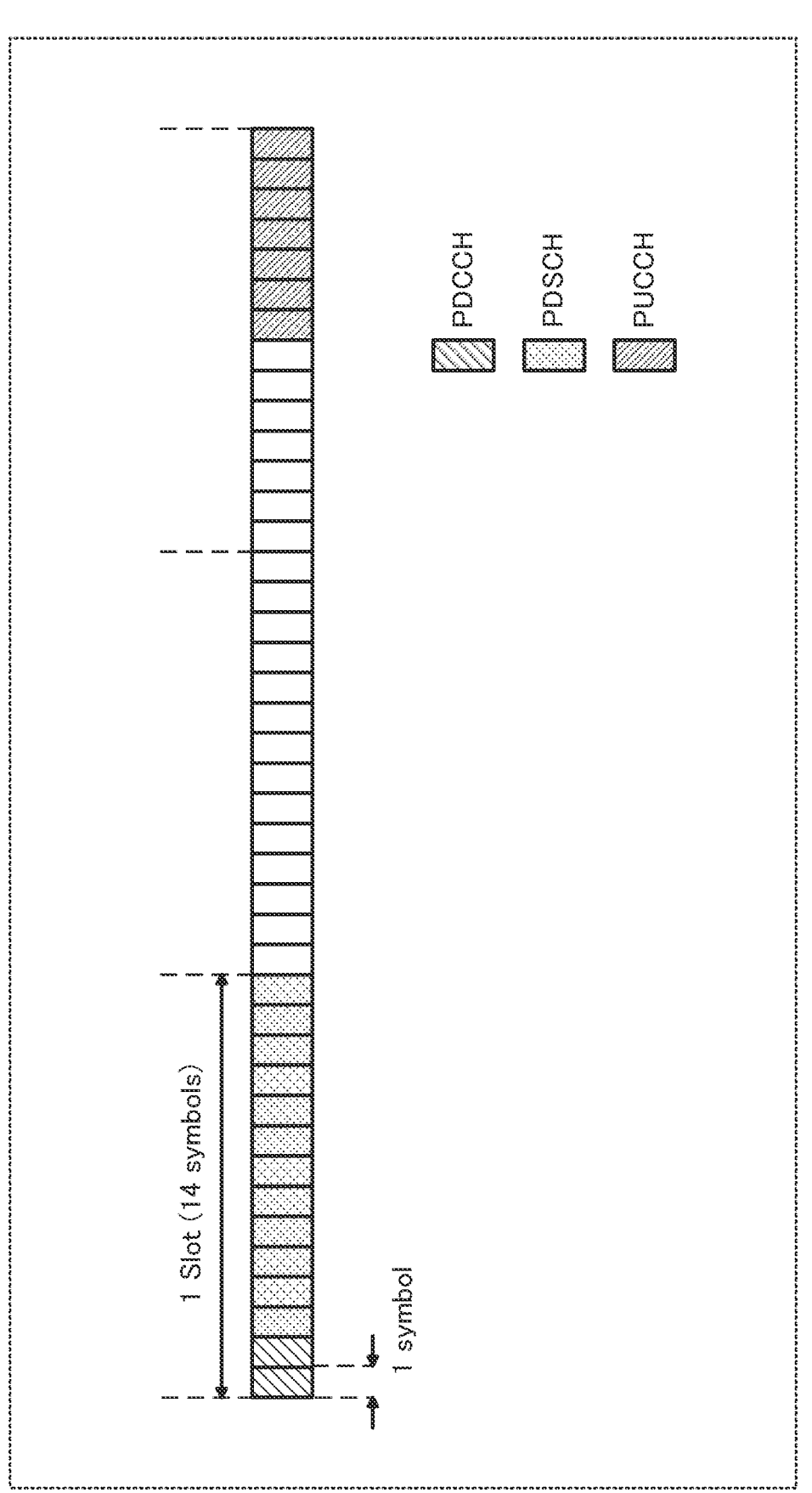
FIG. 2 illustrates a transmission example of downlink data.

FIG. 2 illustrates an allocation example of a time domain resource for PDCCH, PDSCH, and PUCCH in downlink data transmission. In FIG. 2, for example, 14 symbols in a slot may be denoted by the 0th to the 13th symbol numbers (e.g., symbols #0 to #13). In FIG. 2, for example, PDSCH is transmitted in 12 symbols from the third symbol (e.g., symbols #2 to #13), in the slot after 0 slots from the slot in which the terminal has received PDCCH (i.e., slot in which PDCCH has been received). Further, FIG. 2, for example, PUCCH is transmitted in 7 symbols from the eighth symbol (e.g., symbols #7 to #13), in the slot after 2 slots from the slot in which the terminal has received PDSCH.

Besides, for example, in uplink, the terminal may transmit an uplink data channel (e.g., Physical Uplink Shared Channel: PUSCH) according to resource allocation (e.g., Grant) indicated by DCI in PDCCH from the base station (e.g., see NPLs 4 to 6).

Here, with respect to the assignment of PDSCH, the control information included in DCI may include, for example, information on a time domain resource in which PUSCH is transmitted. The time domain resource information may be, for example, information on a timing, e.g., how many slots later the terminal transmits PUSCH since the slot where the terminal has received PDCCH, a starting symbol position PUSCH in a slot, or the number of symbols in which PUSCH is transmitted.

Figure 3:
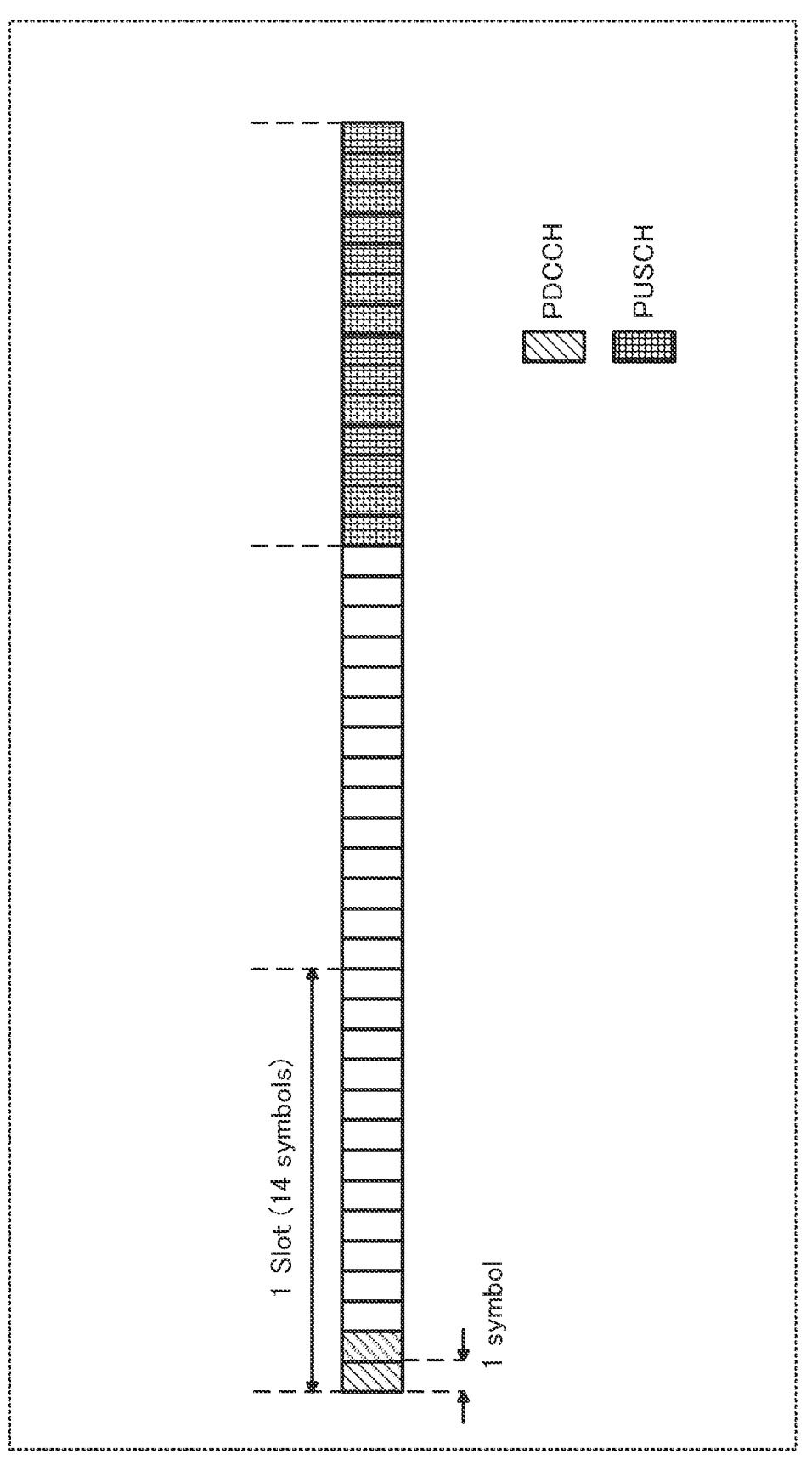
FIG. 3 illustrates a transmission example of uplink data.

FIG. 3 illustrates an allocation example of a time domain resource for PDCCH and PUSCH in uplink data transmission. In FIG. 3, for example, 14 symbols in a slot may be denoted by the 0th to the 13th symbol numbers (e.g., symbols #0 to #13). In FIG. 3, for example, PUSCH is transmitted in 14 symbols from the first symbol (e.g., symbols #0 to #13), in the slot after 2 slots front the slot in which the terminal has received PDCCH.

Further, in NR, a Grant-free transmission (or Configured Grant transmission) is supported in which the terminal transmits PUSCH by using a pre-designated (or pre-configured) resource, without allocation from the base station (e.g., Grant) (e.g., see NPL 4 or 6). Examples of methods for designating a resource in the Grant-free transmission include "Type 1" in which a transmission parameter such as a period of transmission resources or a time domain resource is previously figured by the higher layer signaling (e.g., RRC) and "Type 2" in which designation of some transmission parameters such as the time domain resource can be changed semi-persistently by DCI.

[Uplink Transmission]

In uplink transmission a terminal, transmission resources configured for PUCCH and PUSCH, respectively, may overlap in time. In this case, in NR Release 15 (hereinafter referred to as "NR Rel. 15"), the terminal may transmit UCI and uplink data by multiplexing with PUSCH, for example (e.g., see NPL 4 or 5).

Further, in uplink transmission in NR, for example, a reference signal (e.g., Demodulation Reference Signal: DMRS) to be used in channel estimation for demodulation may be mapped in resources for PDCCH, PDSCH, PUCCH, and PUSCH. DMRS may be mapped, for example, in front of a slot. Alternatively, DMRS may be mapped in, for example, a plurality of symbols in the slot (e.g., see NPL 3, 5, or 6).

Further, in uplink transmission in NR Rel. 15, for example, PUCCH and PUSCH may be transmitted repeatedly (e.g., also referred to as repetition or slot aggregation) using a plurality of slots (e.g., in units of slots) (e.g., see NPL 5 or 6). For example, information on whether the terminal applies repetition and the number of times of repetition (e.g., number of slots) when performing the repeated transmission may be semi-statically indicated from the base station to the terminal by an UE-specific higher-layer signaling (e.g., RRC signal). Meanwhile, when repetition is applied, a common time domain resource allocation may be applied in a plurality of slots, for example.

In the following description, such a repetition scheme is referred to as "slot-level Repetition" (repetition in units of slots).

Meanwhile, in NR Rel. 16, for example, a method is defined in which, for transmission of PUSCH, one or more PUSCHs are repeatedly transmitted in one slot (see, e.g., NPL 7). In this method, for example, the base station indicates, to the terminal, allocation of a time resource for the first (i.e., initial) PUSCH transmission (e.g., first repetition) and the number of times of repetition. Additionally, in this method, for example, symbol(s) contiguous to the last PUSCH transmission in the same number of symbols as the last PUSCH transmission may be assigned as the time resource allocation for the second and subsequent PUSCH transmission.

In the following description, such a repetition scheme is referred to as "mini-slot-level Repetition" (repetition in units of mini-slots) Incidentally, the mini-slot may be understood as, for example, a time-resource unit shorter than a slot.

The uplink transmission has been described, thus far.

Note that, in the environment where the lower the index indicating communication quality such as a Signal-to-Noise power Ratio (SNR) or a Signal-to-Interference plus Noise power Ratio (SINR) to which Coverage Enhancement (CE) can be applied is, the more likely the channel estimation accuracy is deteriorated.

For improved coverage, introduction of the above-mentioned Repetitions is assumed, for example, but in NR, it is defined that, for example, a channel estimation result demodulated by DMRS can be used in a slot in which the DMRS is included. That is, in this definition, the channel estimation result by DMRS is not used in a slot different from the slot including the DMRS.

Thus, in the above-mentioned Repetitions in NR, as reception processing, for example, a method may be adopted in which channel estimation is performed for each slot, the obtained channel estimation value per slot is used for demodulating and decoding data of each slot, and thereby an output of the decoding result (e.g., Log Likelihood Ratio (LLR) is combined.

In this method, for example, the output result for each slot (e.g., LLR) can be combined for data. On the other hand, in this method, since channel estimation is performed for each slot, the channel estimation accuracy is less likely to be improved. For example, in a case where a channel estimation value with reduced estimation accuracy is used for demodulating and decoding data of each slot, a combining gain from Repetition may not be sufficiently obtained. Thus, it is expected to improve the channel estimation accuracy Repetition.

An example of a method for improving the channel estimation accuracy includes a method in which Additional DMRS mapping is applied, as employed in NR. In this method, for example, DMRS may be mapped to a plurality of symbols in a slot. However, when Additional DMRS is used, an overhead of DMRS is likely to increase, and thus, the transmission efficiency may be lowered.

Further, it can be said that the above-mentioned mini-slot-level Repetition is also a method for improving the channel estimation accuracy because, for example, DMRS is mapped to each of a plurality of repetition durations, and the number of DMRS symbols in one slot can be increased. However, in the mini-slot-level Repetition, for example, since DMRS is mapped to each of Repetition durations, an overhead of DMRS may be increased, and thus, the transmission efficiency may be lowered as in the case of applying the Additional DMRS.

Another example of a method for improving the channel estimation accuracy includes, for example, a method in which channel estimation is performed by combination of DMRS in a plurality of slots. For example, by making the above-mentioned channel estimation result demodulated by DMRS usable not only in the slot including the DMRS but also in other slots, received SNR of DMRS used for channel estimation is improved (i.e., inter-slot channel estimation or inter-Repetition channel estimation). However, in the inter-slot channel estimation or the inter-Repetition channel estimation, channel estimation can be performed after receiving a plurality of slots for combining DMRS; accordingly, the processing latency in decoding and demodulation of the data may increase. For this reason, the inter-slot channel estimation or the inter-Repetition channel estimation may not take advantage of the latency reduction in the demodulation processing by Front-load DMRS employed in NR, for example. In addition, for example, in an environment where the coverage enhancement may be applied (e.g., environment where terminal moves), the effect of the inter-slot channel estimation may be small as compared to an environment where the coverage enhancement is not applied.

Still another example of a method for improving the channel estimation accuracy includes a method of applying repetition in which the same OFDM symbol is consecutively transmitted (her after referred to as "Symbol-level Repetition"), unlike the slot-level Repetition or mini-slot-level Repetition that have been adopted in NR (e.g., see NPL 8).

In the symbol-level Repetition, for example, a coherent combing for DMRS symbols and data symbols that are transmitted consecutively in the time domain is easily performed as compared to the slot-level or mini-slot-level Repetition, and thus, received SNR of the combined DMRS can be improved. Therefore, for example, using the combined DMRS for channel estimation can improve the channel estimation accuracy.

By way of example, in NPL 8, when applying the symbol-level Repetition, as a time-resource unit, "Virtual symbol" composed of a plurality of OFDM symbols that are subject to Repetition in units of symbols and "Virtual slot" composed of a plurality of Virtual symbols are introduced. For example, one or more physical layer processes in NR, such as the resource allocation, the DMRS mapping, the slot-level or mini-slot-level Repetition are achieved by applying a Virtual symbol or a Virtual slot. For example, executing the physical layer processing in NR that is based on a symbol or a slot while replacing them with a Virtual symbol or a Virtual slot, suppresses a change for the physical layer processing in NR, and thereby the symbol-level Repetition can be achieved. Note that, the physical layer processing may include processing such as resource allocation processing, processing related to DMRS, processing related to timing, or power control processing, for example.

Incidentally, in the following description, a symbol (e.g., OFDM symbol) and a slot to which the symbol-level Repetition is not applied are may be respectively referred to as "Normal symbol" and "Normal slot" in order to distinguish them from Virtual symbol and a Virtual slot, for convenience.

Here, for example, the number of times of Repetition configured for the coverage enhancement may be different for each channel such as PUCCH and PUSCH. For example, NPL 9 has clarified that a degree of coverage enhancement for achieving the target performance is higher in PUSCH compared to PUCCH. In other words, it is suggested that a greater number of times of Repetition can be configured for PUSCH compared to PUCCH.

By way of example, in the symbol-level Repetition, the number of times of Repetition may be configured for an individual channel for a terminal. In the following, as an example, when the symbol-level Repetition is applied, the number of symbol Repetitions is defined, for example, "virtualsymbolLength" for convenience. For example, when the number of times of Repetition for each channel is configured, parameters may be introduced such as "virtualsymbolLength-ForPUCCH" indicating the number of times of Repetition for PUCCH and "virtualsymbolLength-ForPUSCH" indicating the number of times of Repetition for PUSCH.

As mentioned above, in NR, in uplink transmission in a terminal, transmission resources configured for PUCCH and PUSCH, respectively, may overlap in time. In this case, in NR Rel. 15, for example, the terminal may transmit UCI and uplink data by multiplexing with PUSCH, for example.

For example, in a situation where virtualsymbolLength of the same value is configured for PUCCH and PUSCH even when the symbol-level Repetition is applied, processing for multiplexing UCI with PUSCH based on a symbol or a slot (e.g., see NPL 5) is operable by replacing with a Virtual symbol or a Virtual slot.

On the other hand, in a situation where a different number of times of Repetition are configured for PUCCH and PUSCH (e.g., when values of virtualsymbolLength-ForPUCCH and virtualsymbolLength-ForPUSCH are different from each other), there is scope for further study on an operation when the transmission resources configured for PUCCH and PUSCH, respectively, overlap in time.

By way of example, a case will be described where transmission of PUCCH and PUSCH with the same priority overlaps in time in NR. For example, when Repetition is not configured for PUCCH, the terminal may transmit UCI, which is to be transmitted via PUCCH, by multiplexing with PUSCH in the slot where a PUCCH resource and a PUSCH resource overlap in time. On the other hand, when Repetition is configured for PUCCH, the terminal may drop the transmission of PUSCH (i.e., not transmit PUSCH) and transmit UCI via PUCCH in the slot where the PUCCH resource and the PUSCH resource overlap in time. Incidentally, Repetition in NR mentioned above is the slot-level or mini-slot-level Repetition, for example.

As an example, a description will be given of a case of using the same technique as in NR mentioned above, in the symbol-level Repetition with application of a Virtual symbol and a Virtual slot. For example, when the symbol-level Repetition is not configured for PUCCH (e.g., virtualsymbolLength-ForPUCCH=1), the terminal may transmit UCI, which is to be transmitted via PUCCH, by multiplexing with PUSCH in the Virtual slot where a PUCCH resource and a PUSCH resource overlap in time. On the other hand, when the symbol-level Repetition is configured for PUCCH (e.g., virtualsymbolLength-ForPUCCH>1), the terminal may drop the transmission of PUSCH in the Virtual slot where the PUCCH resource and the PUSCH resource overlap in time.

In this technique, however, when the symbol-level Repetition is configured for PUCCH, dropping the PUSCH transmission may deteriorate the coverage performance for PUSCH or the transmission efficiency of PUSCH.

Additionally, there is scope for further study on a method of calculating a resource amount for UCI transmission when UCI is multiplexed with PUSCH to which the symbol-level Repetition is applied.

Therefore, in one non-limiting exemplary embodiment of the present disclosure, a description will be given of, for example, a method (may be also referred to as a "framework") for enhancing the transmission efficiency (e.g., coverage performance or transmission efficiency) in radio communication including Repetition.

[Overview of Communication System]

A communication system according to each embodiment of the present disclosure includes base station 100 and terminal 200.

Figure 4:
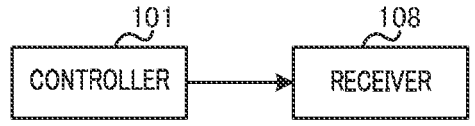
FIG. 4 is a block diagram illustrating a configuration example of a part of a base station.

FIG. 4 is a block diagram illustrating a configuration example of a part of base station 100 according to an exemplary embodiment of the present disclosure. In base station 100 illustrated in FIG. 4, controller 101 (e.g., corresponding to control circuitry) determines via which of a first channel or a second channel in uplink control information (e.g., UCI) is received, based on a unit of a second symbol (e.g., Virtual symbol) (e.g., configuration of symbol-level Repetition) associated with a plurality of first symbols (e.g., OFDM symbols) in at least one of the first channel (e.g., PUCCH) and the second channel (e.g., PUSCH) in uplink as a single unit. Receiver 108 (e.g., corresponding to reception circuitry) performs reception of the uplink control information using the determined channel.

Figure 5:
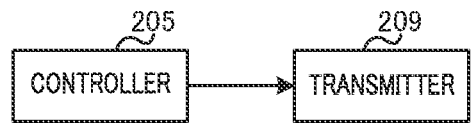
FIG. 5 is a block diagram illustrating a configuration example of a part of a terminal.

FIG. 5 is a block diagram illustrating a configuration example of a part of terminal 200 according to an exemplary embodiment of the present disclosure. In terminal 200 illustrated in FIG. 5, controller 205 (e.g., corresponding to control circuitry) determines via which of a first channel or a second channel in uplink control information (e.g., UCI) is transmitted, based on a unit of a second symbol (e.g., Virtual symbol) (e.g., configuration of symbol-level Repetition) associated with a plurality of first symbols (e.g., OFDM symbols) in at least one of the first channel (e.g., PUCCH) and the second channel (e.g., PUSCH) in uplink as a single unit. Transmitter 209 (e.g., corresponding to transmission circuitry) transmits the uplink control information using the determined channel.

[Configuration of Base Station]

Figure 6:
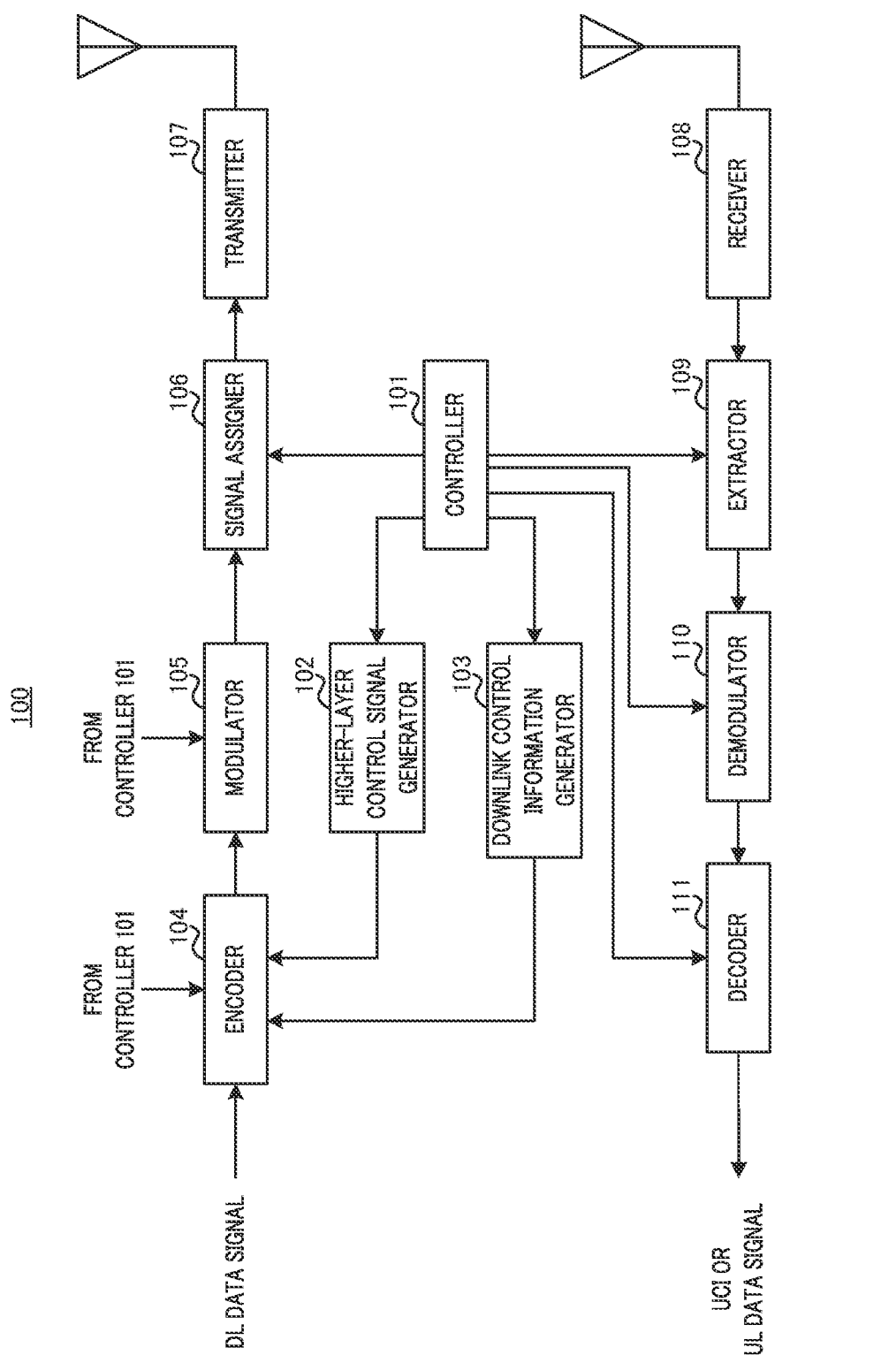
FIG. 6 is a block diagram illustrating a configuration example of the base station.

FIG. 6 is a block diagram illustrating a configuration example of base station 100 according to Embodiment 1. In FIG. 6, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101 determines, for example, information on "Symbol-level Repetition" (repetition in units of symbols) for terminal 200 and outputs the determined information to higher-layer control signal generator 102 or downlink control information generator 103. The information on the Symbol-level Repetition may include the above-mentioned virtualsymbolLength (or virtualsymbolLength-ForPUCCH and virtualsymbolLength-ForPUSCH).

Further, controller 101 determines, for example, information on PDSCH reception, information on PUSCH transmission, and information on PUCCH transmission for terminal 200 and outputs the determined information to higher-layer control signal generator 102. The information on PDSCH reception and the information on PUSCH transmission may include, for example, information on Time domain resource Allocation (TDRA). The information on TDRA (sometimes referred to as "TDRA information") may be represented in a table format (TDRA table). Further, the information on PUCCH transmission may include, for example, information on a PUCCH resource set (e.g., candidate for PUCCH resource).

Controller 101 also determines information on a downlink signal for transmitting a downlink data signal (e.g., PDSCH), a higher-layer control signal (e.g., RRC signal), or downlink control information (e.g., DCI), for example. The information on the downlink signal may include information such as a Modulation and Coding Scheme (MCS) and radio resource allocation. Controller 101, for example, outputs the determined information to encoder 104, modulator 105, and signal assigner 106. In addition, controller 101 outputs information on the downlink signal, such as the data signal or the higher-layer control signal, to downlink control information generator 103.

Moreover, controller 101 determines, for example, a PUCCH resource for terminal 200 to transmit an uplink control signal (e.g., PUCCH). Controller 101 outputs information on the determined resource to, for example, higher-layer control signal generator 102 or downlink control information generator 103. Controller 101 also outputs the information on the determined resource to, for example, extractor 109, demodulator 110, and decoder 111.

Furthermore, controller 101 determines, for example, information (e.g., modulation and coding scheme (MCS) and radio resource allocation) on an uplink signal for terminal 200 to transmit an uplink data signal (e.g., PUSCH) and outputs the determined information to downlink control information generator 103, extractor 109, demodulator 110, and decoder 111.

Note that, controller 101 may determine the information on the downlink signal, the information on the PUCCH resource, or the information on the uplink signal, based on, for example, methods described below (e.g., method such as resource allocation, DMRS mapping or additional Repetition).

Further, controller 101 may, for example, determine whether the PUCCH resource in which terminal 200 transmits PUCCH (e.g., UCI) and the radio resource in which the uplink data is transmitted overlap in time. When the resources overlap in time, for example, controller 101 may control reception of the uplink signal based on a method to be described later. In addition, when the resources overlap in time, for example, controller 101 calculates a resource in which UCI is multiplexed on PUSCH (e.g., resource amount), based on a method to be described later, and outputs information on the calculated resource to extractor 109, demodulator 110, and decoder 111.

Higher-layer control signal generator 102, for example, generates a higher-layer control signal bit string based on information input from controller 101 and outputs the higher-layer control signal bit string to encoder 104.

Downlink control information generator 103, for example, generates a downlink control information (e.g., DCI) bit string based on information input from controller 101 and outputs the generated DCI bit string to encoder 104. Note that, the control information may be transmitted to a plurality of terminals.

Encoder 104, for example, encodes downlink data (e.g., DL, data signal), a bit string Input from higher-layer control signal generator 102, or a DCI hit string input from downlink control information generator 103, based on information input from controller 101. Encoder 104 outputs the encoded bit string to modulator 105.

Modulator 105, for example, modulates an encoded bit string input from encoder 104, based on information input from controller 101, and outputs the modulated signal (e.g., symbol string) to signal assigner 106.

Signal assigner 106, for example, maps, to a radio resource, a symbol string (including, for example, downlink data or control signal) input from modulator 105, based on radio resource-indicating information input from controller 101. Signal assigner 106 outputs, to transmitter 107, a downlink signal to which the signal is Wrapped.

Transmitter 107, for example, performs transmission-waveform generation processing such as orthogonal Frequency Division Multiplexing (OFDM) on a signal input from signal assigner 106. In addition, in the case of, for example, an OFDM transmission in which a cyclic prefix (CP) is added, transmitter 107 performs Inverse Fast Fourier Transform (IFFT) processing on a signal, and adds the CP to the signal resulting from the IFFT. Moreover, transmitter 107 performs RF processing such as D/A conversion or up-conversion on signal, and transmits the resulting radio signal to terminal 200 via an antenna.

Receiver 108, for example, performs RE processing such as down-conversion or A/D conversion on an uplink signal received from terminal 200 via the antenna. Further, in the case of the OFDM transmission, receiver 108 performs Fast Fourier Transform (FFT) processing on a received signal, and outputs the resulting frequency-domain signal to extractor 109.

Extractor 109, for example, extracts a radio resource part with which an uplink signal (e.g., PUSCH or PUCCH) to be transmitted by terminal 200 is transmitted based on information input from controller 101, and outputs the extracted radio resource part to demodulator 110.

Demodulator 110 performs channel estimation by using a reference signal (e.g., DMRS) included in a received signal input from extractor 109 based on, for example, the information input from controller 101. Further, demodulator 110 demodulates an uplink signal (e.g., PUSCH or PUCCH) input from extractor 109 by using, for example, a channel estimation result. Demodulator 110, for example, outputs a demodulation result to decoder 111.

Decoder 111, for example, performs error correction decoding on an uplink signal (e.g., PUSCH or PUCCH) based on information input from controller 101 and a demodulation result input from demodulator 110 to obtain a reception bit sequence (e.g., UL data signal or UCI) after decoding.

[Configuration of Terminal]

Figure 7:
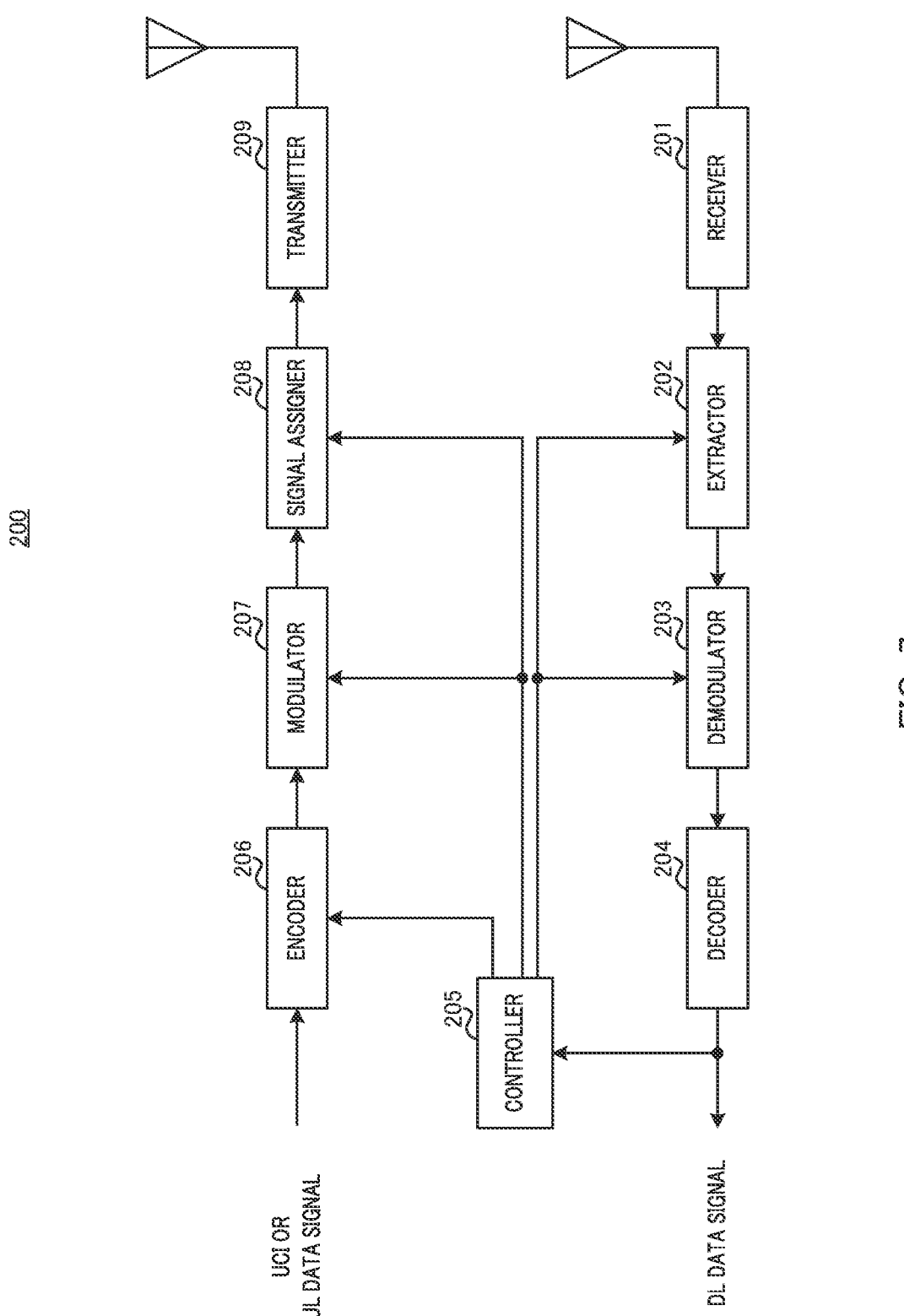
FIG. 7 is a block diagram illustrating a configuration example of the terminal.

FIG. 7 is a block diagram illustrating a configuration example of terminal 200 according to an exemplary embodiment of the present disclosure. For example, in FIG. 7, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal or downlink control information) from base station 100 via an antenna, performs the RF processing such as the down-conversion or the A/D conversion on the received radio signal to obtain a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts a radio resource part, which may include downlink control information, from a received signal input from receiver 201 based on information on a radio resource in downlink control information input from controller 205, and outputs the radio resource part to demodulator 203. Further, extractor 202 extracts a radio resource part which includes downlink data based on information on a radio resource for a data signal input from controller 205, and outputs the radio resource part to demodulator 203.

Demodulator 203 performs channel estimation by using a reference signal (e.g., DMRS) included in a reception signal input from extractor 202 based on, for example, information input from controller 205. Further, demodulator 203, for example, demodulates a signal (e.g., PDCCH or PDSCH)

input from extractor 202 by using a channel estimation result and outputs a demodulation result to decoder 204.

Decoder 204, for example, performs error correction decoding on PDCCH or PDSCH, using a demodulation result input from demodulator 203, and obtains downlink reception data, a higher-layer control signal, or downlink control information, for example Decoder 204 outputs the higher-layer control signal and the downlink control information to controller 205, and outputs the downlink reception data. Further, decoder 204 may generate a response signal (e.g., ACK/NACK) based on a decoding result of the downlink reception data and output the generated response signal to encoder 206.

Controller 205 determines a radio resource for PDSCH reception, PUSCH transmission, or PUCCH transmission based on, for example, a signal (e.g., higher layer control signal or downlink control information) input from decoder 204. Incidentally, controller 205 may determine the above-mentioned radio resource using a method to be described later (e.g., method such as resource allocation, DMRS mapping, or additional Repetition), based on information on the symbol-level Repetition and the radio resource allocation information, for example. Controller 205 outputs the information thus determined to, for example, extractor 202, demodulator 203, encoder 206, and signal assigner 208.

Further, controller 205 may, for example, determine whether the PUCCH resource in which terminal 200 transmits PUCCH (e.g., UCI) and the radio resource in which the uplink data is transmitted overlap in time. When the resources overlap in time, for example, controller 205 may control transmission of the uplink signal based on a method to be described later. In addition, when the resources overlap in time, for example, controller 205 calculates a resource in which UCI is multiplexed on PUSCH (e.g., resource amount), based on a method to be described later, and outputs information on the calculated resource to encoder 206, modulator 207, and signal assigner 208.

Encoder 206, for example, encodes an uplink signal (e.g., UCI or uplink data signal) based on information input from controller 205 and outputs the encoded bit string to modulator 207.

Modulator 207, for example, modulates an encoded bit string input from encoder 206 and outputs the modulated signal (symbol string) to signal assigner 208.

Signal assigner 208, for example, maps a signal input from modulator 207 to a radio resource based on information input from controller 205, and outputs an uplink signal to which the signal is mapped to transmitter 209.

Transmitter 209, for example, performs the transmission-waveform generation processing such as the OFDM on a signal input from signal assigner 208. In addition, in the case of, for example, the OFDM transmission using the CP, transmitter 209 performs the IFFT processing on a signal, and adds the CP to the signal resulting from the IFFT. Alternatively, when transmitter 209 generates a single-carrier waveform, for example, a Discrete Fourier Transformer (DFT) may be additionally provided at a rear stage of modulator 207 or a front stage of signal assigner 208 (neither is illustrated). Moreover, transmitter 209, for example, performs the RF processing such as the D/A conversion or the up-conversion on a transmission signal, and transmits the resulting radio signal to base station 100 via the antenna.

[Exemplary Operations of Base Station 100 and Terminal 200]

Exemplary operations of base station 100 and terminal 200 having the above configurations will be described.

In the present embodiment, for example, in a situation there a time duration in which PUCCH is placed and a time duration in which PUSCH is placed overlap in time when the symbol-level Repetition (e.g., Virtual symbol or Virtual slot) is applied to either or both of PUCCH and PUSCH, base station 100 and terminal 200 transmit UCI, which is to be transmitted via PUCCH, by multiplexing with PUSCH as much as possible.

This prevents, for example, deterioration of the coverage performance or the transmission efficiency of PUSCH.

Further, in the present embodiment, a description will be given of a method of appropriately controlling a resource amount for UCI to be multiplexed on PUSCH when terminal 200 multiplexes UCI with PUSCH to which the symbol-level Repetition is applied.

Hereinafter, an operation example of the symbol-level Repetition will be described.

[Configuration Examples of Symbol-Level Repetition, Virtual Symbol, and Virtual Slot]

In the present embodiment, for example, "symbol-level Repetition" is applied in which one OFDM symbol is consecutively and repeatedly transmitted to either or both of PUCCH and PUSCH.

Figure 8:
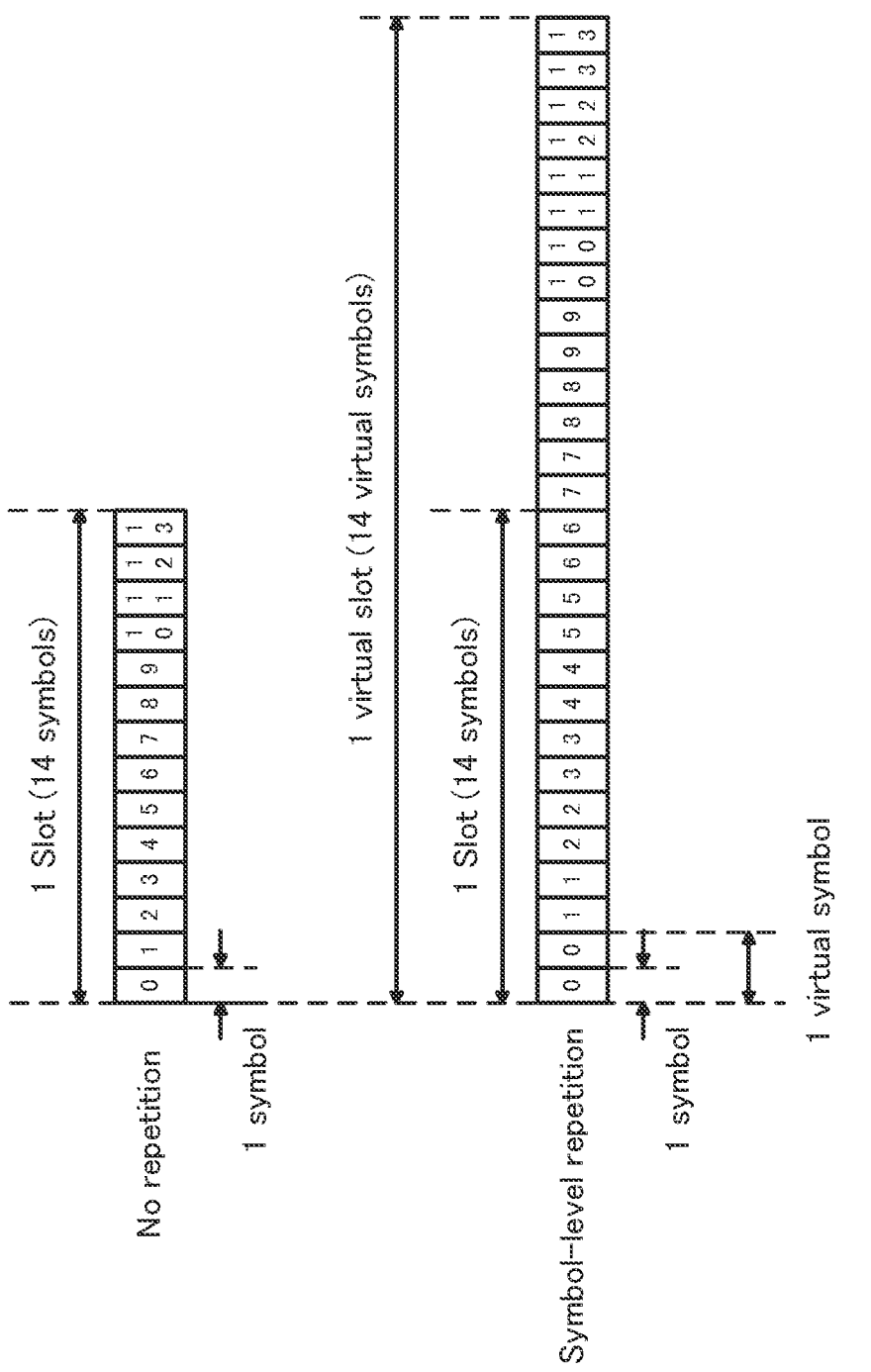
FIG. 8 illustrates configuration examples of Virtual symbols and a Virtual slot.

FIG. 8 illustrates an example of the symbol-level Repetition in a case where virtualsymbolLength=2. As illustrated in FIG. 8, the same OFDM symbol (each of OFDM symbols 0 to 13) is consecutively transmitted (i.e., mapped).

Here, a time-resource unit composed of consecutive OFDM symbols of virtualsymbolLength is defined as a "Virtual symbol." For example, in FIG. 8, one Virtual symbol is composed of two OFDM symbols. In OFDM symbols of virtualsymbolLength configuring a Virtual symbol, a signal (e.g., PDSCH, PUSCH, or PUCCH) may be subject to Repetition. In other words, a Virtual symbol unit corresponds to a Repetition unit.

In addition, for example, in the case of No al cyclic prefix, a time-resource unit (i.e., unit time duration) composed of Virtual symbols in the same number of symbols as OFDM symbols (i.e., Normal symbols) included in a slot when the symbol-level Repetition is not applied (e.g., Normal slot) is defined as a "Virtual slot." By way of example, in FIG. 8, one Virtual slot is composed of 14 Virtual symbols. That is, a Virtual slot can be composed of OFDM symbols of 14×virtualsymbolLength (28 OFDM symbols in FIG. 8).

Incidentally, in NR, for example, an extended cyclic prefix is specified in 60 kHz SCS. In this case, for example, since the number of OFDM symbols included in a slot where the symbol-level Repetition is not applied (e.g., Normal slot) is 12, the number of Virtual symbols included in a Virtual slot may be set to 12.

[Exemplary Configuration (Setting) of VirtualsymbolLength]

Terminal 200 may receive, from base station 100, information on the number of symbol-level Repetitions or on the number of OFDM symbols (e.g., virtualsymbolLength) composing a Virtual symbol, for example.

VirtualsymbolLength may be semi-statically indicated (or configured) from base station 100 to terminal 200 by, for example, a broadcast signal or an UE-specific higher layer signaling (e.g., RRC signal), or may be dynamically indicated from base station 100 to terminal 200 by dynamic signaling such as DCI.

Alternatively, for example, a plurality of candidates for virtualsymbolLength may be semi-statically indicated from base station 100 to terminal 200 by a broadcast signal or an UE-specific higher layer signaling (e.g., RRC signal), and a value of one virtualsymbolLength (or value used for calculating value of virtualsymbolLength) from among the plurality of candidates may be dynamically indicated from base station 100 to terminal 200 by dynamic signaling (or indication) such as DCI.

Alternatively, for example, virtualsymbolLength may be configured to one value (i.e., one type) with respect to terminal 200. For example, virtualsymbolLength may indicate one of a plurality of candidate numbers of symbols that can be configured for terminal 200.

Further, for example, virtualsymbolLength may be configured, corresponding to the coverage enhancement level of terminal 200.

Further, for example, virtualsymbolLength configured for terminal 200 may be applied to a plurality (e.g., all) of channels/signals. Note that, the term "channel/signal" represents a channel or a signal, or a combination of a channel and a signal.

Alternatively, virtualsymbolLength for terminal 200 may be applied to some channels/signals, for example. That is, channels/signals that can be transmitted and/or received by terminal 200 may include therein a channel/signal to which the symbol-level Repetition is applied and a channel/signal to which the symbol-level Repetition is not applied. For example, the symbol-level Repetition may be applied to PUSCH where it is assumed that the coverage enhancement is likely to be configured whereas the symbol-level Repetition may not be applied to another channel/signal different from PUSCH.

Further, for example, with respect to terminal 200, virtualsymbolLength may be configured for an individual channel/signal used in communication. For example, parameters such as "virtualsymbolLength-ForPUCCH" for PUCCH and "virtualsymbolLength-ForPUSCH" for PUSCH may be introduced. Note that, the type of channel/signal is not limited to these, and virtualsymbolLength may be individually configured for another channel or signal. For example, an expected number of times of Repetition may differ between channels/signals. Hence, an appropriate number of times of Repetition can be configured for an individual channel/signal.

Meanwhile, for example, a plurality of different virtualsymbolLength configurations may be indicated to an individual channel/signal. In one example, for PUCCH, a value of virtualsymbolLength may be configured for each PUCCH format. For example, the number of symbols or the number of transmission bits may differ between PUCCH formats, and thus, the coverage enhancement level (may also differ therebetween. In this case, with the configuration of virtualsymbolLength for an individual PUCCH format, a different number of times of Repetition can be configured for each of the plurality of PUCCH formats.

Furthermore, for example, a value of virtualsymbolLength may be individually configured for each SCS configuration. In one example, the larger SCS is, the wider bandwidth transmission is, which can reduce the coverage. Therefore, as SCS increases, the number of times of Repetition to be configured may also increase. In this case, with the configuration of virtualsymbolLength for an individual SCS configuration, a different number of times of Repetition can be configured for each of the plurality of SCS configurations.

[Operation Example when PUCCH Resource and PUSCH Resource Overlap in Time]

In the present embodiment, as mentioned above, the uplink transmission based on a Virtual symbol or a Virtual slot that is configured by applying the symbol-level Repetition may be applied to either or both of PUCCH and PUSCH.

In the following, operation example then a PUCCH resource and a PUSCH resource overlap in time will be described.

Incidentally, a description will be given of an example of PUCCH transmission and PUSCH transmission based on the Virtual symbol and the Virtual slot configured by applying the symbol-level Repetition (e.g., configurations of Virtual symbol and Virtual slot, resource allocation, and DMRS mapping).

Hereinafter, for a method of controlling the resource amount for UCI to be multiplexed on PUSCH, either of two methods (e.g., Option 1 and Option 2) may be applied.

<Option 1>

In Option 1, when resources overlap in time between PUCCH and PUSCH, terminal 200 determines to multiplex UCI with PUSCH.

Meanwhile, in Option 1, a unit of resource amount $Q'_{UCI}$ to be allocated to UCI in PUSCH is based on, for example, a Virtual symbol of PUCCH, e.g., virtualsymbolLength-ForPUCCH. By way of example, base station 100 and terminal 200 configure the resource amount to be allocated to UCI in PUSCH, based on the number of a plurality of Normal symbols (e.g., virtualsymbolLength-ForPUCCH) composing a Virtual symbol in PUCCH.

Here, in NR, a unit of resource amount $Q'_{UCI}$ to be allocated to UCI in PUSCH is, for example, one subcarrier in a frequency-domain and a resource element (RE) that is a domain specified by one OFDM symbol in a time-domain.

By contrast, in Option 1, the unit of resource amount $Q'_{UCI}$ to be allocated to UCI in PUSCH is, for example, one subcarrier in a frequency-domain and a domain specified by one Virtual symbol in a time-domain (e.g., may be referred to as a "Virtual resource element"). For example, the Virtual resource element may include resource elements of virtualsymbolLength-ForPUCCH.

Figure 9:
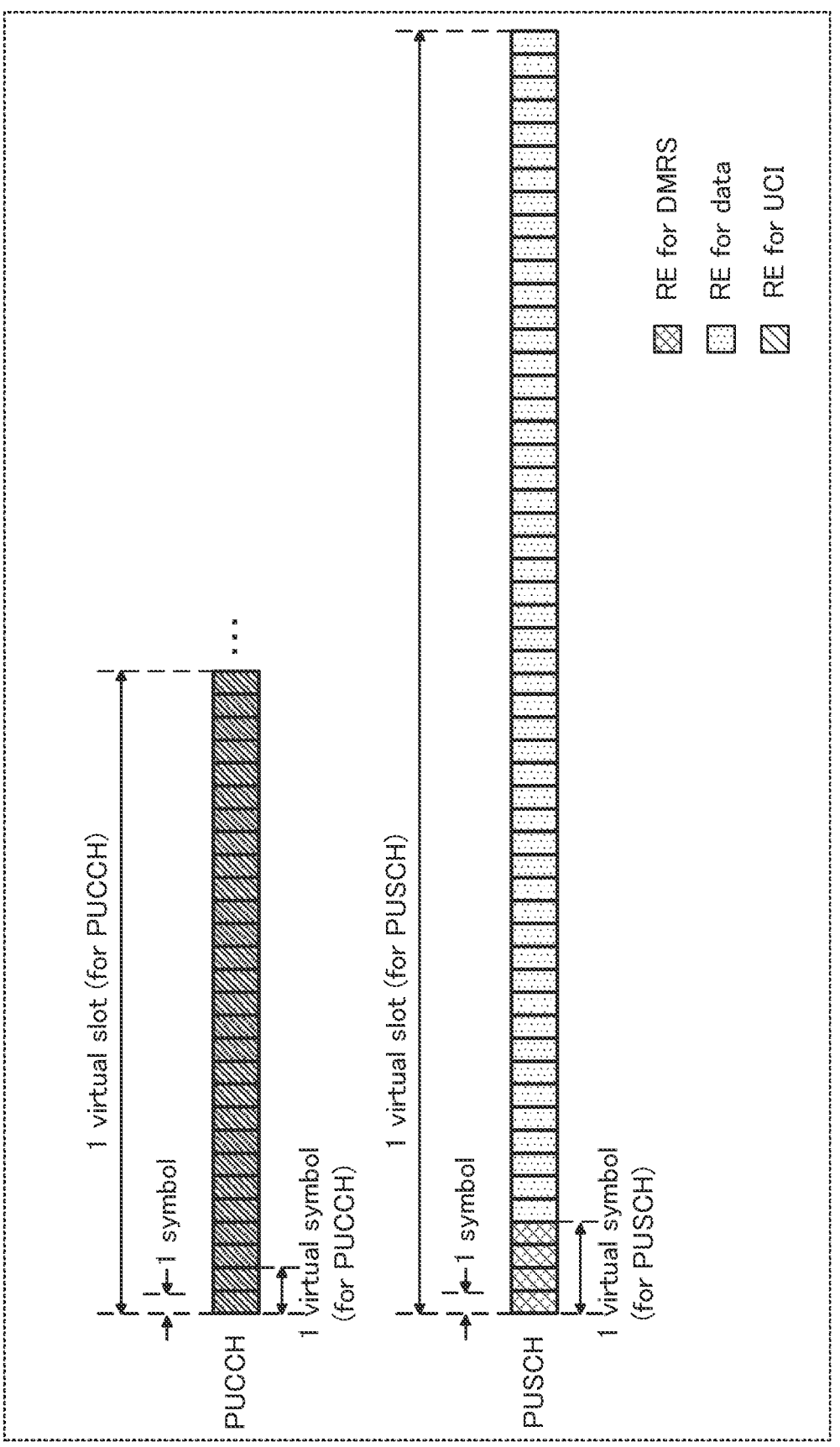
FIG. 9 illustrates configuration examples of a Physical Uplink Control Channel (PUCCH) and a Physical Uplink Shared Channel (PUSCH) of Option 1.
Figure 10:
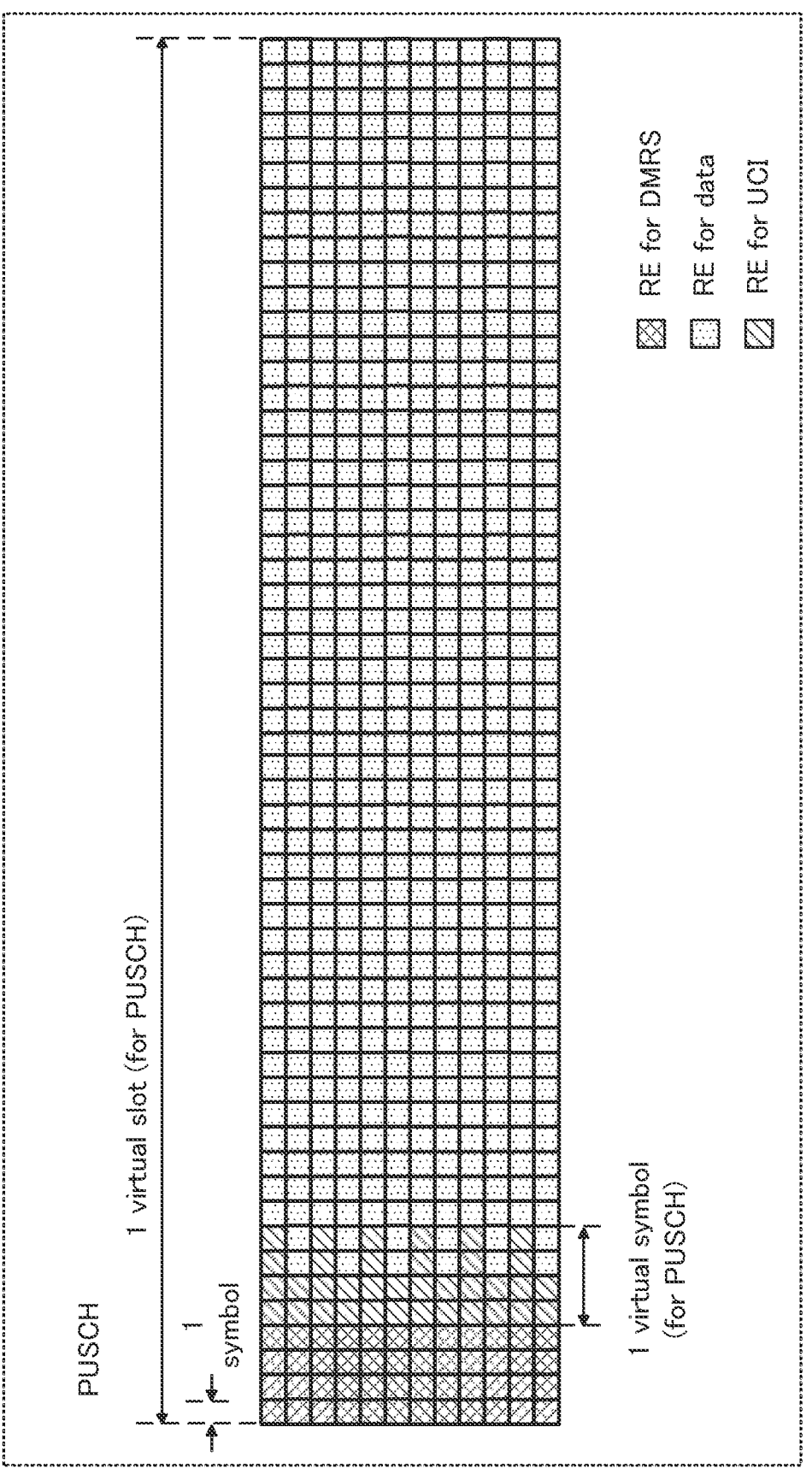
FIG. 10 illustrates a multiplexing example of Uplink Control Information WC PUSCH of Option 1.

FIGS. 9 and 10 each illustrates a multiplexing example of UCI in PUSCH in a case where virtualsymbolLength-ForPUCCH<virtualsymbolLength-ForPUSCH. For example, in the example illustrated in FIG. 9, virtualsymbolLength-ForPUCCH=2, and virtualsymbolLength-For-PUSCH=4.

FIG. 9 illustrates an example of resource allocation for PUCCH and PUSCH, whereas FIG. 10 illustrates an example of UCI multiplexing on PUSCH in the case of FIG. 9.

Further, the resource amount to be allocated to UCI PUSCH, e.g., the number of Virtual resource elements is $Q'_{UCI}=18$. As mentioned above, in Option 1, since the unit of $Q'_{UCI}$ is based on virtualsymbolLength-ForPUCCH, the number of resource elements (e.g., the number of normal REs) used in transmitting UCI via PUSCH is $Q'_{UCI}\times$virtualsymbolLength-ForPUCCH. In FIG. 10, for example, the number of resource elements used in transmitting UCI via PUSCH is $Q'_{UCI}\times$virtualsymbolLength-ForPUCCH=18× 2=36 resource elements.

In Option 1, as illustrated in FIG. 9, when the number of times of Repetition for PUCCH is less than the number of times of Repetition for PUSCH, e.g., when a value of virtualsymbolLength-ForPUCCH is less than a value of virtualsymbolLength-ForPUSCH, the amount of resources used for UCI in PUSCH can be reduced to the number of times of Repetition used for PUCCH. In other words, the amount of resources used for UCI in PUSCH need not to be matched with the number of times of Repetition for PUSCH.

For this reason, the coverage property of PUCCH can be maintained without excessively allocating resources to UCI in PUSCH, thereby improving the utilization efficiency of PUSCH resources.

Figure 11:
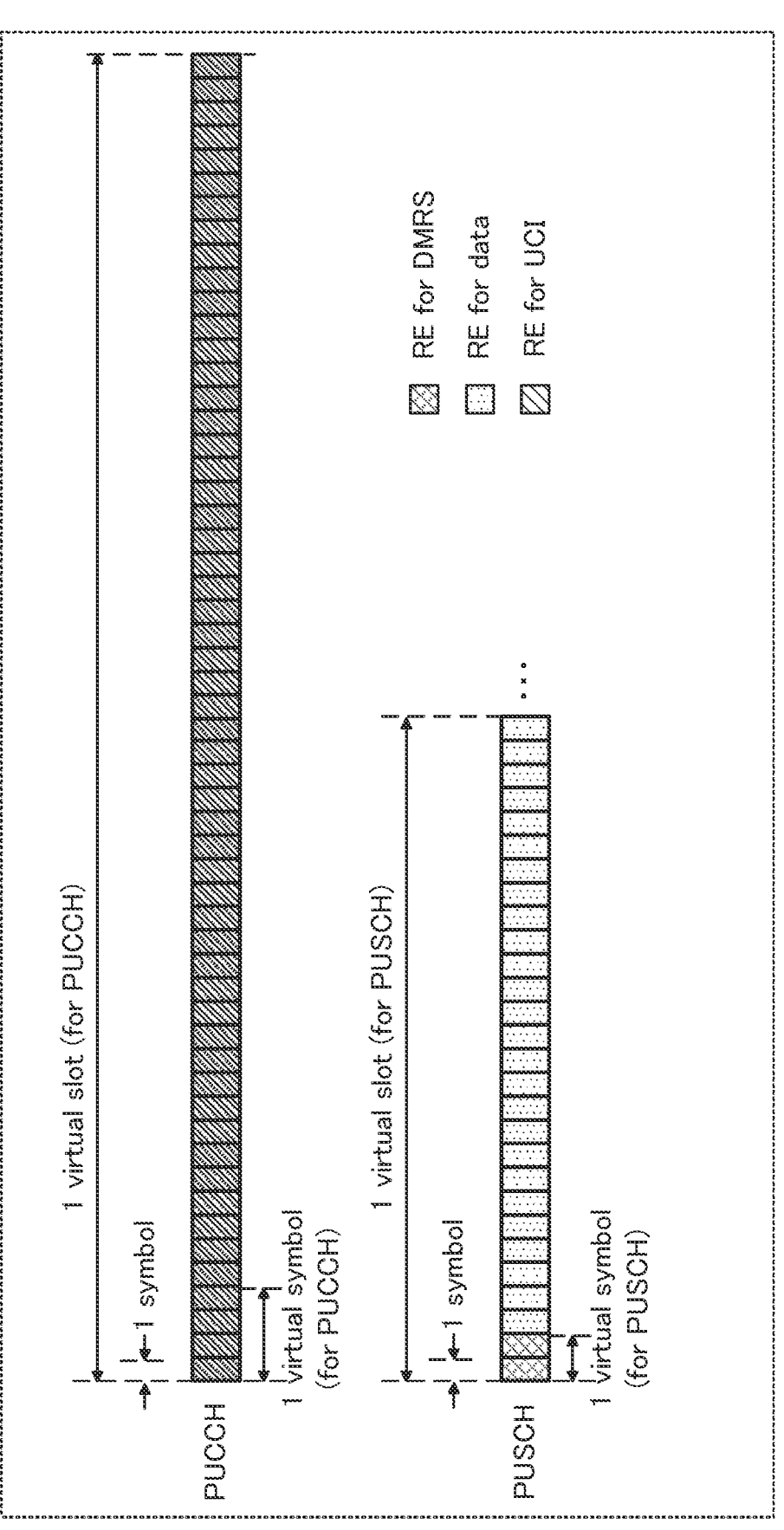
FIG. 11 illustrates other configuration examples of PUCCH and PUSCH of Option 1.
Figure 12:
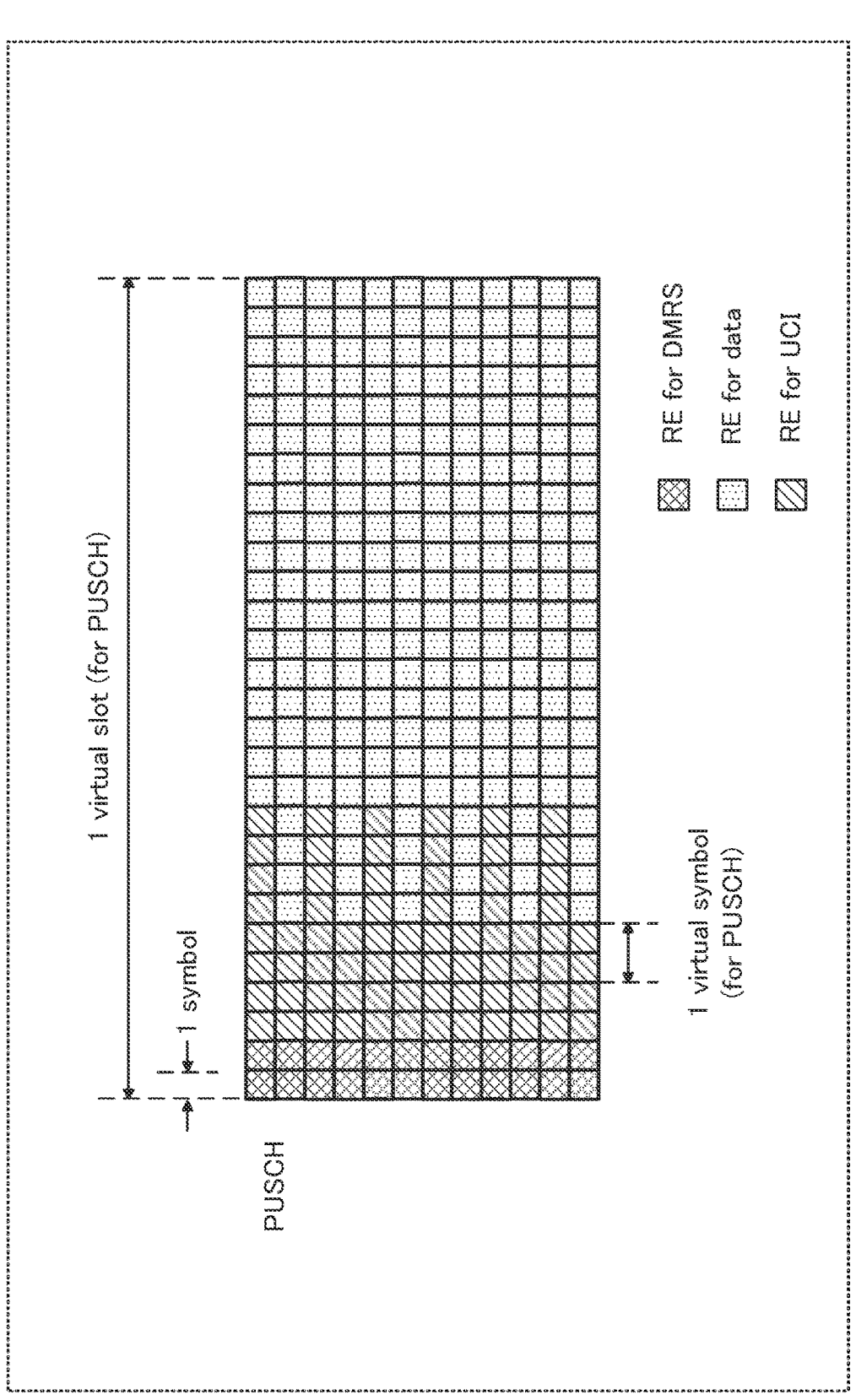
FIG. 12 illustrates another multiplexing example of UCI in PUSCH of Option 1.

FIGS. 11 and 12 each illustrates a multiplexing example of UCI in PUSCH in a case where virtualsymbolLength-ForPUCCH>virtualsymbolLength-ForPUSCH. For example, in the example illustrated in FIG. 11, virtualsymbolLength-ForPUCCH=4, and virtualsymbolLength-For-PUSCH=2.

FIG. 11 illustrates an example of resource allocation for PUCCH and PUSCH, whereas FIG. 12 illustrates an example of UCI multiplexing on PUSCH in the case of FIG. 11.

Further, the resource amount to be allocated to UCI in PUSCH, e.g., the number of Virtual resource elements is $Q'_{UCI}=18$. As mentioned above, in Option 1, since the unit of $Q'_{UCI}$ is based on virtualsymbolLength-ForPUCCH, the number of resource elements (e.g., the number of normal REs) used in transmitting UCI via PUSCH is $Q'_{UCI}\times$virtualsymbolLength-ForPUCCH. In FIG. 12, for example, the number of resource elements used in transmitting UCI via PUSCH is $Q'_{UCI}\times$virtualsymbolLength-ForPUCCH=18× 4=72 resource elements.

In Option 1, as illustrated in FIG. 11, when the number of times of Repetition for PUCCH is greater than the number of times of Repetition for PUSCH, e.g., when a value of virtualsymbolLength-ForPUCCH is greater than a value of virtualsymbolLength-ForPUSCH, the amount of resources used for UCI in PUSCH can be allocated to the number of times of Repetition used for PUCCH. In other words, the amount of resource used for UCI in PUSCH need not to be matched with the number of times of Repetition for PUSCH. For this reason, the coverage property of PUCCH can be maintained without allocating, to UCI in PUSCH, less resources depending on the number of times of Repetition for PUSCH.

Next, a description will be given of an exemplary method of calculating the resource amount to be allocated to UCI in PUSCH, the number of Virtual resource elements, $Q'_{UCI}$.

$Q'_{UCI}$ may be calculated according to following Expression 1, for example.

[1]

$$Q'_{UCI} = \min\left\{\left\lceil \frac{(O_{UCI} + L_{UCI}) \cdot \beta_{offset}^{UCI}}{R \cdot Q_m} \right\rceil, \lceil \alpha \cdot N_{virtualRE} \rceil \right\} \quad \text{(Expression 1)}$$

The variables illustrated in Expression 1 represent the following parameters, respectively:

$O_{UCI}$: the number of UCI bits;

$L_{UCI}$: the number of Cyclic Redundancy Check (CRC) bits for UCI;

$\beta_{Offset}^{UCI}$: a parameter for controlling coding rate of UCI;

R: a coding rate of PUSCH;

$Q_m$: a modulation order of PUSCH;

$N_{virtualRE}$: the number of valid virtual resource elements in PUSCH; and

α: a parameter for controlling upper limit of a resource amount to be allocated to HARQ-ACK PUSCH.

Incidentally, UCI may be HARQ-ACK, CSI or SR, for example.

Further, the method of calculating the resource amount to be allocated to UCI in PUSCH is not limited to Expression 1. In one example, in Expression 1, the terms of R and $Q_m$ that are determined from the coding rate and the modulation index of PUSCH may be determined based on the number of code blocks transmitted via PUSCH and the number of valid resource elements in PUSCH.

Further, for example, the portion of "A" in min {A, B} of Expression 1 represents the resource amount used for UCI, and the portion of "B" represents the upper limit of the resource amount. In Option 1, terminal 200 may multiplex UCI with PUSCH within a range that the resource amount used for UCI ("A") does not exceed the upper limit ("B"), for example.

Meanwhile, in a case where the resource amount used for UCI ("A") exceeds the upper limit ("B"), terminal 200 may drop a part of UCI and multiplex UCI with PUSCH within the resource amount corresponding to the upper limit, for example. Alternatively, terminal 200 may drop transmission of PUSCH (e.g., uplink data) and multiplex UCI with PUSCH, for example. Instead, terminal 200 may drop transmission of UCI via PUSCH and transmit UCI using PUCCH, for example.

<Option 2>

In Option 2, when resources overlap in time between PUCCH and PUSCH, terminal 200 determines to multiplex UCI with PUSCH.

Meanwhile, in Option 2, a unit of resource amount $Q'_{UCI}$ to be allocated to UCI in PUSCH is based on, for example, a Virtual symbol of PUSCH, e.g., virtualsymbolLength-ForPUSCH. By way of example, base station 100 and terminal 200 configure the resource amount to be allocated to UCI in PUSCH, based on the number of a plurality of Normal symbols (e.g., virtualsymbolLength-ForPUSCH) composing a Virtual symbol in PUSCH.

Here, in NR, a unit of resource amount $Q'_{UCI}$ to be allocated to UCI in PUSCH is, for example, one subcarrier in a frequency-domain and a resource element (RE) that is a domain specified by one OFDM symbol in a time-domain.

By contrast, in Option 2, the unit of resource amount $Q'_{UCI}$ to be allocated to UCI in PUSCH is, for example, one subcarrier in a frequency-domain and a domain specified by one Virtual symbol in a time-domain ("Virtual resource element"). For example, the Virtual resource element may include resource elements of virtualsymbolLength-For-PUSCH.

Figure 13:
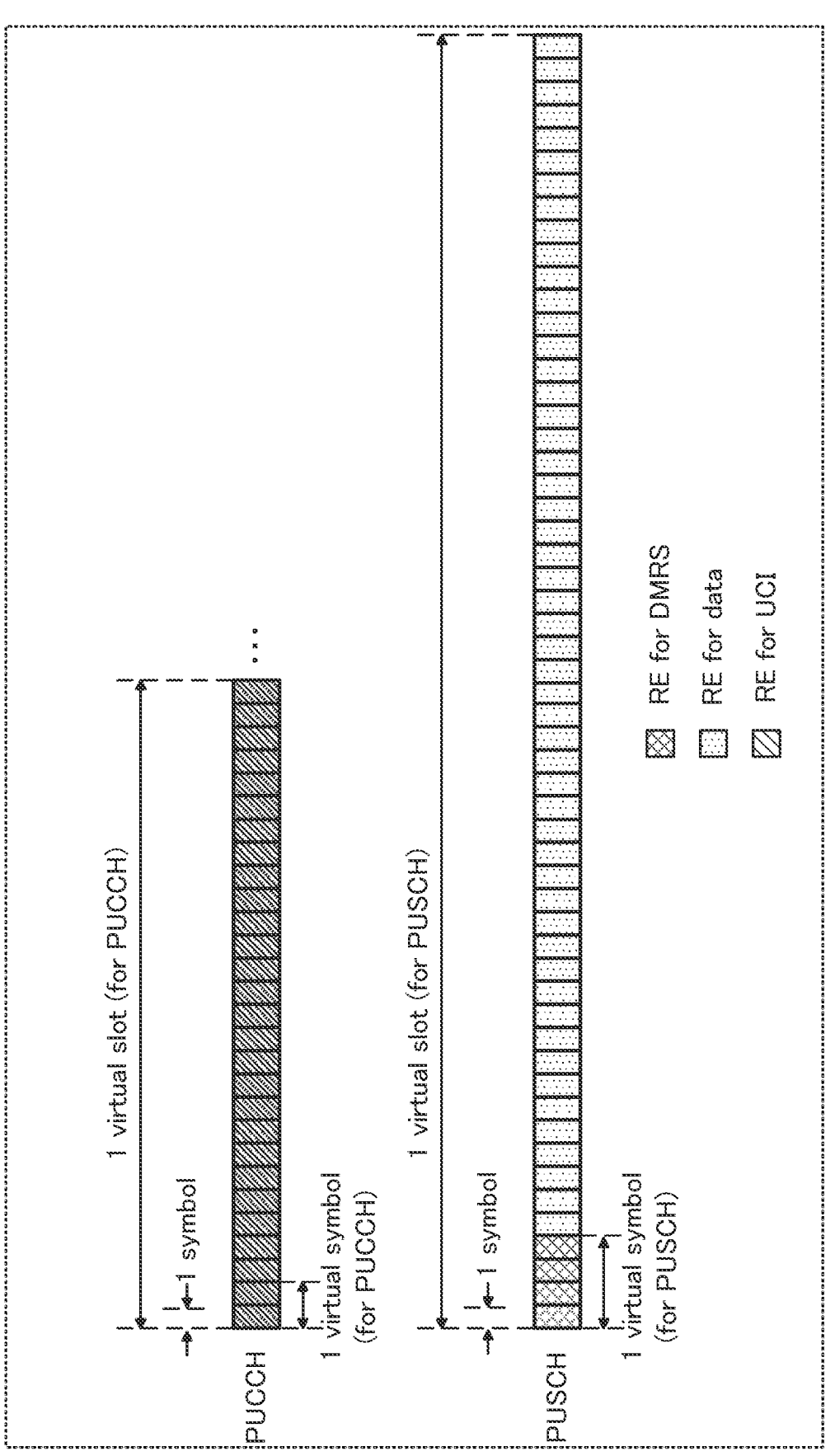
FIG. 13 illustrates configuration examples of PUCCH and PUSCH of Option 2.
Figure 14:
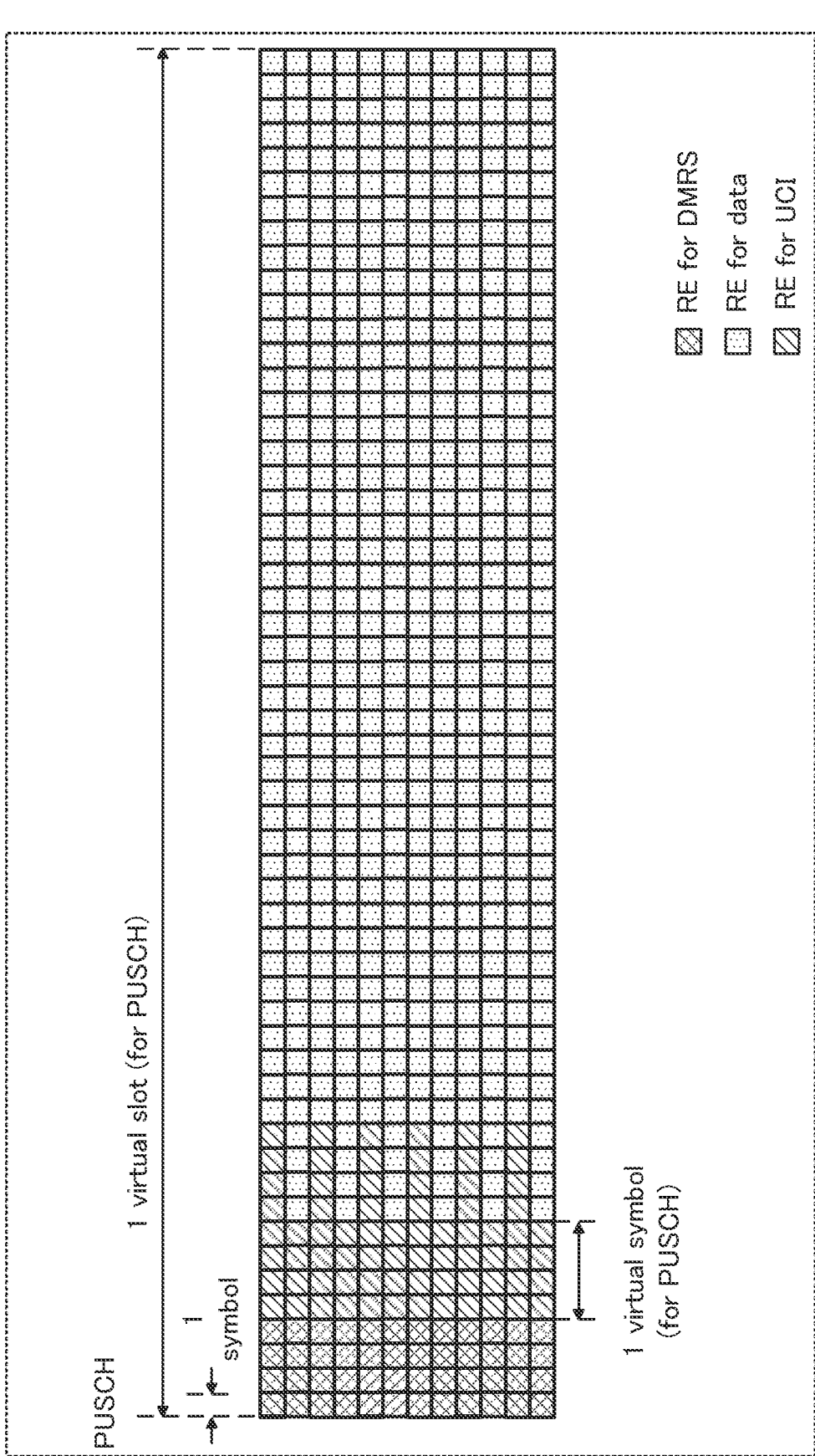
FIG. 14 illustrates a multiplexing example of UCI in PUSCH of Option 2.

FIGS. 13 and 14 each illustrates a multiplexing example of UCI in PUSCH in a case where virtualsymbolLength-ForPUCCH<virtualsymbolLength-ForPUSCH. For example, in the example illustrated in FIG. 13, virtualsymbolLength-ForPUCCH=2, and virtualsymbolLength-ForPUSCH=4.

FIG. 13 illustrates an example of resource allocation for PUCCH and PUSCH, whereas FIG. 14 illustrates an example of UCI multiplexing on PUSCH in the case of FIG. 13.

Further, the resource amount to be allocated to UCI in PUSCH, e.g., the number of Virtual resource elements is $Q'_{UCI}$=18. As mentioned above, in Option 2, since the unit of $Q'_{UCI}$ is based on virtualsymbolLength-ForPUSCH, the number of resource elements (e.g., the number of normal REs) used in transmitting UCI via PUSCH is $Q'_{UCI}$×virtualsymbolLength-ForPUSCH. In FIG. 14, for example, the number of resource elements used in transmitting UCI via PUSCH is $Q'_{UCI}$×virtualsymbolLength-ForPUSCH=18× 4=72 resource elements.

In Option 2, as illustrated in FIG. 14, since the resource amount used for UCI in PUSCH is configured based on the number of times of Repetition for PUSCH, resource mapping for OFDM symbols in a virtual symbol of PUSCH can be commonly configured between UCI and data. Therefore, for example, coherent combination in units of symbols including the data and UCI can be easily achieved at base station 100.

Figure 15:
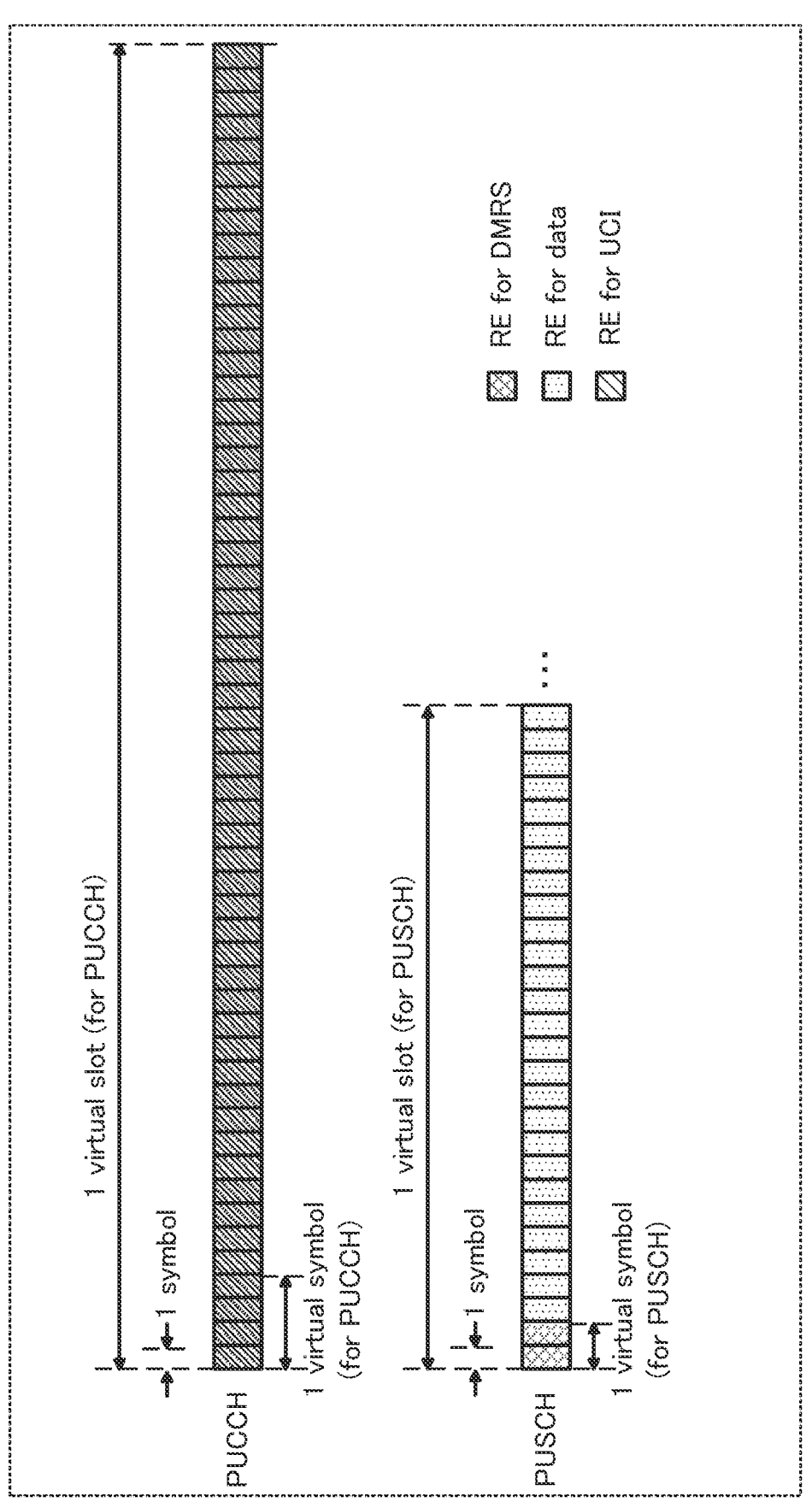
FIG. 15 illustrates other configuration examples of PUCCH and PUSCH of Option 2.
Figure 16:
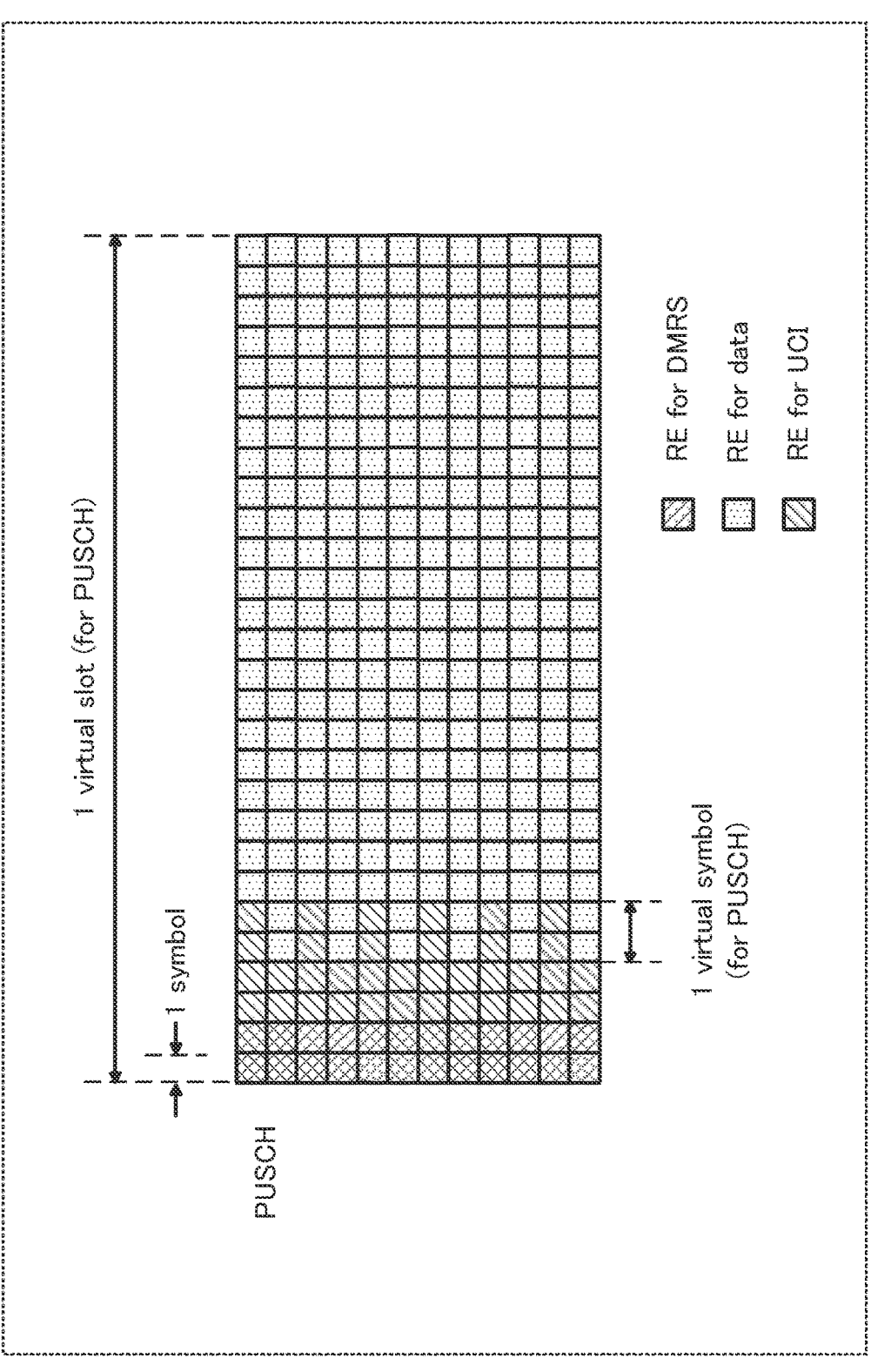
FIG. 16 illustrates another multiplexing example of UCI in PUSCH of Option 2.

FIGS. 15 and 16 each illustrates a multiplexing example of UCI in PUSCH in a case where virtualsymbolLength-ForPUCCH>virtualsymbolLength-ForPUSCH. For example, in the example illustrated in FIG. 15, virtualsymbolLength-ForPUCCH=4, and virtualsymbolLength-For-PUSCH=2.

FIG. 15 illustrates an example of resource allocation for PUCCH and PUSCH, whereas FIG. 16 illustrates an example of UCI multiplexing on PUSCH in the case of FIG. 15.

Further, the resource amount to be allocated to UCI in PUSCH, e.g., the number of Virtual resource elements is $Q'_{UCI}$=18. As mentioned above, in Option 2, since the unit of $Q'_{UCI}$ is based on virtualsymbolLength-ForPUSCH, the number of resource elements (e.g., the number of normal REs) used in transmitting UCI via PUSCH is $Q'_{UCI}$×virtualsymbolLength-ForPUSCH. In FIG. 16, for example, the number of resource elements used in transmitting UCI via PUSCH is $Q'_{UCI}$×virtualsymbolLength-ForPUSCH=18× 2=36 resource elements.

In Option 2, as illustrated in FIG. 16, since the resource amount used for UCI in PUSCH is configured based on the number of times of Repetition for PUSCH, resource mapping for OFDM symbols in a virtual symbol of PUSCH can be commonly configured between UCI and data. Therefore, for example, coherent combining in units of symbols including the data and UCI can be easily achieved at base station 100.

Next, a description will be given of an exemplary method of calculating the resource amount to be allocated to UCI in PUSCH, e.g., the number of Virtual resource elements, $Q'_{UCI}$.

$Q'_{UCI}$ may be calculated according to following Expression 2, for example.

[2]

$$Q'_{UCI} = \min\left\{ \left\lceil \frac{(O_{UCI} + L_{UCI}) \cdot \beta_{offset}^{UCI}}{R \cdot Q_m} \right\rceil, \lceil \alpha \cdot N_{virtualRE} \rceil \right\} \quad \text{(Expression 2)}$$

The variables illustrated in Expression 2 represent the following parameters, respectively:

$O_{UCI}$: the number of UCI bits;

$L_{UCI}$: the number of CRC bits for UCI;

$\beta_{Offset}^{UCI}$: a parameter for controlling coding rate of UCI;

R: a coding rate of PUSCH;

$Q_m$: a modulation order of PUSCH;

$N_{virtualRE}$: the number of valid virtual resource elements in PUSCH; and

α: a parameter for controlling upper limit of a resource amount to be allocated to HARQ-ACK in PUSCH.

Incidentally, UCI may be HARQ-ACK, CSI or SR, for example.

Further, the method of calculating the resource amount to be allocated to UCI in PUSCH is not limited to Expression 2. In one example, in Expression 2, the terms of R and Qm that are determined from the coding rate and the modulation index of PUSCH may be determined based on the number of code blocks transmitted via PUSCH and the number of valid resource elements in PUSCH.

Further, for example, the portion of "A" in min {A, B} of Expression 2 represents the resource amount used for UCI, and the portion of "B" represents the upper limit of the resource amount. In Option 2, terminal 200 may multiplex UCI with PUSCH within a range that the resource amount used for UCI ("A") does not exceed the upper limit ("B"), for example.

Meanwhile, in a case where the resource amount used for UCI ("A") exceeds the upper limit ("B"), terminal 200 may drop a part of UCI and multiplex UCI with PUSCH within the resource amount corresponding to the upper limit, for example. Alternatively, terminal 200 may drop transmission of PUSCH (e.g., uplink data) and multiplex UCI with PUSCH, for example. Instead, terminal 200 may drop transmission of UCI via PUSCH and transmit UCI using PUCCH, for example.

Option 1 and Option 2 have been each described, thus far.

Incidentally, in a case where the number of times of Repetition for PUCCH and the number of times of Repetition for PUSCH are identical, e.g., when virtualsymbol-Length-ForPUCCH=virtualsymbolLength-ForPUSCH, base station 100 and terminal 200 may apply either Option 1 or Option 2 described above.

<Variation 1>

For example, when the number of times of Repetition for PUCCH is different from the number of times of Repetition for PUSCH, base station 100 and terminal 200 may configure a unit of resource amount $Q'_{UCI}$ to be allocated to UCI in PUSCH, based on a Virtual symbol (e.g., the number of OFDM symbols composing Virtual symbol) of a channel having a greater number of times of Repetition. By way of example, base station 100 and terminal 200 may determine the unit of resource amount $Q'_{UCI}$ based on max(virtualsymbolLength-ForPUCCH, virtualsymbolLength-ForPUSCH).

As described above, in NR, the unit of resource amount $Q'_{UCI}$ to be allocated to UCI in PUSCH is one subcarrier in the frequency-domain and a resource element that is a domain specified by one OFDM symbol in the time-domain. By contrast, in Variation 1, the unit of resource amount gun is, for example, one subcarrier in a frequency-domain and a Virtual resource element specified by one Virtual symbol in a time-domain.

The virtual resource element includes, for example, resource elements of max(virtualsymbolLength-ForPUCCH, virtualsymbolLength-ForPUSCH).

In Variation 1, for example, Option 1 is applied in a case where virtualsymbolLength-ForPUCCH>virtualsymbolLength-ForPUSCH, whereas Option 2 is applied in a case where virtualsymbolLength-ForPUCCH<virtualsymbolLength-ForPUSCH.

According to Variation 1, for example, terminal 200 can transmit PUSCH while multiplexing thereon UCI for which the number of times of Repetition is configured according to the channel having a greater number of times of Repetition, of PUCCH and PUSCH, and thus, the coverage performance of PUCCH and PUSCH can be maintained.

<Variation 2>

In Variation 2, for example, when a transmission resource for PUCCH including UCI and a transmission resource for PUSCH overlap in time, base station 100 and terminal 200 may determine whether terminal 200 transmits UCI by multiplexing with PUSCH, based on the number of times of Repetition for each of PUCCH and PUSCH (e.g., relation between virtualsymbolLength-ForPUCCH and virtualsymbolLength-ForPUSCH).

In one example, in a case where virtualsymbolLength-ForPUCCH>virtualsymbolLength-ForPUSCH, base station 100 and terminal 200 may determine not to multiplex UCI with PUSCH. In this case, terminal 200 may, for example, drop transmission of PUSCH and transmit PUCCH including UCI.

In contrast, for example, in a case where virtualsymbolLength-ForPUCCH≤virtualsymbolLength-ForPUSCH, base station 100 and terminal 200 may determine to transmit UCI by multiplexing with PUSCH. In this case, terminal 200 may transmit UCI by multiplexing with PUSCH based on the above-described method (e.g., Option 1 or Option 2).

As described above, the degree of coverage enhancement for achieving the target performance is higher in PUSCH compared to PUCCH, and thus, a greater umber of times of Repetition can be configured for PUSCH compared to PUCCH. According to Variation 2, in the case of significant deterioration of the coverage performance of PUCCH for UCI transmission with high-priority such as HARQ-ACK (e.g., when virtualsymbolLength-ForPUCCH>virtualsymbolLength-ForPUSCH), terminal 200 may give priority on the UCI transmission over the PUSCH transmission, and in other cases, terminal 200 may transmit UCI, which is to be transmitted via PUCCH, by multiplexing with PUSCH. This prevents deterioration of the coverage performance or the transmission efficiency of PUSCH.

[Configuration Examples of Virtual Symbol and Virtual Slot]

When virtualsymbolLength is configured, for example, base station 100 and terminal 200 may apply the symbol-level Repetition and configure a Virtual symbol and a Virtual slot to and for a target channel/signal.

As mentioned above, a Virtual symbol is, for example, a time-resource unit composed of OFDM symbols (i.e., Normal symbols) of consecutive virtualsymbolLength. In addition, for example, in the case of Normal CP, a Virtual slot is a time-resource unit composed of 14 consecutive Virtual symbols or consecutive OFDM symbols of 14×virtualsymbolLength.

Here, a Virtual symbol and a Virtual slot may be configured by any of the following two Options FS-1 and FS-2 based on, for example, an association with a Normal symbol, a Normal slot, a sub-frame, or a frame.

<Option FS-1>

In Option FS-1, a Virtual slot may start from the starting position of a Normal slot, for example.

Figure 17:
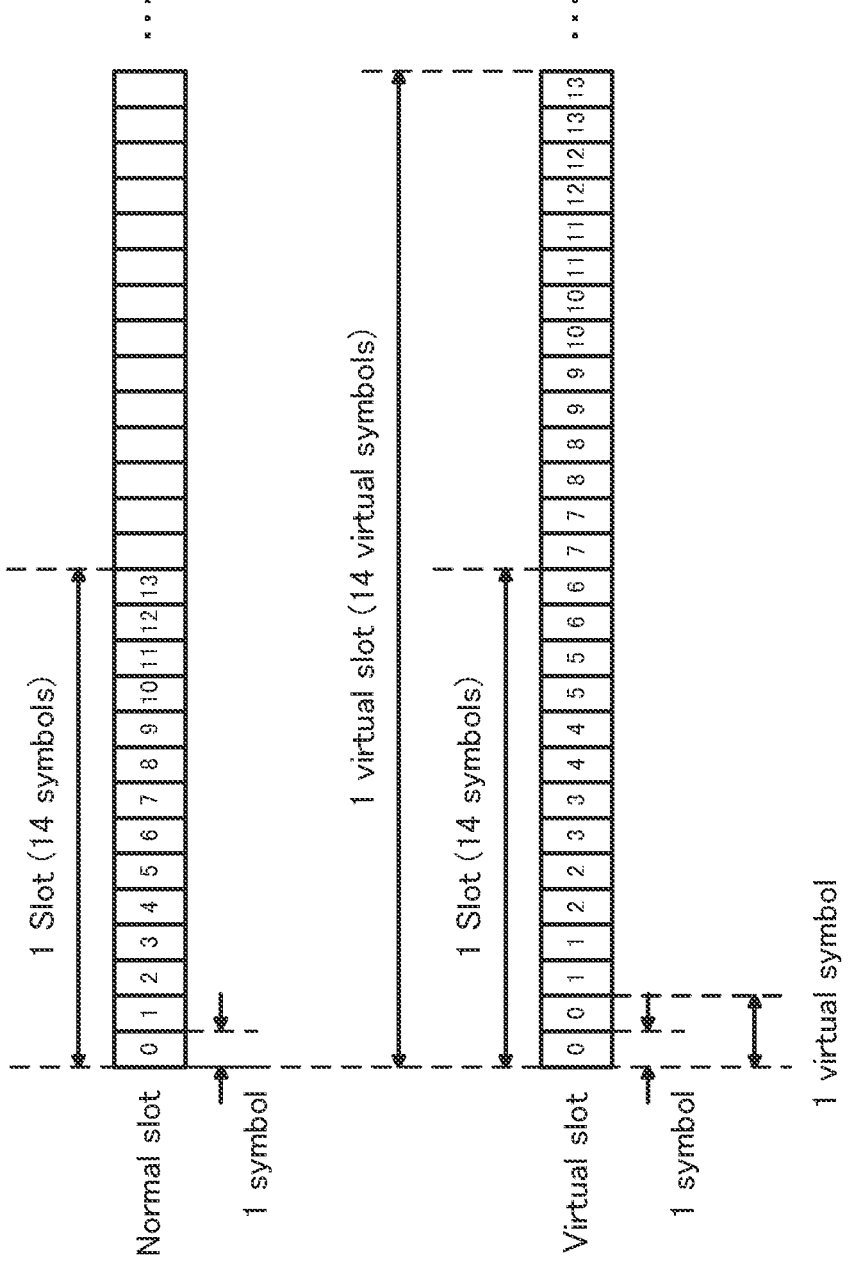
FIG. 17 illustrates configuration examples of Virtual symbols and a Virtual slot according to Option FS-1.

FIG. 17 illustrates a configuration example when virtualsymbolLength=2. In Option FS-1, as illustrated in FIG. 17, the 0-th. Normal symbol (e.g., Normal symbol #0-0) included in the first Virtual symbol (e.g., Virtual symbol #0) configuring the Virtual slot matches the first symbol in position (e.g., Normal symbol #0) configuring the Normal slot (e.g., starting position of Virtual slot).

Next, an exemplary configuration of virtualsymbolLength in Option FS-1 will be described.

(Option FS-1-1)

In Option FS-1-1, virtualsymbolLength (i.e., number of symbols composing Virtual symbol) may be set to a power of 2.

Figure 18:
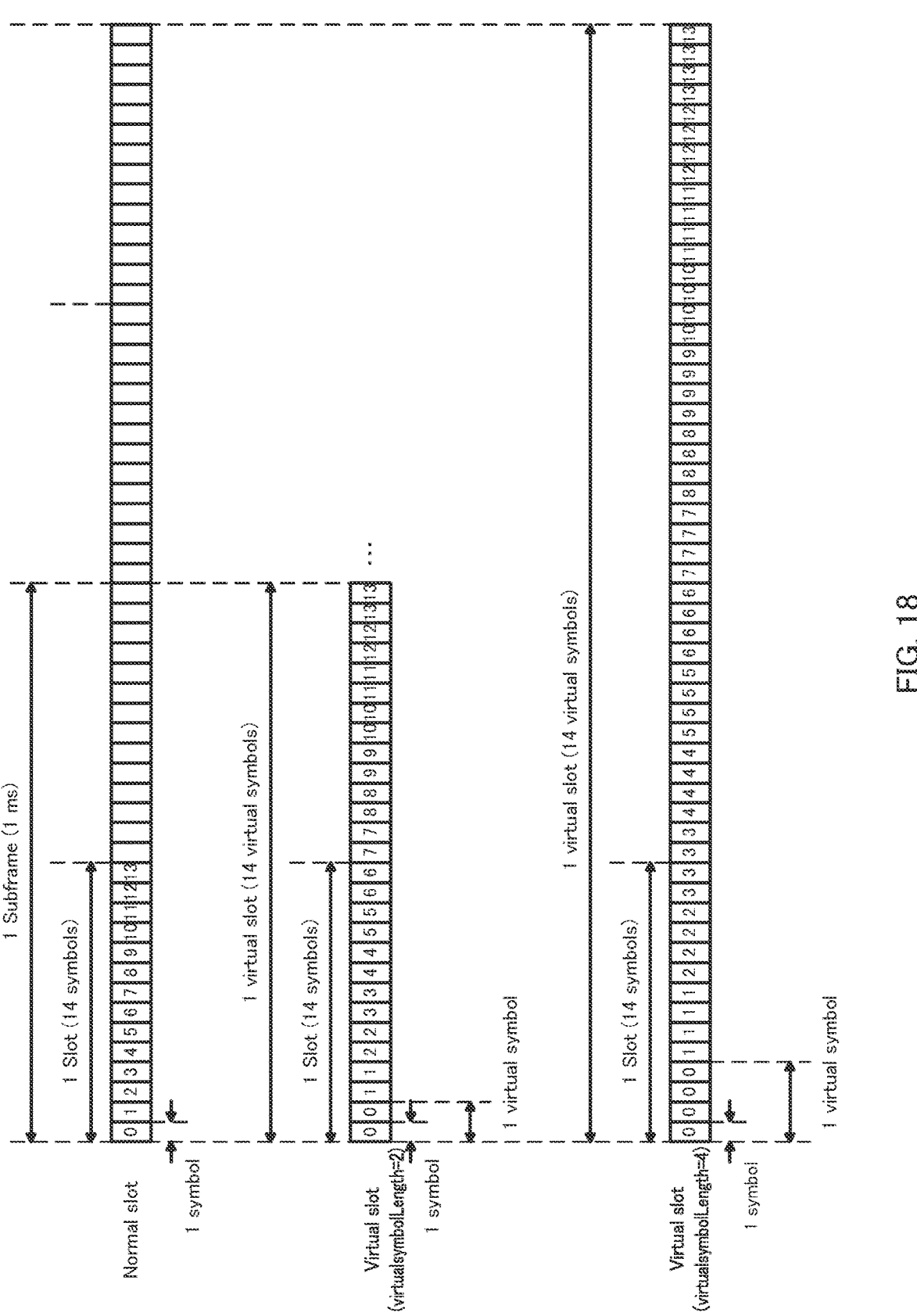
FIG. 18 illustrates configuration examples of Virtual symbols and Virtual slots according to Option FS-1-1.

FIG. 18 illustrates a configuration example of virtualsymbolLength=2 (=$2^1$) and virtualsymbolLength=4 (=$2^2$) when SCS=30 kHz. As illustrated in FIG. 18, in Option FS-1-1, for example, even when different virtualsymbolLengths are configured, the Virtual slot boundary and the sub-frame boundary in the Normal slot configuration can be matched.

Further, in NR, for example, on the basis of 15 kHz SCS, SCS of power of 2 (e.g., 30 kHz SCS, 60 kHz SCS, 120 kHz SCS, or 240 kHz SCS) is supported. Thus, for example, configurations of Virtual symbols and a Virtual slot corresponding to virtualsymbolLength resulting from multiplication (power of 2) can be time-resource units similar to configurations of Normal symbols and a Normal slot in which SCS is multiplied by one with a power of 2.
(Option FS-1-2)

In Option FS-1-2, for example, in the case of Normal CP, virtualsymbolLength (in other words, number of symbols composing Virtual symbol) may be set to any value of 2, 7, and 14 and an integral multiple of 14.

Figure 19:
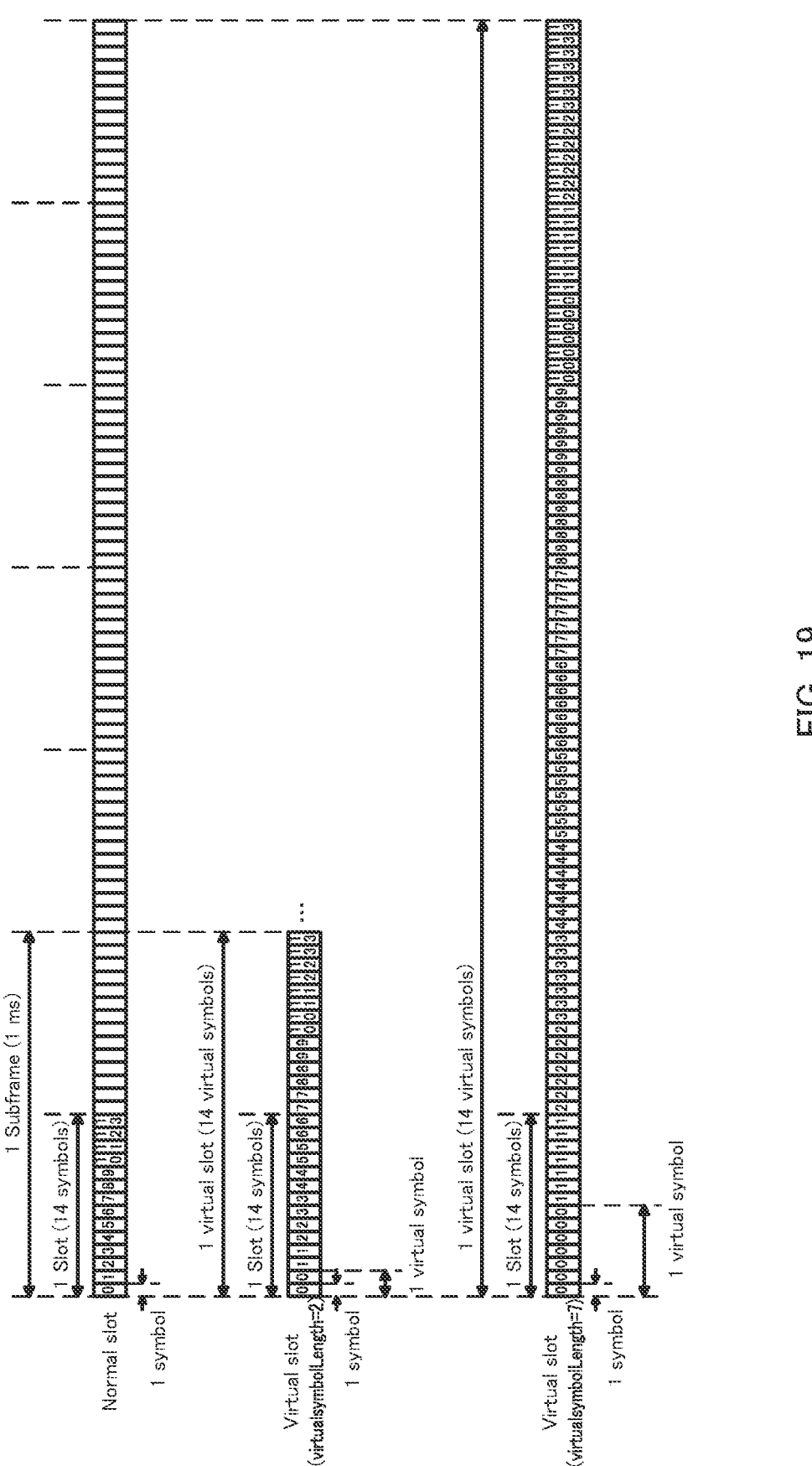
FIG. 19 illustrates configuration examples of Virtual symbols and Virtual slots according to Option FS-1-2.

FIG. 19 illustrates a configuration example of virtualsymbolLength=2 and virtualsymbolLength=7 when SCS=30 kHz. As illustrated in FIG. 19, in Option FS-1-2, for example, even when different values of virtualsymbolLengths are configured, the Virtual slot boundary and the slot boundary in the Normal slot configuration can be matched.

For example, when a terminal (in other words, terminal using Normal symbol and Normal slot) to which the symbol-level Repetition is not applied is present in a cell, matching a Virtual slot boundary and a Normal slot boundary is advantageous in that the terminal and terminal 200 can easily coexist in scheduling or the like.

Incidentally, when using the extended CP, the same effect as in the Normal CP can be obtained by setting a value that can be configured as virtualsymbolLength to, for example, any of values of 2, 6, and 1:2 and an integral multiple of 1.2. In other words, in Option ES-1-2, virtualsymbolLength (e.g., number of Normal symbols composing Virtual symbol) may, be configured based on the number of Normal symbols configuring a Normal slot.
(Option FS-1-3)

When a Virtual slot boundary and a Normal slot boundary are matched in Option FS-1-2, a granularity of a value that can be configured as virtualsymbolLength may be any of values of 2, 7, and 14 and an integral multiple of 14; thus, it may be impossible to flexibly support the coverage enhancement level.

Hence, in Option ES-1-3, for example, the number of Normal symbols virtualsymbolLength) included in a Virtual symbol configuring a Virtual slot may be uneven among Virtual symbols. In Option FS-1-3, a Virtual slot boundary matches a Normal slot boundary.

Figure 20:
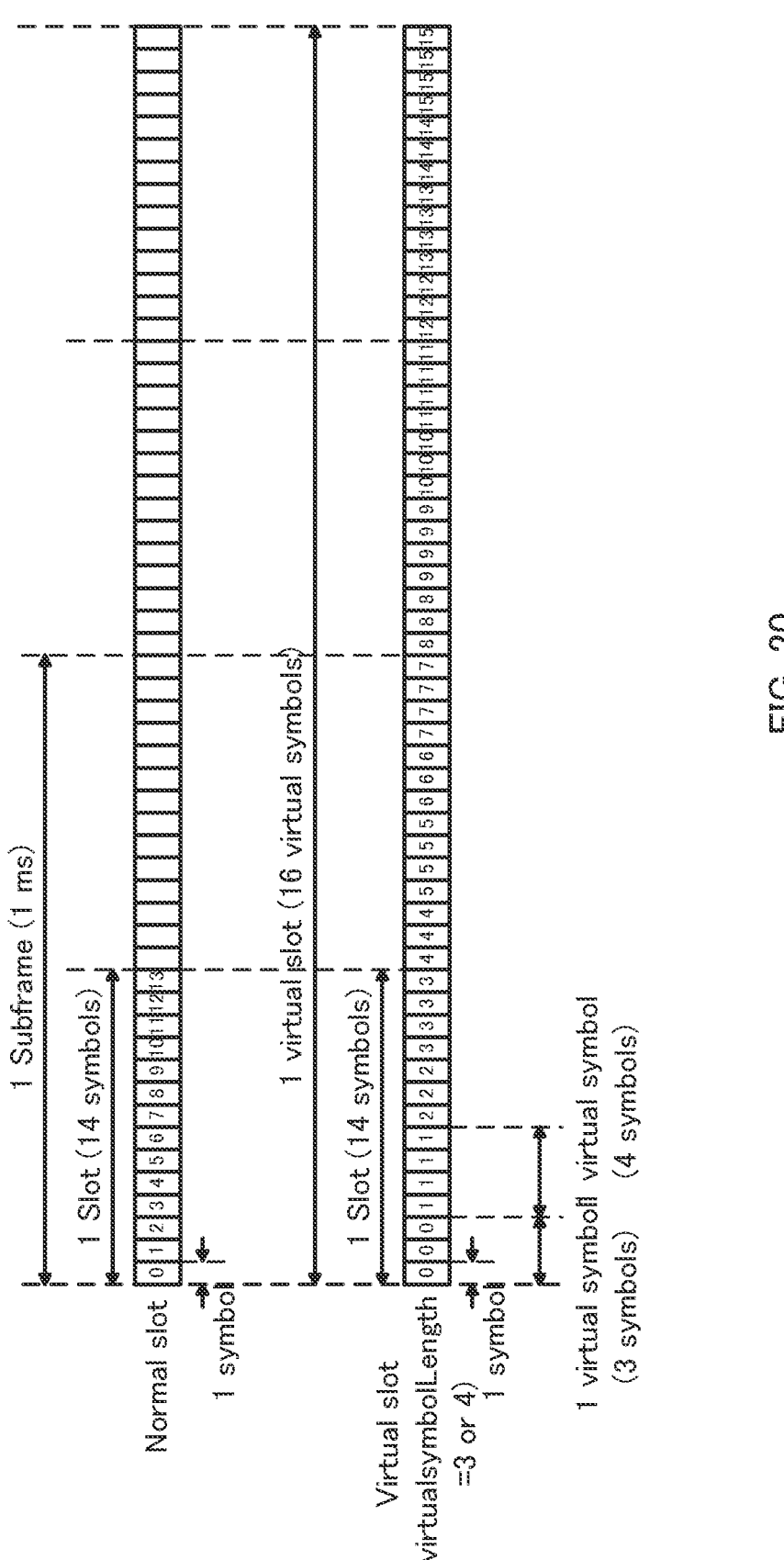
FIG. 20 illustrates configuration examples of Virtual symbols and a Virtual slot according to Option FS-1-3.

FIG. 20 illustrates a configuration example of a Virtual slot with Virtual symbols of virtualsymbolLength=3 and virtualsymbolLength=4 when SCS=30 kHz.

In FIG. 20, for example, a Virtual symbol composed of three OFDM symbols and a Virtual symbol composed of four OFDM symbols are included. That is, the number of Normal symbols (i.e., virtualsymbolLength) composing one of at least two Virtual symbols included in a Virtual slot is different from the number of Normal symbols composing the other one of the at least two Virtual symbols.

Further, in FIG. 20, for example, a slot boundary of the Normal slot configuration matches a Virtual symbol boundary. That is, in FIG. 20, a duration of each Virtual symbol does not cross a Normal slot boundary.

According to Option FS-1-3, for example, as in Option FS-1-2, even when a terminal to which the symbol-level Repetition is not applied and a terminal to which the symbol-level Repetition is applied are present in a cell, matching a Virtual slot boundary and a Normal slot boundary is advantageous in that the terminals can easily coexist in scheduling or the like. Further, in Option FS-1-3 can achieve a coverage enhancement with finer granularity (e.g., granularity different from 2, 7, and 14 and integral multiple of 14) as compared to Option FS-1-2.

Note that, in Option FS-1-3, for example, it is not necessary to define a time-resource unit as a Virtual slot, the time-resource unit being composed of 14 Virtual symbols (in case of Normal CP) in the same number of symbols as OFDM symbols included in a Normal slot configuration, as described in [Configuration Examples of Symbol-level Repetition, Virtual Symbol, and Virtual Slot]. In other words, the number of Virtual symbols included in a Virtual slot may be different from the number of OFDM symbols included in a Normal slot.
(Option FS-1-4)

In Option FS-1-4, an upper limit value may be provided to a value that can be configured as virtualsymbolLength. For example, the upper limit value of a Normal symbol composing a Virtual symbol may be less than the number of Normal symbols configuring a Normal slot. For example, in the case of Normal CP, the upper limit value may be a value less than 14, such as 7 or 4.

In NR, for example, base station 100 can flexibly configure the type of slot or the type of symbol in the slot (e.g., downlink symbol, uplink symbol, or Flexible symbol). For example, when the symbol-level Repetition is applied, it is desirable that the common symbol type is configured for a time duration of the number of Normal symbols configured as virtualsymbolLength.

For example, the larger a value of virtualsymbolLength is, the greater the number of Normal symbols composing a Virtual symbol (e.g., number of consecutive symbols of the same symbol type) is, and thus, it may be impossible to flexibly cope with a traffic situation in a cell. Therefore, for example, with respect to virtualsymbolLength to which the symbol-level Repetition is applied, the smaller a value is configured as the upper limit value, the easier to achieve a flexible TDD pattern is.

Incidentally, a method will be described later for compensating for the coverage enhancement effect against a decrease in the number of times of Repetition applicable to the symbol-level Repetition.

Option FS-1 has been described, thus far.

Meanwhile, any of Options FS-1-1 to FS-1-4 may be combined with each other. By way of example, Option FS-1-1 and Option FS-1-4 may be combined, so that values that can be configured as virtualsymbolLength may be 1, 2, or 4. In NR, a frame of 10 ms is adopted in addition to the time-resource units called a slot and a subframe. For example, when virtualsymbolLength=2, a Virtual slot boundary can be matched with a frame boundary of the Normal slot configuration, which is advantageous in that an operation of System Frame Number (SFN) can be facilitated. Further, for example, when virtualsymbolLength=4, a Virtual slot boundary can be matched with a frame boundary of the Normal slot configuration at every 20 ms. In the operation in NR, for example, a transmission spacing for a synchronization signal (SS)/physical broadcast channel (PBCH) Block (SSB) used in an initial access is assumed to be 20 ms, which is highly consistent with the operation of SSB.
<Option FS-2>

In Option FS-2, a Virtual slot may start from any symbol position of a Normal slot, for example.

Figure 21:
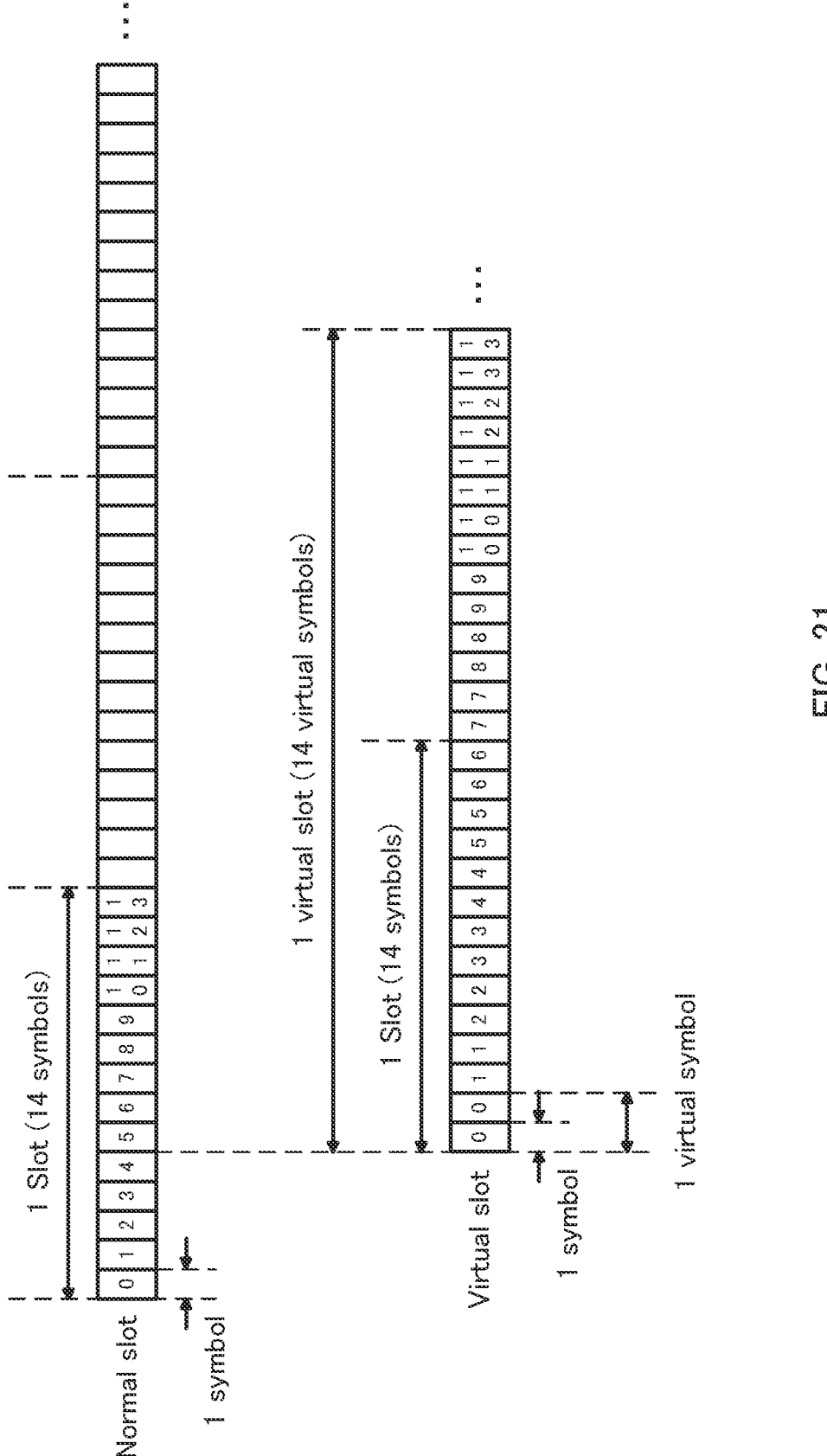
FIG. 21 illustrates configuration examples a Virtual slot according to Option FS-2.

FIG. 21 illustrates a configuration example of virtualsymbolLength=2. In Option FS-2, as illustrated in FIG. 21, a Virtual slot starts from the fifth symbol (Normal symbol #5) of the Normal slot. In other words, the position (i.e., starting position of Virtual slot) of the 0th Normal symbol (Normal symbol #0-0) included in the first Virtual symbol #0 configuring the Virtual slot matches the position of the fifth symbol (Normal symbol #5) in the Normal slot.

According to Option FS-2, for example, in the symbol-level Repetition, resource allocation can be performed more flexibly than in the time domain resource allocation described later.

[Resource Allocation]

The time domain resource allocation for PUTSCH and PUCCH transmitted by terminal 200 may be determined (i.e., identified) based on, for example, a Virtual symbol or a Virtual slot.

In the following, a description will be given of determination examples for a time domain resources.

<Option RA-1>

In Option RA-1, for example, base station 100 and terminal 200 may determine (i.e., identify) a time domain resource for communication, based on a Virtual symbol and a Virtual slot. That is, in Option RA-1, for example, a Normal slot and a Normal symbol need not be used for identifying the time domain resource.

Option RA-1 may be applied to, for example, Option FS-1 described above.

Hereinafter, a description will be given of examples of applying Option RA-1 to PUSCH and PUCCH.

(Option RA-1: PUSCH)

Terminal 200 may, for example, transmit PUSCH according to at least one of resource allocation indicated by DCI in PDCCH from base station 100 and resource allocation previously configured by a higher layer signaling (e.g., RRC signal).

Here, the control information included in DCI or the control information previously configured by the higher layer signaling may include, for example, information on a time domain resource in which PUSCH is transmitted (e.g., TDRA information).

The time domain resource information may include, for example, information on a timing, e.g., terminal 200 transmits PUSCH how many Virtual slots later from the Virtual slot in which PDCCH has been received (e.g., may be referred to as "$K_2$" or Virtual slot offset), information on the start Virtual symbol position of PUSCH in a Virtual slot (e.g., "$S_{PUSCH}$" or starting Virtual symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$, and PUSCH mapping type) may be semi-statically configured by an UE-specific higher layer signaling (RRC signal), and a combination to be used from the TDRA table may be configured by a dynamic indication such as DCI or a previous configuration by the higher layer signaling (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e.g., SLIV).

For example, a Virtual slot in which terminal 200 transmits PUSCH may be identified according to following Expression 3.

[3]

$$\left\lfloor n \cdot \frac{2^{\mu_{PUSCH}}}{2^{\mu_{PDCCH}}} \cdot \frac{virtualsymbolLengthForPDCCH}{virtualsymbolLengthForPUSCH} \right\rfloor + K_2 \quad \text{(Expression 3)}$$

Here, n indicates a Virtual slot in which terminal 200 has received. DCI (or PDCCH) corresponding to PUSCH assignment. Further, $2^{\mu_{PUSCH}}$ indicates SCS of the carrier or the BWP that transmit PUSCH, and $2^{\mu_{PDCCH}}$ indicates SCS of the carrier or the BWP that receive DCI (or PDCCH). VirtualsymbolLengthForPDCCH indicates virtualsymbolLength applied to PDCCH including DCI corresponding to the PUSCH assignment, and virtualsymbolLengthForPUSCH indicates virtualsymbolLength applied to PUSCH transmitted by terminal 200.

For example, terminal 200 may identify the Virtual slot for transmitting PUSCH, according to Expression. In addition, terminal 200 may identify, in the identified Virtual slot, a Virtual symbol in which PUSCH transmission is started starting position), based on $S_{PUSCH}$, for example. Terminal 200 may also identify, for example, the number of Virtual symbols for transmitting PUSCH, based on $L_{PUSCH}$.

Figure 22:
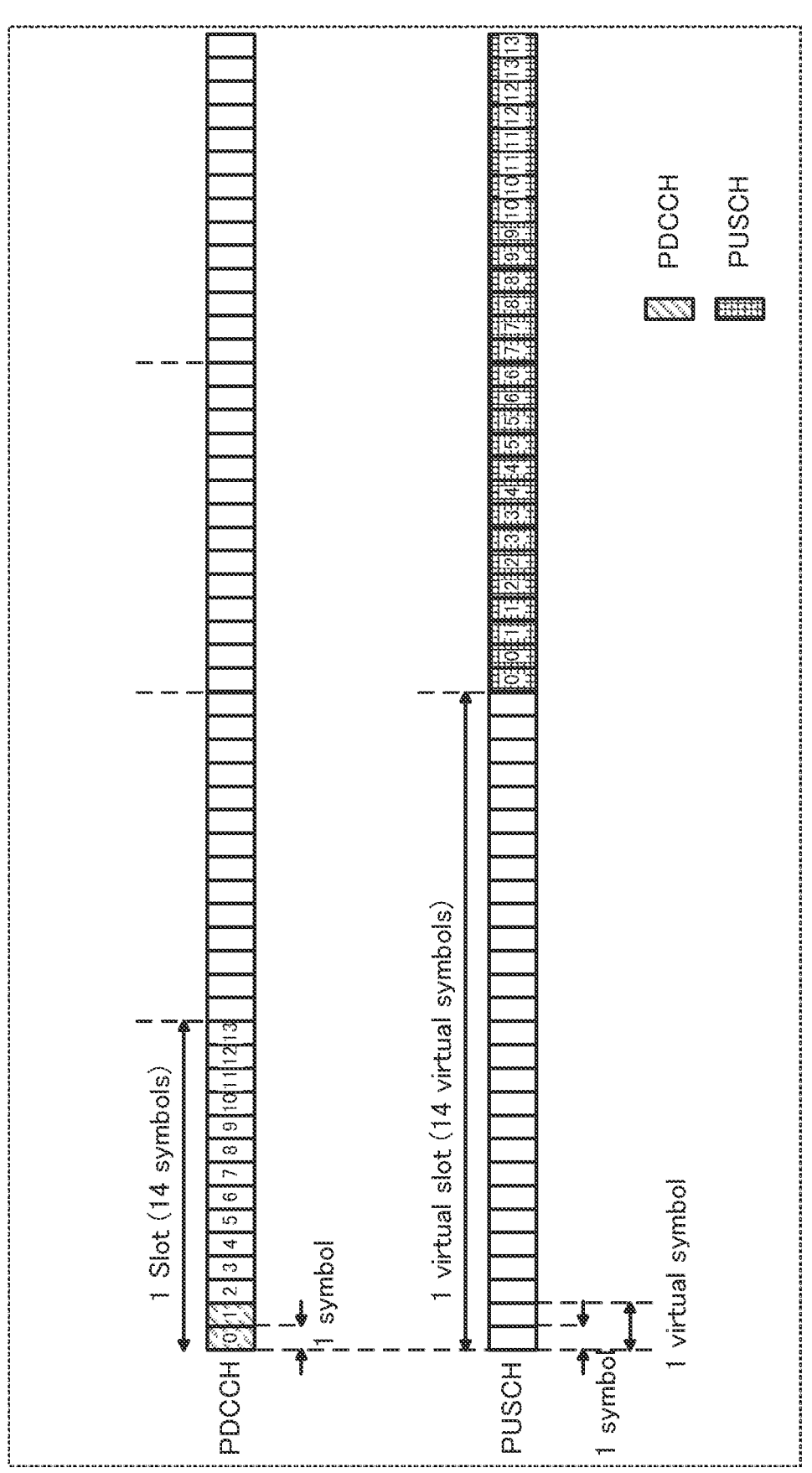
FIG. 22 illustrates an allocation example for PUSCH according to Option RA-1.

FIG. 22 illustrates an example of time domain resource allocation for PUSCH. In FIG. 22, virtualsymbolLengthForPDCCH for PDCCH=1, virtualsymbolLengthForPUSCH for PUSCH=2, $K_2$=1, $S_{PUSCH}$=0, and $L_{PUSCH}$=14.

In FIG. 22, for example, PUSCH is transmitted in Virtual symbols having $L_{PUSCH}$=14 (e.g., Virtual symbols #0 to #13) from the Virtual symbol having $S_{PUSCH}$=0 in the Virtual slot after $K_2$=1 slot from the Virtual slot in which terminal 200 has received PDCCH.

According to Option RA-1, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Note that, the time domain resource for PUSCH is identified by using a Virtual symbol and a Virtual slot, as described above. On the other hand, the signal actually transmitted by terminal 200 (e.g., PUSCH) is a signal in units of Normal symbols, and terminal 200 transmits Normal symbols of virtualsymbolLengthForPDSCH in, for example, a time duration of a Virtual symbol. For example, terminal 200 may generate, according to the PUSCH resource allocation, a complex symbol group corresponding to the number of Virtual symbols, and may replicate and map one complex symbol group to the Normal symbols of virtualsymbolLengthForPUSCH included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port trapping may be applied to a complex symbol group included in one Virtual symbol.

(Option RA-1:PUCCH)

Terminal 200, for example, may feed back, via PUCCH, ACK/NACK indicating success or failure of decoding for PDSCH. Terminal 200 may also transmit, to base station 100, another kind of UCI such as CSI or SR by using, for example, PUCCH.

Further, when transmitting ACK/NACK for PDSCH assigned by DCI, terminal 200 may transmit. PUCCH according to resource allocation indicated by DCI in PDCCH from base station 100, for example.

Here, the control information included in DCI may include, for example, information on a PUCCH resource. The PUCCH resource may be configured with, for example, a plurality of parameters.

In the PUCCH resource, the time domain resource information may include, for example, information on the start.

Virtual symbol position of PUCCH in a Virtual slot (e.g., may be referred to as "startingSymbolIndex" or starting Virtual symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 transmits PUCCH how many Virtual slots later from the Virtual slot in which PDSCH has been received (e.g., number of Virtual slots "k").

Incidentally, for CSI and SR, for example, a PUCCH resource may be designated from base station 100 to terminal 200 by a higher layer signaling (e.g., RRC signal).

For example, a Virtual slot in which terminal 200 transmits PUCCH may be identified according to following Expression 4.

[4]

$$n+k \qquad \text{(Expression 4)}$$

Here, n indicates a Virtual slot in which terminal 200 has received PDSCH. For example, k=0 may correspond to the last Virtual slot that temporally overlaps the Virtual slot in which PDSCH has been received among Virtual slots applied to PUCCH.

For example, terminal 200 may identify the Virtual slot for transmitting PUCCH, according to Expression 4. In addition, terminal 200 may identify, in the identified. Virtual slot, a Virtual symbol in which PUCCH transmission is started (i.e., starting position), based on startingSymbolIndex, for example. Terminal 200 may also identify, for example, the number of Virtual symbols for transmitting PUCCH, based on nrofSymbols.

Figure 23:
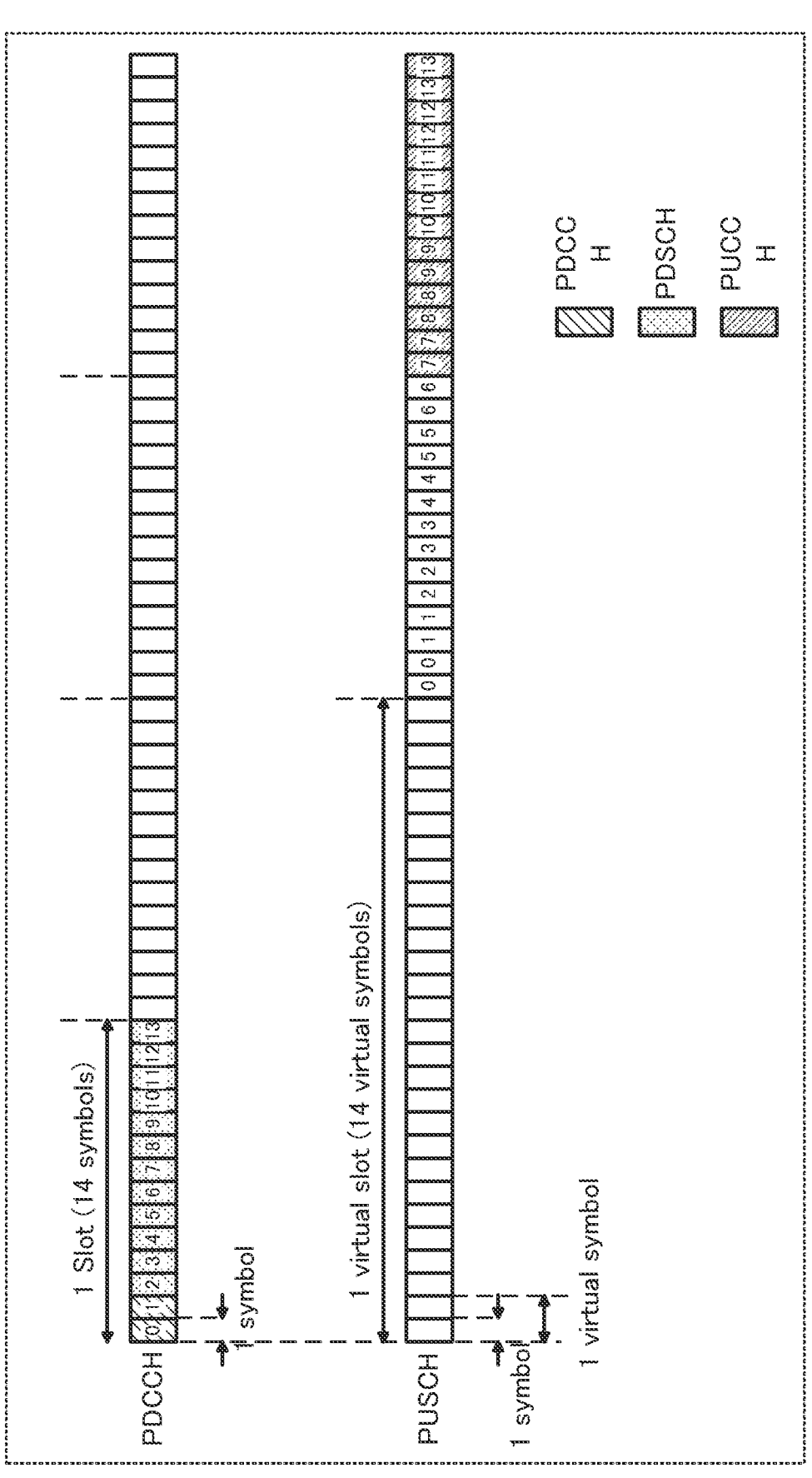
FIG. 23 illustrates an allocation example for PUCCH according to Option RA-1.

FIG. 23 illustrates an example of time domain resource allocation for PUCCH. In FIG. 23, virtualsymbolLengthForPDCCH=virtualsymbolLengthForPDSCH=1, which are respectively for PDCCH and PDSCH, virtualsymbolLengthForPUCCH=2, which is for PUCCH, k=1, startingSymbolIndex=7, and nrofSymbol=7.

In FIG. 23, for example, PUCCH is transmitted in symbols having nrofSymbols=7 (e.g., Virtual symbols #7 to #13) from the Virtual symbol having startingSymbolIndex=7, in the Virtual slot after k=1 slot from the Virtual slot in which terminal 200 has received PDSCH.

According to Option RA-1, for example, with respect to terminal 200, virtualsymbolLength is set while the Virtual symbol and the Virtual slot are configured, so that the time domain resource for the symbol-level Repetition can be identified by using a PUCCH resource indication as in the Normal slot configuration.

Note that, the time domain resource for PUCCH is identified by using a Virtual symbol and a Virtual slot, as described above. On the other hand, the signal actually transmitted by terminal 200 (e.g., PUCCH) is a signal in units of Normal symbols, and terminal 200 transmits Normal symbols of virtualsymbolLengthForPUCCH in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols of virtualsymbolLengthForPUCCH included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

<Option RA-2>

In Option RA-2, for example, base station 100 and terminal 200 may determine (i.e., identify) a time domain resource for communication, based on a Virtual symbol and a Virtual slot. Further, in Option RA-2, for assigning a starting symbol position, base station 100 and terminal 200 may use at least one of a Normal symbol and a Normal slot, among time-domain resources, for example.

Option RA-2 may be applied to, for example, Option FS-2 described above.

Hereinafter, a description will be given of examples of applying Option RA-2 to PUSCH and PUCCH.

(Option RA-2: PUSCH)

Terminal 200 may, for example, transmit PUSCH according to at least one of resource allocation indicated by DCI in PDCCH from base station 100 and resource allocation previously configured by a higher layer signaling (e.g., RRC signal).

Here, the control information included in DCI or the control information previously configured by the higher layer signaling may include, for example, information on a time domain resource in which PUSCH is transmitted (e.g., TDRA information).

The time domain resource information may include, for example, information on a timing, e.g., terminal 200 transmits PUSCH how many Normal slots later from the Normal slot in which PDCCH has been received (e.g., may be referred to as "$K_2$" or Normal slot offset), information on the start Normal symbol position of PUSCH in a Normal slot (e.g., "$S_{PUSCH}$" or starting Normal symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$, and PUSCH mapping type) may be semi-statically configured by an UTE-specific higher layer signaling (RRC signal), and a combination to be used from the TDRA table may be configured by a dynamic indication such as DCI or a previous configuration by the higher layer signaling (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e.g., SLIV).

For example, a Normal slot in which terminal 200 transmits PUSCH may be identified according to following Expression 5.

[5]

$$\left\lfloor n \cdot \frac{2^{\mu_{PUSCH}}}{2^{\mu_{PDCCH}}} \right\rfloor + K_2 \qquad \text{(Expression 5)}$$

Here, n indicates a Normal slot in which terminal 200 has received DCI (or PDCCH) corresponding to PUSCH assignment. Further, $2^{\mu_{PUSCH}}$ indicates SCS of the carrier or the BWP that transmit PUSCH, and $2^{82\ PDDCH}$ indicates SCS of the carrier or the BWP that receive DCI (or PDCCH).

For example, terminal 200 may identify the Normal slot for transmitting PUSCH, according to Expression 5. In addition, terminal 200 may identify, in the identified Normal slot, a Normal symbol in which PUSCH transmission is started (i.e., starting position), based on $S_{PUSCH}$, for example. Terminal 200 may also identify, for example, the number of Virtual symbols for transmitting PUSCH, based on $L_{PUSCH}$.

According to Option RA-2, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Further, according to Option RA-2, for example, in the time domain resource allocation, using the parameters in units of Normal symbols and Normal slots (e.g., K2 and SPUSCH) allows terminal 200 to transmit PUSCH from any Normal symbol position in the Normal slot (e.g., any Normal symbol position eluding starting symbol). For example, in Option RA-2, a transmission starting position of PUSCH can be configured with finer granularity than the granularity of the Virtual symbol. Accordingly, in Option RA-2, the flexibility of resource allocation for PUSCH can be improved as compared to Option RA-1, for example.

Note that, the time domain resource for PUSCH is identified by using a Virtual symbol and a Virtual slot, as described above. On the other hand, the signal actually, transmitted by terminal 200 (e.g., PUSCH) is a signal in Emits of Normal symbols, and terminal 200 transmits Normal symbols of virtualsymbolLengthForPDSCH in, for example, a time duration of a Virtual symbol. For example, terminal 200 may generate, according to the PUSCH resource allocation, a complex symbol group corresponding to the number of Virtual symbols, and may replicate and map one complex symbol group to the Normal symbols of virtualsymbolLengthForPUSCH included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

(Option RA-2:PUCCH)

Terminal 200, for example, may feed back, via PUCCH, ACK/NACK indicating success or failure of decoding for PDSCH. Terminal 200 may also transmit, to base station 100, another kind of UCI such as CSI or SR by using, for example, PUCCH.

Further, when transmitting ACK/NACK for PDSCH assigned by DCI, terminal 200 may transmit PUCCH according to resource allocation indicated by DCI in PDCCH from base station 100, for example.

Here, the control information included in DCI may include, for example, information on a PUCCH resource. The PUCCH resource may be configured with, for example, a plurality of parameters.

In the PUCCH resource, the time domain resource information may include, for example, information on the start Normal symbol position of PUCCH in a Normal slot (e.g., may be referred to as "startingSymbolIndex" or starting Normal symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 starts transmitting PUCCH how many Normal slots later from the Normal slot in which PDSCH has been received (e.g., number of Normal slots "k").

incidentally, for CSI and SR, for example, a PUCCH resource may be designated from base station 100 to terminal 200 by a higher layer signaling (e.g., RRC signal).

For example, a Normal slot in which terminal 200 transmits PUCCH may be identified according to following Expression 6.

[6]

$$n+k \hspace{4cm} \text{(Expression 6)}$$

Here, n indicates a Normal slot in which terminal 200 has received PDSCH. For example, k=0 may correspond to the last Normal slot that temporally overlaps the Normal slot in which PDSCH has been received among Normal slots applied to PUCCH.

For example, terminal 200 may identify the Normal slot transmitting PUCCH, according to Expression 6. In addition, terminal 200 may identify, in the identified Normal slot, a Normal symbol in which PUCCH transmission is started (i.e., starting position), based on startingSymbolIndex, for example. Terminal 200 may also identify, for example, the number of Virtual symbols for transmitting PUCCH, based on nrofSymbols.

According to Option RA-2, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Further, according to Option RA-2, for example, in the time domain resource allocation, using the parameters in units of Normal symbols and Normal slots (e.g., K and startingSymbolIndex) allows terminal 200 to transmit PUCCH from any Normal symbol position in the Normal slot (e.g., any Normal symbol position including starting symbol). For example, in Option RA-2, a transmission starting position of PUCCH can be configured with finer granularity than the granularity of the Virtual symbol. Accordingly, in Option RA-2, the flexibility of resource allocation for PUCCH can be improved as compared to Option RA-1, for example.

Note that, the time domain resource for PUCCH is identified by using a Virtual symbol and a Virtual slot, as described above. On the other hand, the signal actually transmitted by terminal 200 (e.g., PUCCH) is a signal in units of Normal symbols, and terminal 200 transmits Normal symbols of virtualsymbolLength in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols of virtualsymbolLength included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

<Option RA-3>

In Option RA-3, for example, base station 100 and terminal 200 may determine (i.e., identify) a time domain resource for communication, based on a Virtual symbol and a Virtual slot. Further, in Option RA-3, for identifying the time domain resource, base station 100 and terminal 200 may introduce an offset relating to a Normal symbol (e.g., offset in units of Normal symbols), for example.

Option RA-3 may be applied to, for example, either Option FS-1 or Option FS-2 described above.

Hereinafter, a description will be given of examples of applying Option RA-3 to PUSCH and PUCCH.

(Option RA-3: PUSCH)

Terminal 200 may, for example, transmit PUSCH according to at least one of resource allocation indicated by DCI in PDCCH from base station 100 and resource allocation previously configured by a higher layer signaling (e.g., RRC signal).

Here, the control information included in DCI or the control information previously configured by the higher layer signaling may include, for example, information on a time domain resource in which PUSCH is transmitted (e.g., TDRA information).

The time domain resource information may include, for example, information on a timing, e.g., terminal 200 transmits PUSCH how many Virtual slots later from the Virtual slot in which PDCCH has been received (e.g., may be referred to as "$K_2$" or Virtual slot offset), information on the start Virtual symbol position of PUSCH in a Virtual slot (e.g., "$S_{PUSCH}$" or starting Virtual symbol) and on the number of Virtual symbols in which PUSCH is transmitted (e.g., "$L_{PUSCH}$" or Virtual symbol length).

For the time domain resource information, for example, a TDRA table (candidate for combination of above-mentioned $K_2$, $S_{PUSCH}$, $L_{PUSCH}$, and PUSCH mapping type) may be semi-statically configured by an UE-specific higher layer signaling (RRC signal), and a combination to be used from the TDRA table may be configured by a dynamic indication such as DCI or a previous configuration by the higher layer signaling (e.g., RRC signal).

Further, a Virtual symbol position "$S_{PUSCH}$" and the number of Virtual symbols "$L_{PUSCH}$" that are for PUSCH may be configured for terminal 200 by, for example, a value associated with a combination of the Virtual position and the number of Virtual symbols (e.g., SLIV).

Further, in Option RA-3, the time domain resource information may include, for example, an offset in units of Normal symbols. The offset may be indicated from base station 100 to terminal 200 by, for example, at least cine of an UE-specific higher layer signaling (e.g., RRC signal) and DCI separately from the TDRA information. Alternatively, the offset may be indicated (i.e., configured) by being included in the TDRA table.

For example, a Virtual slot in which terminal 200 transmits PUSCH may be identified according to following Expression 7.

[7]

$$\left\lfloor n \cdot \frac{2^{\mu_{PUSCH}}}{2^{\mu_{PDCCH}}} \cdot \frac{virtualsymbolLengthForPDCCH}{virtualsymbolLengthForPUSCH} \right\rfloor + K_2 \quad \text{(Expression 7)}$$

Here, n indicates a Virtual slot in which terminal 200 has received DCI (or PDCCH) corresponding to PUSCH assignment. Further, $2^{\mu_{PUSCH}}$ indicates SCS of the carrier or the BWP that transmit PUSCH, and $2^{\mu_{PDCCH}}$ indicates SCS of the carrier or the BWP that receive DCC (or PDCCH). VirtualsymbolLengthForPDCCH indicates virtualsymbolLength applied to PDCCH including DCI corresponding to the PUSCH assignment, and virtualsymbolLengthForPUSCH indicates virtualsymbolLength applied to PUSCH transmitted by terminal 200.

For example, terminal 200 may identify the Virtual slot for transmitting PUSCH, according to Expression 7. In addition, terminal 200 may identify, in the identified. Virtual slot, a Virtual symbol in which PUSCH transmission is started (i.e., starting position), based on $S_{PUSCH}$, for example. Terminal 200 may also identify, for example, the number of Virtual symbols for transmitting PUSCH, based on $L_{PUSCH}$.

Further, in Option RA-3, terminal 200, for example, after identifying, by the above-mentioned method, the time domain resource for transmitting PUSCH, shifts, based on the offset in units of Normal symbols, the time domain resource for transmitting PUSCH by the offset.

According to Option RA-3, for example, with respect to terminal 200, virtualsymbolLength is set while the Virtual symbol and the Virtual slot are configured, so that the time domain resource for the symbol-level Repetition can be identified by using an indication of the time domain resource for PUSCH as in the Normal slot configuration.

Further, according to Option RA-3, for example, in the time domain resource allocation, applying the offset in units of Normal symbols allows terminal 200 to transmit PUSCH from any Normal symbol position in the Normal slot (e.g., any Normal symbol position including starting symbol). For example, in Option RA-3, a transmission starting position of PUSCH can be configured with finer granularity than the granularity of the Virtual symbol. Accordingly, in Option RA-3, the flexibility of resource allocation for PUSCH can be improved as compared to Option RA-1, for example.

Note that, the time domain resource for PUSCH may be identified by using a Virtual symbol and a Virtual slot, as described above. On the other hand, the signal actually transmitted by terminal 200 (e.g., PUSCH) is a signal in units of Normal symbols, and terminal 200 transmits Normal symbols of virtualsymbolLength in, for example, a time duration of a Virtual symbol. For example, terminal 200 may generate, according to the PUSCH resource allocation, a complex symbol group corresponding to the number of Virtual symbols, and may replicate and map one complex symbol group to the Normal symbols of virtualsymbolLength included in one Virtual symbol. Moreover, base station 100 may assume that, for example, one complex symbol group is replicated and mapped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

Further, for example, Option RA-3 may be applied to a configuration of Option FS-1 or Option FS-2. When Option RA-3 is applied to Option FS-2, terminal 200 may configure a Virtual symbol and a Virtual slot from, for example, a symbol position at which PUSCH transmission is started. On the other hand, when applying Option RA-3 to Option FS-1, terminal 200 may transmit, for example, some of Normal symbols included in a Virtual symbol.

(Option RA-3:PUCCH)

Terminal 200, for example, may feed back, via PUCCH, ACK/NACK indicating success or failure of decoding for PDSCH. Terminal 200 may also transmit, to base station 100, another kind of UCI such as CSI or SR by using, for example, PUCCH.

Further, when transmitting ACK/NACK for PDSCH assigned by DCI, terminal 200 may transmit PUCCH according to resource allocation indicated by DCI in PDCCH from base station 100, for example.

Here, the control information included in DCI may include, for example, information on a PUCCH resource. The PUCCH resource may be configured with, for example, a plurality of parameters.

In the PUCCH resource, the time domain resource information may include, for example, information on the start Virtual symbol position of PUCCH in a Virtual slot (e.g., may be referred to as "startingSymbolIndex" or starting Virtual symbol) and on the number of Virtual symbols for transmitting PUCCH (e.g., may be referred to as "nrofSymbols" or Virtual symbol length).

Further, the control information included in DCI may include, for example, information on a timing, e.g., terminal 200 transmits PUCCH how many Virtual slots later from the Virtual slot in which PDSCH has been received (e.g., number of Virtual slots "k").

Incidentally, for CSI and SR, for example, a PUCCH resource may be designated from base station 100 to terminal 200 by a higher layer signaling (e.g., RRC signal).

Further, in Option RA-3, the time domain resource information may include, for example, an offset in units of Normal symbol. The offset may be indicated from base station 100 to terminal 200 by, for example, at least one of an UE-specific higher layer signaling (e.g., RRC signal) and DCI separately from the above-mentioned PUCCH resource. Alternatively, the offset may be indicated config-ured) by being included in the above-mentioned parameters of the PUCCH resource.

For example, a Virtual slot in which terminal 200 trans-mits PUCCH may be identified according to following Expression 8.
[8]

$$n+k \qquad \text{(Expression 8)}$$

Here, n indicates a Virtual slot in which terminal 200 has received PDSCH. For example, k=0 may correspond to the last Virtual slot that temporally overlaps the Virtual slot in which PDSCH has been received among Virtual slots applied to PUCCH.

For example, terminal 200 may identify the Virtual slot for transmitting PUCCH, according to Expression 8. In addition, terminal 200 may identify, in the identified Virtual slot, a Virtual symbol in which PUCCH transmission is started (i.e., starting position), based on startingSymbolIn-dex, for example. Terminal 200 may also identify, for example, the number of Virtual symbols for transmitting PUCCH, based on nrofSymbols.

Further, in Option RA-3, terminal 200, for example, after identifying, by the above-mentioned method, the time domain resource for transmitting PUCCH, shifts, based on the offset in units of Normal symbols, the time domain resource for transmitting PUCCH by the offset.

According to Option RA-3, for example, with respect to terminal 200, virtualsymbolLength is set while the Virtual symbol and the Virtual slot are configured, so that the time domain resource for the symbol-level Repetition can be identified by using a PUCCH resource indication as in the Normal slot configuration.

Further, according to Option RA-3, for example, in the time domain resource allocation, applying the offset in units of Normal symbols allows terminal 200 to transmit PUCCH from any Normal symbol position in the Normal slot (e.g., any Normal symbol position including starting symbol). For example, in Option RA-3, a transmission starting position A PUCCH can be configured with finer granularity than the granularity of the Virtual symbol. Accordingly, in Option RA-3 the flexibility of resource allocation for PUCCH can be improved as compared to Option RA-1, for example.

Note that, the time domain resource for PUCCH may be identified by using a Virtual symbol and a Virtual slot, as described above. On the other hand, the signal actually transmitted by terminal 200 (e.g., PUCCH) is a signal in units of Normal symbols, and terminal 200 transmits Nor-mal symbols of virtualsymbolLength in, for example, a time duration of a Virtual symbol. For example, terminal 200 may generate, according to the PUCCH resource allocation, a complex symbol group corresponding to the number of Virtual symbols, and may replicate and map one complex symbol group to the Normal symbols of virtualsymbol-Length included in one Virtual symbol. Moreover, base station 100 may assume that, for example, one complex symbol group is replicated and napped to Normal symbols included in one Virtual symbol at terminal 200. Meanwhile, for example, processing such as common scrambling, a data modulation scheme, layer mapping, or antenna port mapping may be applied to a complex symbol group included in one Virtual symbol.

Further, for example, Option RA-3 may be applied to a configuration of Option FS-1 or Option FS-2. When Option RA-3 is applied to Option FS-2, terminal 200 may configure a Virtual symbol and a Virtual slot from, for example, a symbol position at which PUCCH transmission is started. On the other hand, when applying Option RA-3 to Option FS-1, terminal 200 may transmit, for example, some of Normal symbols included in a Virtual symbol.
[DMRS Mapping]

Mapping of DMRS PUSCH and PUCCH that are trans-mitted by terminal 200 may be determined (in other words, identified) based on, for example, at least a Virtual symbols and a Virtual slot.

Hereinafter, determination examples for the DMRS map-ping will be described.
<Option DMRS-1>

In Option DMRS-1, for example, base station 100 and terminal 200 may determine (in other words, identify), based on a Virtual symbol and a Virtual slot, mapping of DMRS used for communication to a resource. That is, in Option DMRS-1, information on a Normal slot and on a Normal symbol need not be used for identifying the DMRS map-ping.

In addition, in Option DMRS-1, for example, a channel estimation result obtained by DMRS may be used for demodulating a data symbol in a Virtual slot including the DMRS. That is, the channel estimation result obtained by DMRS need not be used in a Virtual slot different from the Virtual slot including the DMRS.

In NR, for example, DMRS to be used in channel esti-mation for demodulation may be mapped in resources for PUCCH and PUSCH. DMRS may be mapped, for example, in front of a slot. Alternatively, DMRS may be mapped in, for example, a plurality of symbols in the slot. Further, in NR, for example, a symbol position where DMRS is mapped may be defined by parameters such as the mapping type of data (e.g., PUSCH), a PUCCH format, the number of symbols of PUSCH or PUCCH (e.g., corresponding to number of Normal symbols), or the presence or absence of additional DMRS and the number thereof (e.g., see NPL 3).

Figure 24:
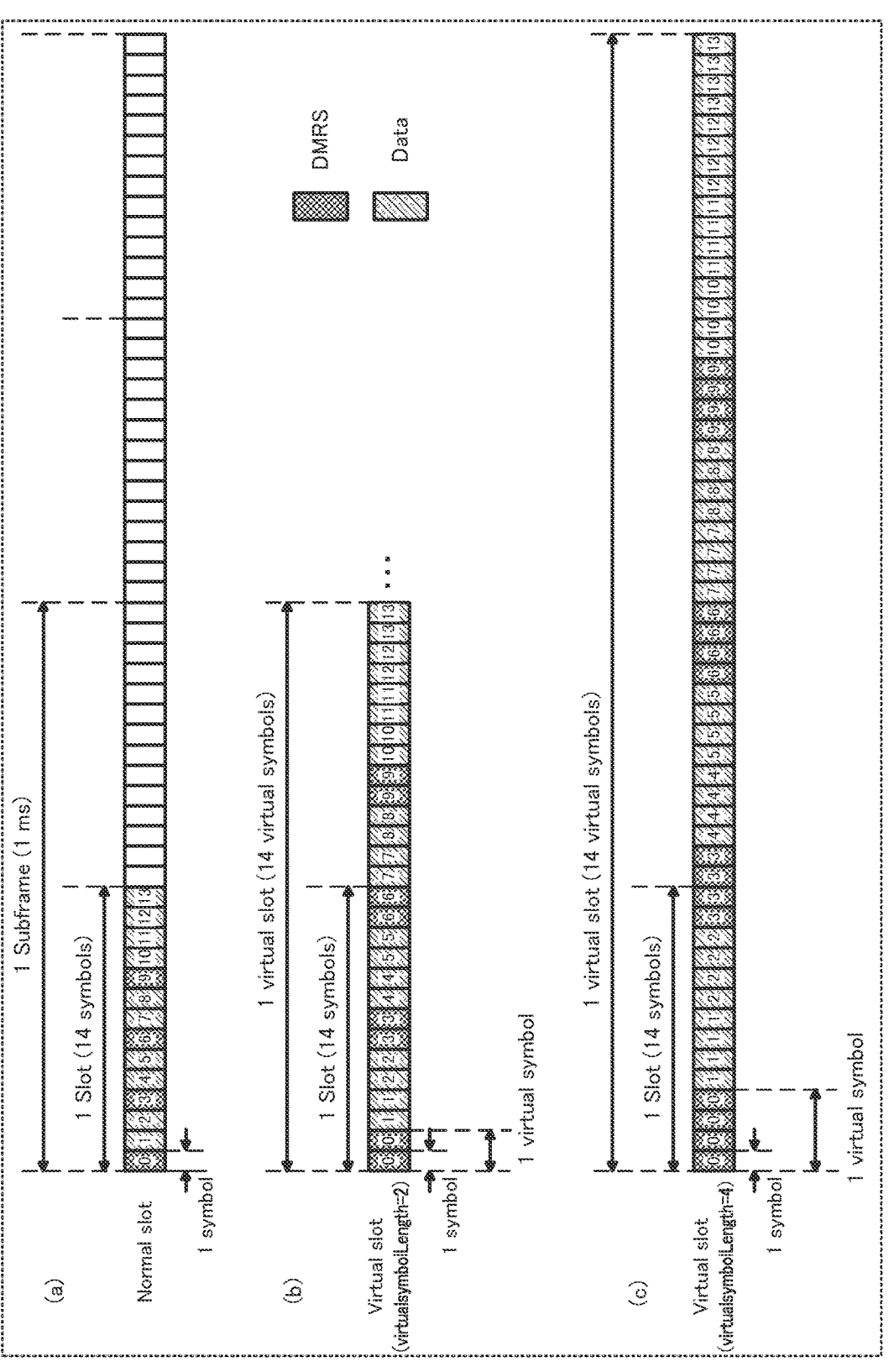
FIG. 24 illustrates a mapping example of a Demodulation Reference Signal (DMRS) according to Option DMRS-1.

FIG. 24 illustrates in (a) an example of DMRS mapping for data in NR PUSCH). FIG. 24 indicates in (a) a DMRS mapping example in the case of, for example, mapping type B, 14-symbol assignment, 1-symbol-front-loaded DMRS (in other words, mapping of DMRS symbol in the front of slot), and three pieces of additional DMRS. In (a) of FIG. 24, DMRS is mapped to, for example, symbols #0, #3, #6 and #9 in the slot.

In Option DMRS-1, DMRS is mapped while replacing DMRS mapping for a Normal slot and a Normal symbol with a Virtual slot and a Virtual symbol, for example.

That is, in Option DMRS-1, DMRS mapping in a Virtual symbol in a Virtual slot may be identified by parameters such as the mapping type of data (e.g., PUSCH), a PUCCH format, the number of Virtual symbols of PUSCH or PUCCH, or the presence or absence of additional DMRS and the number thereof.

FIG. 24 illustrates in (b) and (c) examples of DMRS mapping in Option DMRS-1. FIG. 24 indicates in (b) for example, a DMRS mapping example in the case of virtual-symbolLength=2 while FIG. 24 indicates in (c), for example, a DMRS mapping example in the case of virtual-symbolLength=4. Further, FIG. 24 indicates in (b) and (c), as in (a) of FIG. 24, a DMRS mapping example in the case of, for example, mapping type B, 14-Virtual symbol assignment, 1-symbol-front-loaded DMRS, and three pieces of additional DMRS.

In both (b) and (c) of FIG. 24, DMRS is mapped to Virtual symbols #0, #3, #6, and #9 in the Virtual slots. Comparing (a) of FIG. 24 with (b) and (c) of FIG. 24, the symbol numbers where DMRS is mapped (e.g., Normal symbol numbers or Virtual symbol numbers) are the same (#0, #3, #6, and #9), although the values of virtualsymbolLength are different.

Thus, according to Option DMRS-1, for example, with respect to terminal 200, virtualsymbolLength is set while the Virtual symbol and the Virtual slot are configured, so that the DMRS mapping for the symbol-level Repetition (i.e., Virtual slot configuration) can be identified based on a DMRS mapping method as in the Normal slot configuration.

<Option DMRS-2>

In Option DMRS-2, for example, base station 100 and terminal 200 may determine (in other words, identify) mapping of DMRS used for communication to a resource, based on a Virtual symbol, a Virtual slot, and a Normal slot.

In addition, in Option DMRS-2, for example, a channel estimation result obtained by DMRS may be used for demodulating a data symbol in a Normal slot including the DMRS. That is, the channel estimation result obtained by DMRS need not be used in a Virtual slot different from the Virtual slot including the DMRS.

As mentioned above, in NR, for example, DMRS to be used in channel estimation for demodulation may be mapped in resources for PUCCH and PUTSCH. DMRS may be mapped, for example, in front of a slot. Alternatively, DMRS may be mapped in, for example, a plurality of symbols in the slot. Further, in NR, for example, a symbol position where DMRS is mapped may be defined by parameters such as the mapping type of data (e.g., PUSCH), a PUCCH format, the number of symbols of PUSCH or PUCCH (e.g., corresponding to number of Normal symbols), or the presence or absence of additional DMRS and the number thereof (e.g., see NPL 3).

Figure 25:
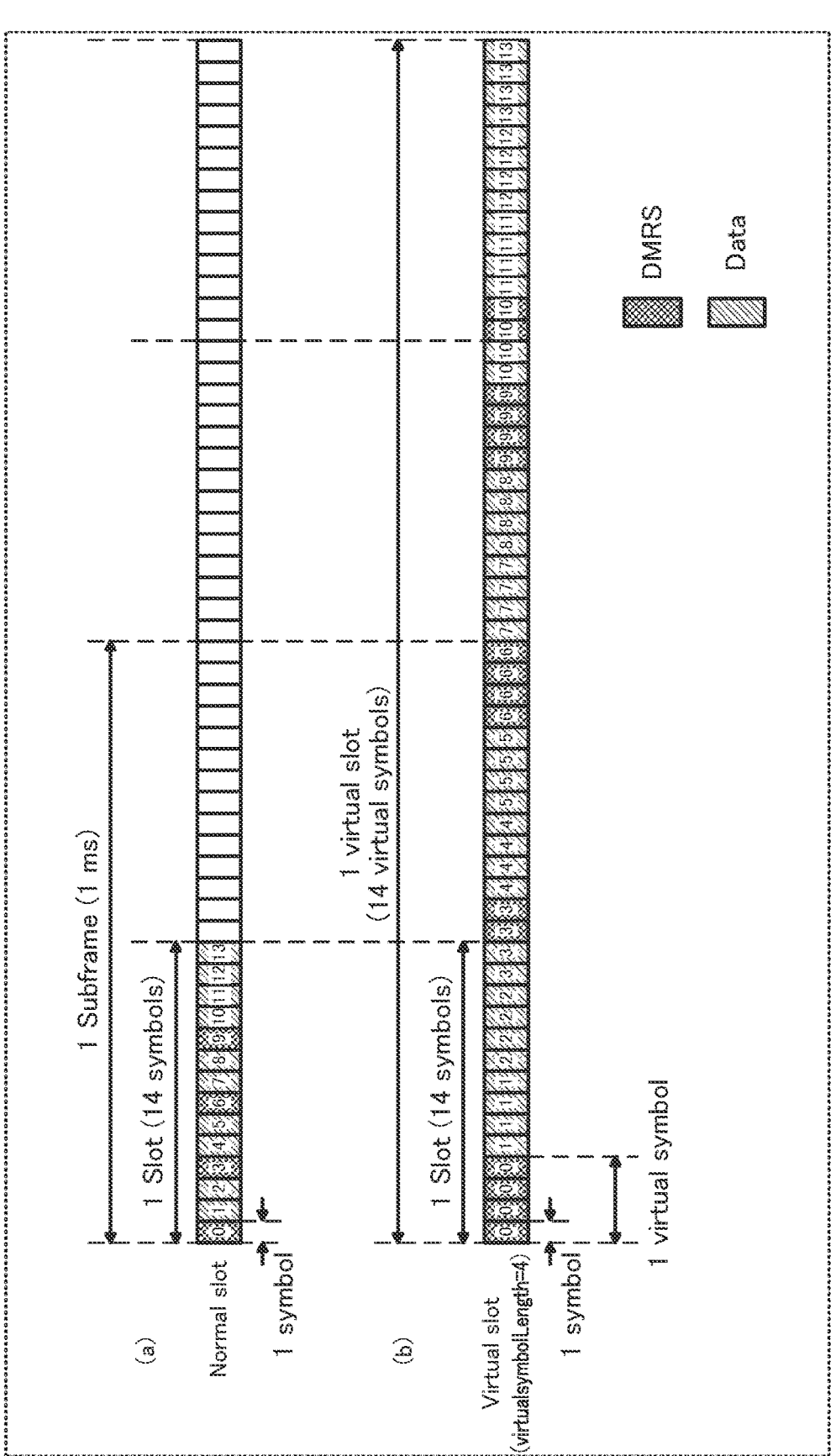
FIG. 25 illustrates a mapping example of DMRS according to Option DMRS-2.

FIG. 25 illustrates in (a) an example of DMRS mapping for data in NR (e.g., PUSCH). FIG. 25 indicates in (a) a DMRS mapping example in the case of, for example, mapping type B, 14-symbol assignment, 1-symbol-front-loaded DMRS (in other words, mapping of DINARS symbol in the front of slot), and three pieces of additional DMRS. In (a) of FIG. 25, DMRS is mapped to, for example, symbols #0, #3, #6 and #9 in the slot.

In Option DMRS-2, DMRS is mapped while replacing DMRS mapping for Option DMRS-1, and a Normal slot and a Normal symbol with a Virtual slot and a Virtual symbol, for example. That is, in Option DMRS-2, DMRS mapping in a Virtual symbol in a Virtual slot may be identified by parameters such as the mapping type of data (PUSCH), a PUCCH format, the number of Virtual symbols of PUSCH or PUCCH, or the presence or absence of additional DMRS and the number thereof.

Further, in Option DMRS-2, for example, in a case where a Virtual symbol crossing a Normal slot boundary is present in Virtual symbols to which DMRS may be mapped, the Virtual symbol may be divided into two Sub-virtual symbols before and after the Normal slot boundary. Among the Sub-virtual symbols resulting from division, DMRS may be mapped to the Sub-virtual symbol after the Normal slot boundary, for example.

Incidentally, among the Sub-virtual symbols resulting from division, to the Sub-virtual symbol before the slot boundary, DMRS may be mapped or a data symbol may be mapped. Alternatively, for example, among the Sub-virtual symbols resulting from division, DMRS is mapped to the Sub-virtual symbol before the slot boundary while DMRS may not be mapped to the Sub-virtual symbol after the slot boundary.

FIG. 25 illustrates in (b) an example of DMRS mapping in Option DMRS-2. FIG. 25 indicates in (b) for example, a DMRS mapping example in the case of virtualsymbolLength=4. Further, FIG. 25 indicates in (h), as in (a) of FIG. 25, a DMRS mapping example in the case of, for example, mapping type B, 14-Virtual symbol assignment, 1-symbol-front-loaded DMRS, and three pieces of additional DMRS.

In (b) of FIG. 25, DMRS is mapped to Virtual symbols #0, #3, #6, and #9 in the Virtual slot. Comparing (a) of FIG. 25 with (b) and (c) of FIG. 25, the symbol numbers where DMRS is mapped (e.g., Normal symbol numbers or Virtual symbol numbers) are the same (#0, #3, #6, and #9), although the values of virtualsymbolLength are different.

Further, in (b) of FIG. 25, Virtual symbols #3 and #10 cross the Normal slot boundaries. Therefore, as illustrated in (b) of FIG. 25, Virtual symbol #3 and #10 are each divided into Sub-virtual symbols before and after the Normal slot boundaries, and then, DMRS is mapped to, for example, the Sub-virtual symbols after the Normal slot boundaries. On the other hand, in (b) of FIG. 25, in Virtual symbols #3 and #10, DMRS is not mapped to the Sub-virtual symbols before the Normal slot boundaries (e.g., data is mapped).

Thus, according to Option DMRS-2, for example, with respect to terminal 200, virtualsymbolLength is set while the Virtual symbol and the Virtual slot are configured, so that the DMRS mapping for the symbol-level Repetition Virtual slot configuration) can lie identified based on a DMRS mapping method as in the Normal slot configuration.

Further, as mentioned above, for example, the channel estimation result obtained by DMRS may be used for demodulating a data symbol in a Normal slot including the DMRS (i.e., result is not applicable in Normal slot different from Normal slots including DMRS). Even in this case, according to Option DMRS-2, for example, the channel estimation accuracy can be unproved by DMRS mapped to a Virtual symbol corresponding to at least one Normal slot (in FIG. 25, Sub-virtual symbol after Normal slot boundary), in a Virtual

[Additional Repetition]

For example, with respect to the PUSCH transmission or the PUCCH transmission that are based on a Virtual symbol or a Virtual slot configured by application of the symbol-level Repetition, "Virtual slot-level Repetition (repetition in units of Virtual slots)," "Resource level repetition allocated by Virtual symbol (repetition in units of resources allocated by Virtual symbol)," "Virtual symbol group-level Repetition (repetition in units of Virtual symbol groups)" may be further applied.

Hereinafter, an example of each Repetition will be described.

<Option R-1>

In NR Rel. In 15, for example, the slot-level Repetition is applicable for PUCCH and PUSCH, as mentioned above. In Option R-1, for example, the symbol-level Repetition is applied in order to configure a Virtual symbol and a Virtual slot, and Virtual slot-level Repetition is further applied. For example, in Option R-1 base station 100 and terminal 200 control Repetition in communication based on the Virtual slot units.

Figure 26:
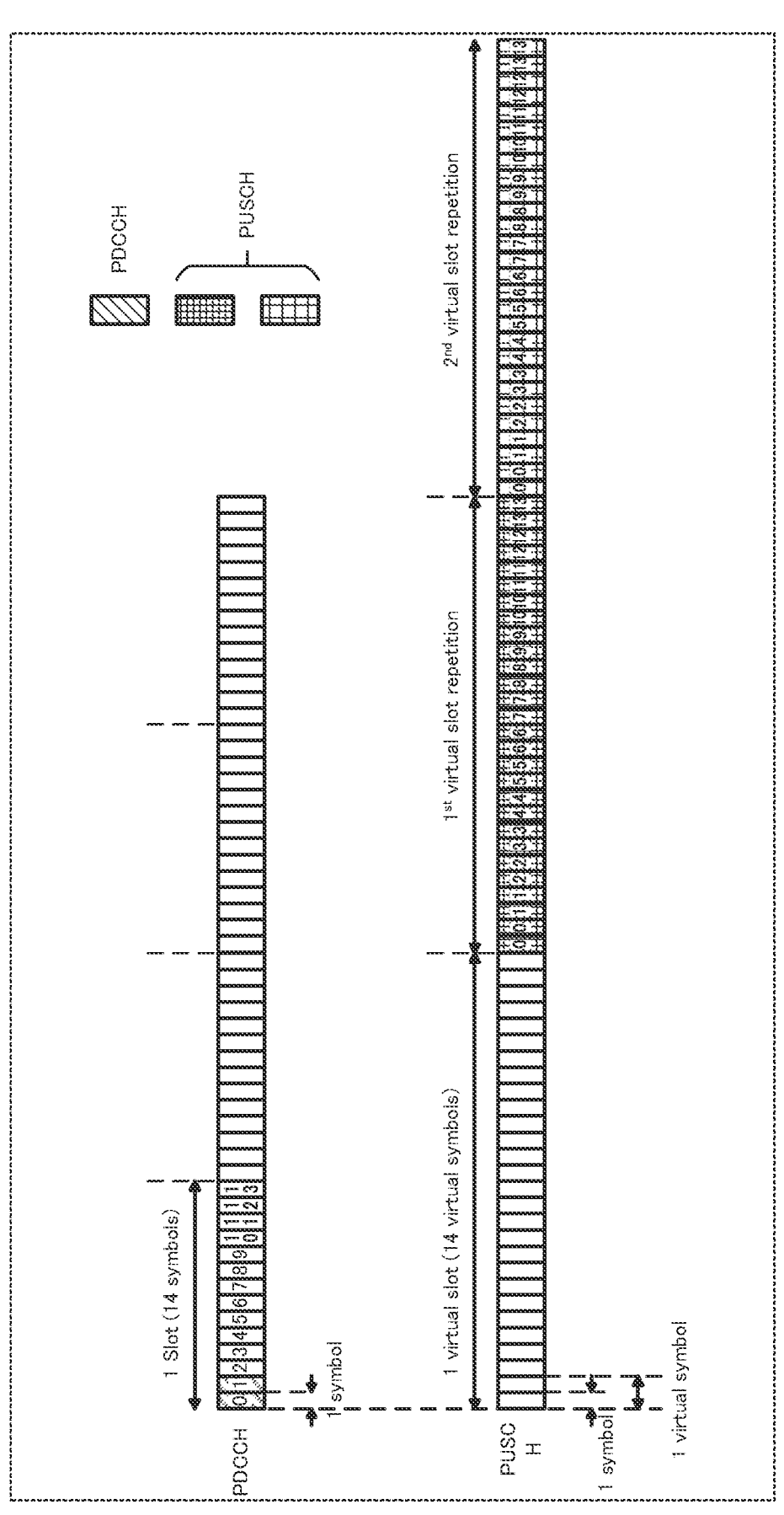
FIG. 26 illustrates an example of repetition according to Option R-1.

FIG. 26 illustrates an example of the Virtual slot-level Repetition. In FIG. 26, virtualsymbolLength=2 and numberofRepetition, which is the number of Virtual slot-level Repetitions, is set to 2. For example, as illustrated in FIG. 26, when the Virtual slot-level Repetition is applied, a common tune domain resource allocation may be applied over Virtual slots in the number of numberofRepetition.

According to Option R-1, for example, as described in Option FS-1-4, even when the upper limit value that can be configured as the number of virtualsymbolLength is small (in other words, when number of times of Repetition applicable to symbol-level Repetition is small), the channel estimation accuracy can be improved by the Virtual slot-level Repetition.

Further, the coverage can be enhanced by a combination of the symbol-level Repetition and the Virtual slot-level Repetition. In other words, the Virtual slot-level Repetition enables compensation for the coverage enhancement effect against a decrease in the number of times of Repetition applicable to the symbol-level Repetition.

Here, since the same signal is repeatedly transmitted in Repetition, an increase in the number of times of Repetition may lower the frequency utilization efficiency. On the other hand, depending on the channel status, the reception side can demodulate and decode the data without receiving all the configured Repetitions in some cases.

For example, in the downlink data transmission, when the data is successfully demodulated and decoded prior to reception of the data for the configured (in other words, designated) number of times of Repetition, terminal 200 feeds back ACK to base station 100, and thereby base station 100 can stop the Repetition transmission halfway (Early termination).

Further, for example, in the uplink data transmission, when the data is successfully demodulated and decoded prior to reception of the data for the configured number of times of Repetition, base station 100 can stop (Early termination) the Repetition transmission in terminal 200 by indicating ACK to terminal 200.

Thus, the application of the Early termination makes it possible to suppress a reduction in the frequency utilization efficiency.

When the Early termination is applied, the reception side desirably, for example, performs demodulation and decoding of the data in a state where all the encoded bits have been received. On the other hand, in the symbol-level Repetition, all the encoded bits cannot be received unless the last Virtual symbol is received. Hence, it is difficult to apply the Early termination.

By contrast, in Option R-1, the reception side can receive all the encoded bits for each reception of a single Virtual slot because, for example, the symbol-level Repetition and the Virtual slot-level Repetition are combined. Hence, in Option R-1, the Early termination per Virtual slot can be applied. Thus, it is possible to obtain an effect on suppressing a reduction in the frequency utilization efficiency due to the Early termination, while improving the channel estimation accuracy by the symbol-level Repetition.

Incidentally, although the Virtual slot-level Repetition for PUSCH has been described in FIG. 26, Option R-1 may be applied to, for example, PUCCH and PUTSCH to which the slot-level Repetition is applied in NR Rel. 15, and or may be applied to another channel/signal such as PDCCH, CSI-RS, or SRS, for example.

<Option R-2>

In NR Rel. 16, for example, as described above, the mini-slot-level Repetition that repeatedly transmits one or more PUSCHs in one slot is applicable to PUSCH. In Option R-2, for example, the symbol-level Repetition is applied in order to configure a Virtual symbol and a Virtual slot, and the resource-level repetition allocated by Virtual symbol and the Virtual slot is further applied. For example, in Option R-2, base station 100 and terminal 200 control communication based in units each including a plurality of Virtual symbols configured as a single unit (e.g., in units of resources allocated to signal per Virtual symbol).

Figure 27:
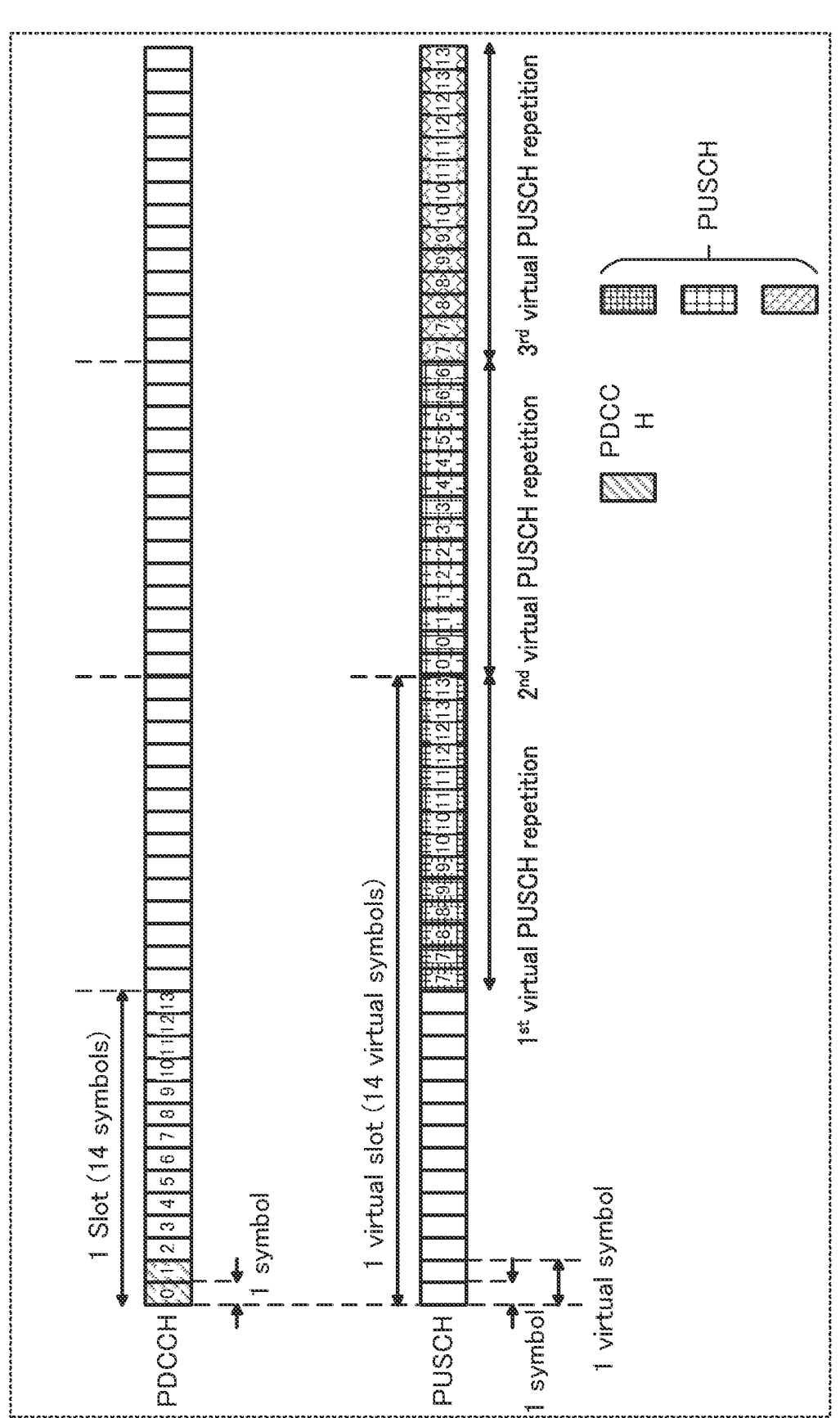
FIG. 27 illustrates an example of repetition according to Option R-2.

FIG. 27 illustrates an exemplary the resource-level repetition allocated by Virtual symbol. In FIG. 27, virtualsymbolLength=2, and numberofRepetition, which is the number of times of Repetition of PUSCH assigned by using in units of Virtual symbols or Virtual slots is set to 3. In FIG. 27, for example, since a resource is allocated to PUSCH in units of seven Virtual symbols, the seven-Virtual symbol level Repetition is applied.

According to Option R-2, for example, as described in Option FS-1-4, even when the upper limit value that can be configured as the number of virtualsymbolLength is small, the channel estimation accuracy can be improved by the resource-level Repetition allocated by Virtual symbol.

Further, the coverage can be enhanced by a combination of the symbol-level Repetition and the resource-level Repetition allocated by the Virtual symbol. In other words, the resource-level Repetition allocated by the Virtual symbol enables compensation for the coverage enhancement effect against a decrease in the number of times of Repetition applicable to the symbol-level Repetition.

Further, according to Option R-2, as in Option R-1, since the Early termination per resource allocated by using a Virtual symbol or a Virtual slot, can be applied, and thus, a reduction in the frequency utilization efficiency can be suppressed.

Incidentally, in FIG. 27, a description has been given of Repetition for PUSCH to which the PUSCH-level Repetition (repetition in units of PUSCHs) is applied in NR Rel. 16, but Option R-2 may be applied to, for example, PUCCH and/or may be applied to another channel/signal such as PDCCH, CSI-RS, or SRS, for example.

<Option R-3>

In Option R-3, for example, the symbol-level Repetition is applied in order to configure a Virtual symbol and a Virtual slot, and a Virtual symbol group-level Repetition is further applied.

Here, a "Virtual symbol group" includes, for example, a plurality of Virtual symbols.

For example, in Option R-3, base station 100 and terminal 200 control Repetition in communication based in units each including a plurality of Virtual symbols configured as a single unit (for example, in units of Virtual symbol groups).

Figure 28:
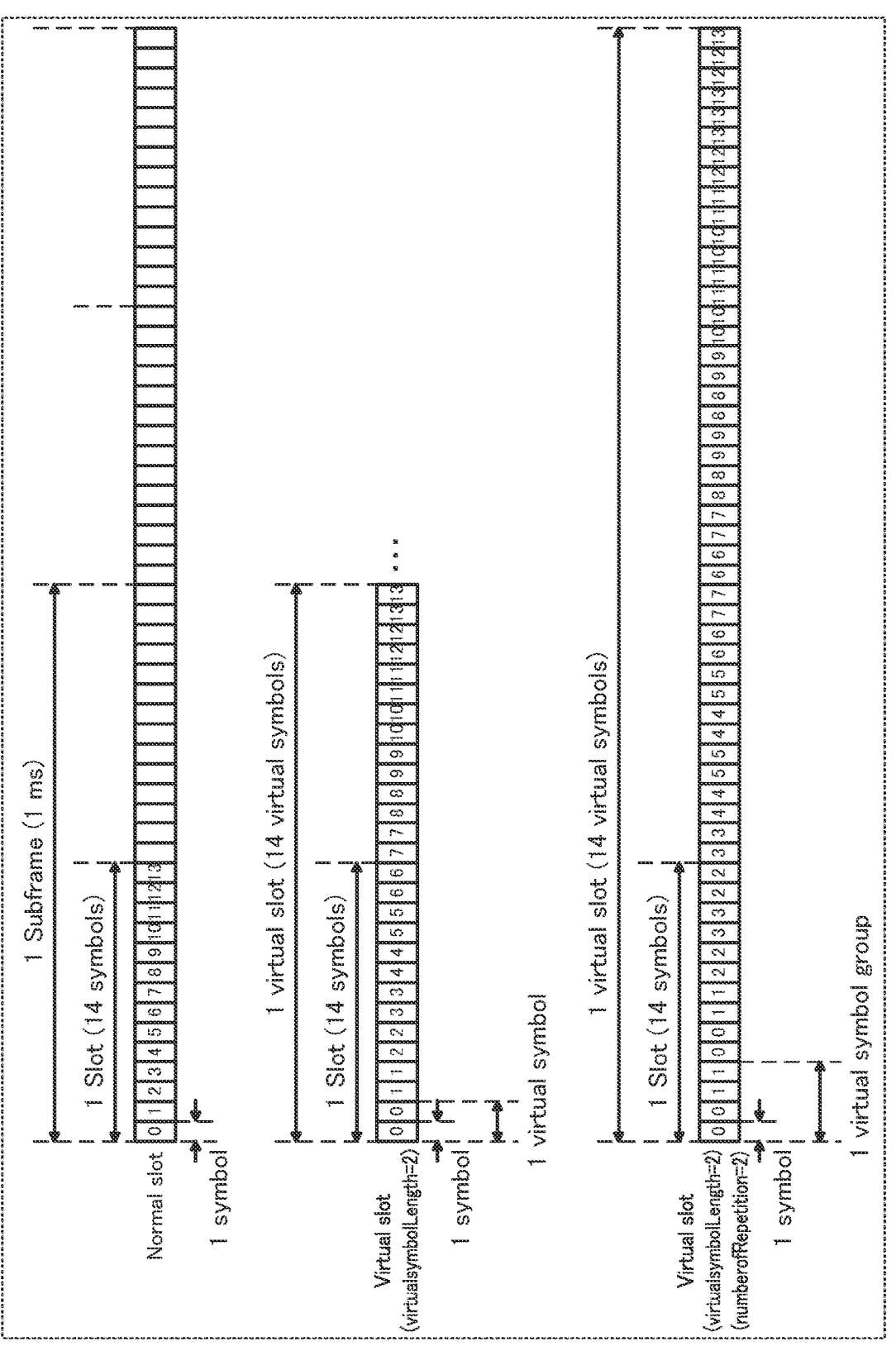
FIG. 28 illustrates an example of repetition according to Option R-3.

FIG. 28 illustrates an example of the Virtual symbol group-level Repetition. In FIG. 28, virtualsymbolLength=2, numberofRepetition, which is the number of Virtual symbol group-level Repetitions, is set to 2, and the number of Virtual symbols included in a Virtual symbol group=2.

As illustrated in FIG. 28, for example, one Virtual symbol group is composed of two Virtual symbols, such as Virtual symbols #0 and #1. Then, for the Virtual symbol group including two Virtual symbols, Repetition having numberof-Repetition=2 is performed.

For example, comparing the cases where virtualsymbol-Length=4 (example in Option FS-1-1) in FIG. 28 and FIG. 18 with each other, both cases have Repetition using the same number of OFDM symbols (i.e., Normal symbols). For example, in FIG. 18, four Normal symbols #0 are arranged contiguously. On the other hand, in FIG. 28, four Normal symbols #0 are dispersedly mapped two symbols each.

Thus, according to Option R-3, for example, data symbols including the same data or DMRS can be temporally dispersed in a slot or in a Virtual slot, so that the time diversity effect can be obtained.

Option R-1, Option R-2, and Option R-3 have been each described, thus far.

<Configuration Method for Additional Repetition>

Next, a configuration method (i.e., indication method) for additional Repetition will be described.

The presence or absence of the additional Repetition and the number of times of repetition may be semi-statically indicated by, for example, an UE-specific higher layer signaling (e.g., RRC signal). In other words, the presence or absence of the additional Repetition and the number of times of repetition may be indicated by, for example, an indication method as in the PUSCH/PUCCH repetition in NR Rel. 15 (e.g., see NPL, 5 or 6).

In addition, the presence or absence of the additional Repetition and the number of times of repetition may be indicated by, for example, being included in the above-mentioned TDRA table of PUSCH, or the parameters of the PUCCH resource. In other words, the presence or absence of the additional Repetition and the number of times of repetition may be indicated by, for example, an indication method as in the PUSCH repetition in NR Rel.16 (e.g., see NPL 7).

Meanwhile, for example, a Repetition method to be applied may be differ depending on an operation mode of terminal 200. By way of example, the Normal slot-level (in units of Normal slots) or mini-slot-level Repetition may be applied to an operation mode in which the number of times of Repetition is not greater than a threshold value whereas a combination of the symbol-level Repetition and the Normal slot-level or mini-slot-level Repetition may be applied to an operation mode in which the number of times of Repetition is greater than the threshold value (i.e., coverage enhancement mode).

Further, for example, in a situation where no additional Repetition is configured for PUCCH when transmission resources respectively for PUCCH and PUSCH with the same priority and with the additional Repetition applied overlap in time, terminal 200 may transmit UCI, which is to be transmitted via PUCCH, by multiplexing with PUSCH in the slot where the PUCCH resource and the PUSCH resource overlap in time. On the other hand, in a situation where the additional Repetition is configured for PUCCH, terminal 200 may drop transmission of PUSCH and transmit UCI using PUCCH in the slot where the PUCCH resource and the PUSCH resource overlap in time.

<Early Termination>

For example, when the Early termination is applied to PUSCH or PUCCH, terminal 200 may monitor a control signal for an notification indicating the Early termination, assuming, that the indication may be transmitted from base station 100, after transmitting a signal of each Virtual slot (e.g., in case of Option R-1) or PUSCH or PUCCH assigned using a Virtual symbol or a Virtual slot (e.g., in case of Option R-2).

Here, the control signal indicating the Early termination may be included in, for example, DCL to be transmitted in a Group common PDCCH (e.g., DCI format 2-1 or ICI format 2-4) and in DCI to be transmitted in an UE-specific PDCCH (e.g., DCI format 0-0, DCI format 0-1, or DCI format 0-2).

Besides, for example, terminal 200 may replace, with the Early termination, the indication of ACK by a Downlink Feedback indicator (DFI) that indicates ACK/HACK for the uplink Configured grant transmission. When the Early termination is indicated, for example, terminal 200 may stop the uplink transmission (e.g., PUSCH or PUCCH) even without performing transmission in the preconfigured number of times of Repetition.

[Terminal Processing Time]

In NR, for example, processing time of terminal 200 is defined, the processing time including: a minimum signal processing time from the timing of PDSCH reception until terminal 200 transmits ACK/NACK feedback (e.g., see NPL 6), a minimum signal processing time from the timing of PDCCH reception for assigning PUSCH to the transmission of PUSCH (e.g., see NPL 6), CSI calculation time (e.g., see NPL 6), and the BWP switching time (e.g., see NPL 5).

In the present embodiment, for example, the following definitions may be applied to the processing time (e.g., minimum signal processing time) of terminal 200 when a Virtual symbol and a Virtual slot are configured by applying the symbol-level Repetition.

<Option PT-1>

In Option PT-1, for example, a value in units of symbols defined in NR Rel. 15 or NR Rel. 16 (i.e., units of Normal symbol) may be applied to the processing time (e.g., minimum signal processing time) of terminal 200 when a Virtual symbol and a Virtual slot are configured by applying the symbol-level Repetition.

For example, even when the symbol-level Repetition is applied, the signal actually transmitted by terminal 200 is in units of Normal symbols. For example, terminal 200 transmits and/or receives Normal symbols of virtualsymbol-Length in a time duration of a Virtual symbol. According to Option PT-1, it is possible to define a value similar to (that is, without change) the value defined in NR Rel. 15 or NR Rel. 16, with respect to the processing time (e.g., minimum signal processing time) of terminal 200.

<Option PT-2>

In Option PT-2, for example, a value different from that in NR Rel. 15 or NR Rel. 16 may be defined with respect to the processing time (e.g., minimum signal processing time) of terminal 200 when a Virtual symbol and a Virtual slot are configured by applying the symbol-level Repetition.

For example, with respect to the processing time of terminal 200 when a Virtual symbol and a Virtual slot are configured, a value obtained by adding an offset (e.g., several symbols) to the processing time of terminal 200 defined in NR Rel. 15 or Rel. 16 may be defined. Further, with respect to the processing time of terminal 200 when a Virtual symbol and a Virtual slot are configured by applying the symbol-level Repetition, for example, a value obtained by multiplying the processing time of terminal 200 defined in NR Rel. 15 or Rel. 16 by a coefficient (e.g., virtualsymbolLength) may be defined.

When the symbol-level Repetition is applied, for example, a process of combining DMRS and applying the channel estimation and the like may be added in terminal 200, and thus, the processing time of terminal 200 defined in NR Rel. 15 or Rel. 16 is possibly not applied.

By contrast, according to Option PT-2, a value different from the processing time of terminal 200 defined in NR Rel. 15 or Rel. 16 is applied to the processing time of terminal 200 when the symbol-level Repetition is applied, which enables appropriately indicating, to terminal 200, the timing for PUCCH for transmitting ACK/NACK or the transmission timing of PUSCH.

<Option PT-3>

In Option PT-3, for example, the processing time (e.g., minimum signal processing time) of terminal 200 when a Virtual symbol and a Virtual slot are configured by applying the symbol-level Repetition may be configured based on a certain condition.

For example, when the certain condition is satisfied, the processing time of terminal 200 defined in NR Rel. 15 or Rel. 16 may be applied to the processing time of terminal 200 when the symbol-level Repetition is applied. On the other hand, when the certain condition is not satisfied, a value different from the processing time of terminal 200 defined in NR Rel. 15 or Rel. 16 may be applied to the processing time of terminal 200 when the symbol-level Repetition is applied.

That is, in Option PT-3, Option PT-1 and Option PT-2 may be switched based on whether the certain condition is satisfied.

The certain condition may be, for example, that the additional DMRS is not be applied. In this case, for example, with respect to a minimum signal processing time from the timing of PDSCH reception to the transmission of ACK/NACK feedback, a minimum signal processing time may differ depending on whether to apply the additional DMRS. For example, when no additional DMRS is applied, the minimum signal processing time defined in NR Rel. 15 or Rel. 16 may be applied no change from NR), and when the additional DMRS is applied, a newly defined minimum signal processing time may be applied.

Incidentally, the certain condition is not limited to the condition relating to the presence or absence of the additional DMRS and may be another condition. For example, a minimum signal processing time may differ depending on the PDSCH mapping type.

The operation examples of Repetition in units of symbols have been described, thus far.

Next, an example of processing of terminal 200 will be described.

Figure 29:
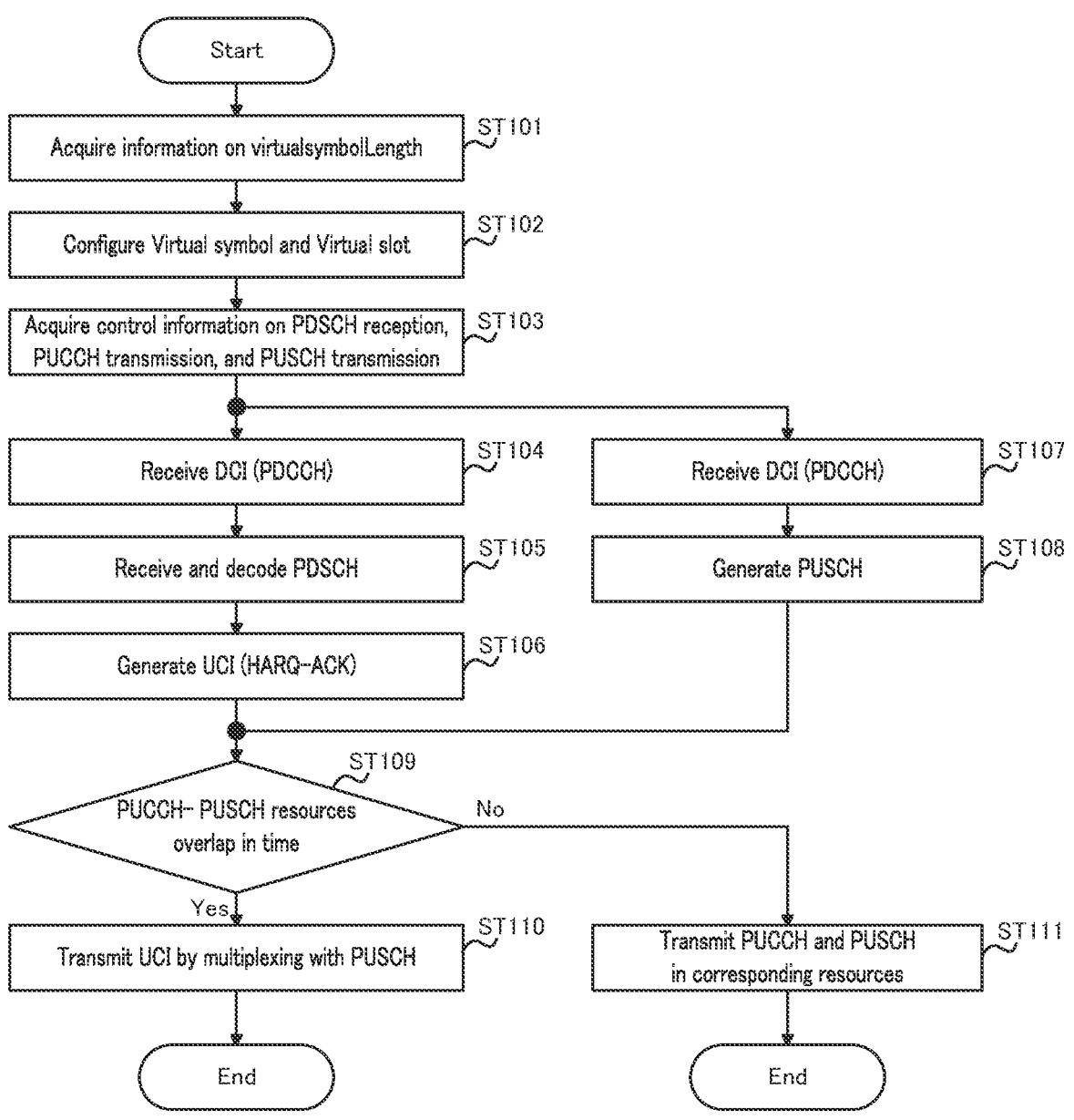
FIG. 29 is a flowchart illustrating an exemplary transmission operation in a terminal.

FIG. 29 is a flowchart illustrating an exemplary operation in transmitting an uplink signal at terminal 200 (e.g., PUCCH transmission and PUSCH transmission) according to the present embodiment.

In FIG. 29, terminal 200 acquires, for example, information on the symbol Repetition (ST101). The information on the symbol-level Repetition may be information on the number of Normal symbols included in one Virtual symbol (e.g., virtualsymbolLength). For example, the processing of ST101 may include the processing described in Option FS-1 of [Exemplary Configuration (Setting) VirtualsymbolLength] mentioned above.

Terminal 200, for example, configures (i.e., set) a Virtual symbol and a Virtual slot (ST102). For example, the processing of ST102 may include the processing described in Option FS-1 of [Configuration Examples of Virtual Symbol and Virtual Slot] mentioned above.

Terminal 200 acquires, for example, control information on PDSCH reception, control information on PUCCH transmission, and control information on PUSCH transmission (ST103).

Terminal 200 receives DCI via PDCCH, for example (ST104 or ST107).

Terminal 200 may receive PDSCH in the downlink resource indicated by DCI and decode the PDSCH, for example (ST105). Further, terminal 200 may generate ACK/NACK based on, for example, a decoding result for PDSCH (ST106).

Alternatively, terminal 200 may generate PUSCH based on, for example, the information on the PUSCH transmission and the uplink resource indicated by DCI (ST108).

For example, the processing of ST104 to ST108 may include the processing described in at least one of the above-mentioned [Resource Allocation], [DMRS Mapping], and [Terminal Processing Time].

For example, when Option FS-2 in [Configuration Examples of Virtual Symbol and Virtual Slot] is applied, in the processing of ST103 or ST104 (or ST107), terminal 200 may configure, after acquiring the resource allocation information related to the time domain resource, a Virtual symbol and a Virtual slot based on the information on virtualsymbolLength, as in ST102.

Terminal 200 determines whether a transmission resource for PUCCH and a transmission resource for PUSCH overlap in time, for example (ST109).

When the transmission resource for PUCCH and the transmission resource for PUSCH overlap in time (ST109: Yes), terminal 200 transmits, to base station 100, UCI by multiplexing with PUSCH (ST110). On the other hand, when the transmission resource for PUCCH and the transmission resource for PUSCH do not overlap in time (ST109: No), terminal 200 transmits PUCCH and PUSCH to base station 100 in the corresponding resource, respectively (ST111).

For example, the processing of ST109 to ST111 may include the processing described in [(Operation Example when PUCCH resource and PUSCH resource overlap in time] described above.

In FIG. 29, although a description as been given of the case not applying the above-mentioned [6. Additional Repetition], it may be applied in the present embodiment.

The operation example of terminal 200 has been described, thus far.

According to the present embodiment, terminal 200 controls multiplexing of UCI with PUSCH in the case where a PUCCH resource and a PUSCH resource overlap in time, based on a communication configuration in a Virtual symbol unit with which a plurality of Normal symbols in at least one of PUCCH and PUSCH is associated in one unit. This control improves the transmission efficiency uplink in radio communication by using Repetition of a plurality of Normal symbols composing a Virtual symbol (i.e., symbol-level Repetition), for example. In one example, this control suppresses deterioration in the coverage performance of PUSCH or the transmission efficiency of PUSCH even when the symbol-level Repetition configured for PUCCH. Further, in the present embodiment, it is possible to appropriately configure a resource amount for UCI transmission in the case of multiplexing UCI with PUSCH to which the symbol-level Repetition is applied.

The embodiment according to an exemplary embodiment of the present disclosure has been described, thus far.

Other Embodiments

In the above-mentioned embodiment, for convenience, the terms such as Virtual symbol and Virtual slot have been used, but another term may be adopted. For example, the Virtual symbol/Virtual slot may be referred to as "Super symbol/Super slot," "hyper symbol/hyper slot," "Coverage Enhancement (CE) symbol/CE slot," "Pseudo symbol/pseudo slot," or "extended symbol/extended slot".

Further, a Normal symbol and a Normal slot may be referred to as, for example, "Non-virtual symbol/Non-Virtual slot," "Non-super symbol/Non-super slot," "Non-hyper symbol/Non-hyper slot," "Non-CE symbol/Non-CE slot," "Non-Pseudo symbol/Non-Pseudo slot," or "Non-extended symbol/Non-extended slot," The Normal symbol and the Normal slot may be referred to simply as "symbol/slot."

Further, in the above embodiment, a description has been given of an operation example when transmission resources respectively for PUCCH and PUSCH resource overlap in time, but a channel/signal with overlapping transmission resources in time is not limited to the combination of PUCCH and PUSCH, and may be a combination of other channels/signals to at least one of which the symbol level Repetition is applied.

Further, in the above-mentioned embodiment, the uplink communication between base station 100 and terminal 200 has been assumed. However, an exemplary embodiment of the present disclosure s not limited to this and may be applied to downlink communication or communication between terminals (e.g., sidelink communication).

Further, the downlink control channel, the downlink data channel, the uplink control channel, and the uplink data channel are not limited to be PDCCH, PDSCH, PUCCH, and PUSCH, respectively, and may be control channels of other names.

Further, in the above-mentioned embodiment, RRC signaling is assumed as higher layer signaling, but it may be replaced with Medium Access Control (MAC) signaling and an indication by DCI that is physical layer signaling.

Further, in the above-mentioned embodiment, the time domain resource unit is not limited to a slot and a symbol, and may be, for example, a time domain resource unit such as a frame, a subframe, a slot, a subslot, or a symbol, and may be another time domain resource unit.

In addition, the parameters applied in the above-mentioned embodiment are merely examples and are not limited to these examples. By way of example, at least one of parameters such as virtualsymbolLength, an offset in units of symbols, a slot offset, a symbol position, and the number of symbols is not limited to the value in the above-mentioned embodiment and may be another value.

Further, in the above-mentioned embodiment, the case of using DMRS has been described, but the reference signal is not limited to DMRS and may be another reference signal.

(Control Signal)

In an exemplary embodiment of the present disclosure, the downlink control signal (or downlink control information) may be, for example, a signal (or information) transmitted at a Physical Downlink Control Channel (PDCCH) in the physical layer, or a signal (or information) transmitted at Medium Access Control (MAC) or Radio Resource Control (RRC) in the higher layer. In addition, the signal (or information) is not limited to a case of being indicated by the downlink control signal and may be previously specified by the specifications (or standards) or may be previously configured in a base station and a terminal.

In an exemplary embodiment of the present disclosure, the uplink control signal (or uplink control information) may be, for example, a signal (or information) transmitted in a PDCCH in the physical layer, or a signal (or information) transmitted in MAC or RRC in the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may be adopted instead of a base station. Further, instead of a base station, a relay apparatus may be adopted for relaying the communication between a higher node and a terminal.

(Uplink/Downlink/Sidelink)

An exemplary embodiment of the present disclosure may be applied to, for example, any of the uplink, downlink, and sidelink. In one example, an exemplary embodiment of the present disclosure may be applied to a Physical Uplink Shared Channel (PUSCH), a Physical Uplink Control Channel (PUCCH), and a Physical Random Access Channel (PRACH) in uplink, a Physical Downlink Shared Channel (PDSCH), a Physical Downlink Control Channel (PDCCH), and a Physical Broadcast Channel (PBCH) in downlink, or a Physical Sidelink Shared Channel (PSSCH), a Physical Sidelink Control Channel (PSCCH), and a Physical Sidelink Broadcast Channel (PSBCH) in sidelink.

The PDCCH, the PDSCH, the PSSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and the PSBCH are examples of a broadcast channel, and the PRACH is an example of a random access channel.

(Data Channel/Control Channel)

An exemplary embodiment of the present disclosure may be applied to, for example, any of a data channel and a control channel. In one example, a channel in an exemplary embodiment of the present disclosure may be replaced with any of a PDSCH, a PUSCH, and a PSSCH for the data channel, or a PDCCH, a PUCCH, a PBCH, a PSCCH, and a PSBCH for the control channel.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of: a Demodulation Reference Signal (DMRS); a Channel State Information-Reference Signal (CSI-RS); a Tracking Reference Signal (TRS); a Phase Tracking Reference Signal (PTRS); a Cell-specific Reference Signal (CRS); or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above and may be other numbers of symbols.

(Frequency Band)

An exemplary embodiment of the present disclosure may be applied to either a licensed hand or an unlicensed band.

(Communication)

An exemplary embodiment of the present disclosure may be applied to any of the communication between a base station and a terminal, the communication between terminals (Sidelink communication, Uu link communication), and the communication for Vehicle to Everything (V2X), In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission latency compared to the symbol length or slot length, such as a network with a large cell size and/or an ultra-wideband transmission network.

(Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 30:
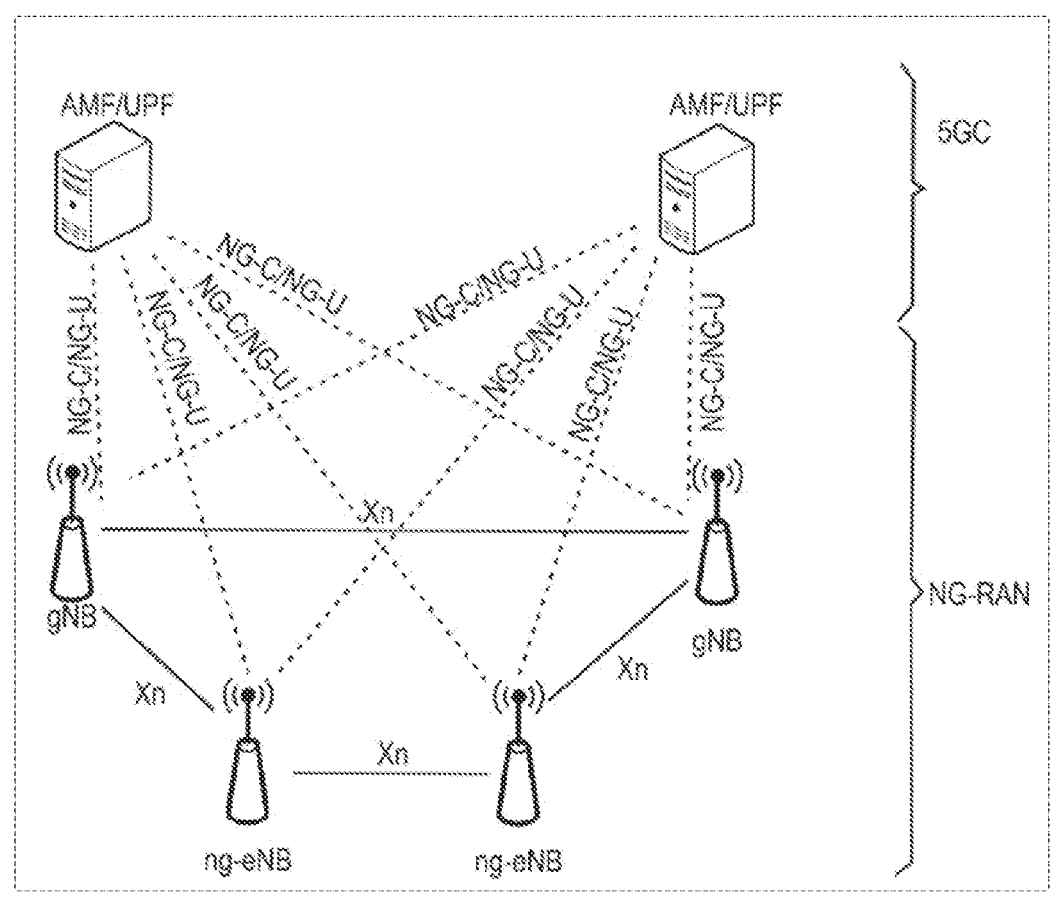
FIG. 30 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 30 (see e.g., 3GPP TS 38.300 v15.6.0, section 4).

The user plane protocol stack for NR (see e.g., 3GPP TS 38.300 section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20) Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing)

and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

in the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 31:
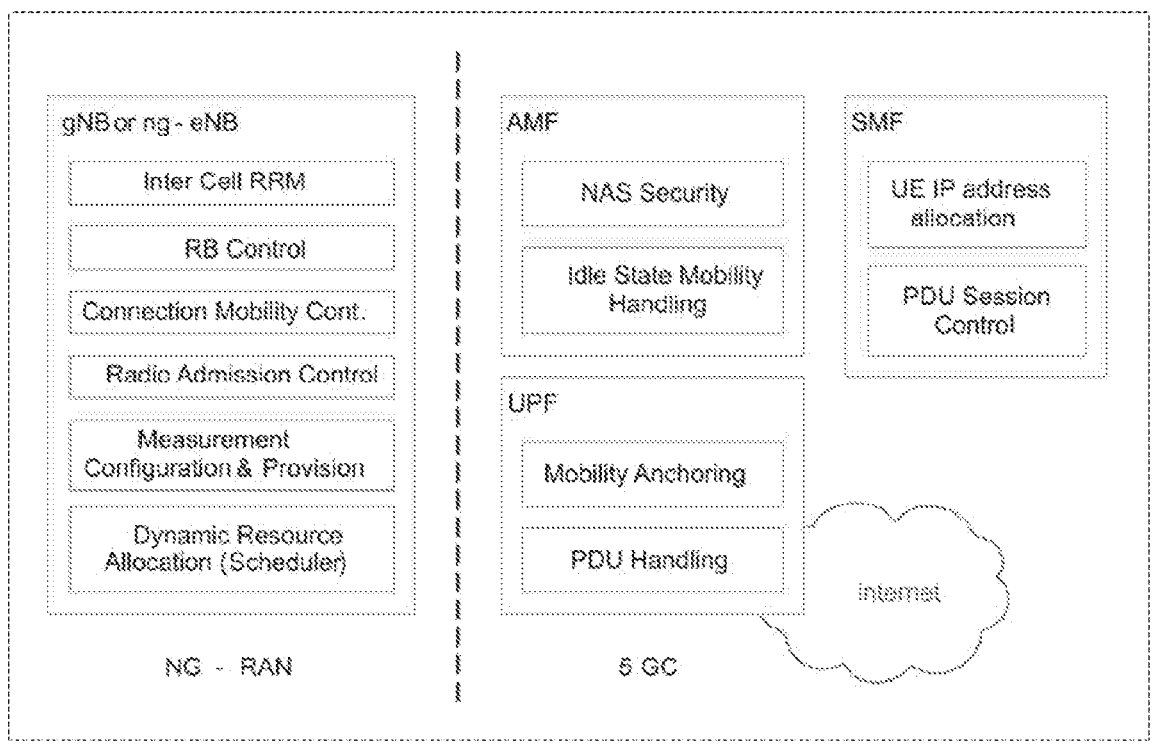
FIG. 31 schematically illustrates a functional split between Next Generation-Radio Access Network (NG-RAN) and 5th Generation Core (5GC)

FIG. 31 illustrates the functional split between the NC-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UP;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane: Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steeling at the User Plane Function (UPF) to route traffic to a proper destination;

Control part of policy enforcement and QoS; and

Downlink data notification.

<RRC Connection Setup and Reconfiguration Procedure>

Figure 32:
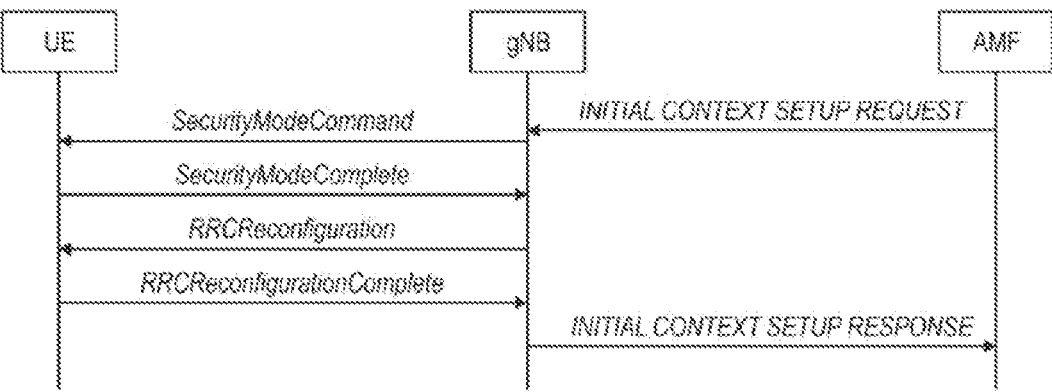
FIG. 32 is a sequence diagram of a Radio Resource Control (RRC) connection setup/reconfiguration procedure.

FIG. 32 illustrates some interactions between a UE, gNB, and AMF (a 5GC Entity) performed in the context of a transition of the UE from RRC_IDLE tip RRC_CONNECTED for the NAS part (see TS 38 300 v 1.5.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand and message and by the UE responding to the gNB with the SecurityModeComplete message. Afterwards, the gNB performs the reconfiguration to setup the Signaling Radio Bearer 2. (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio hearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 33:
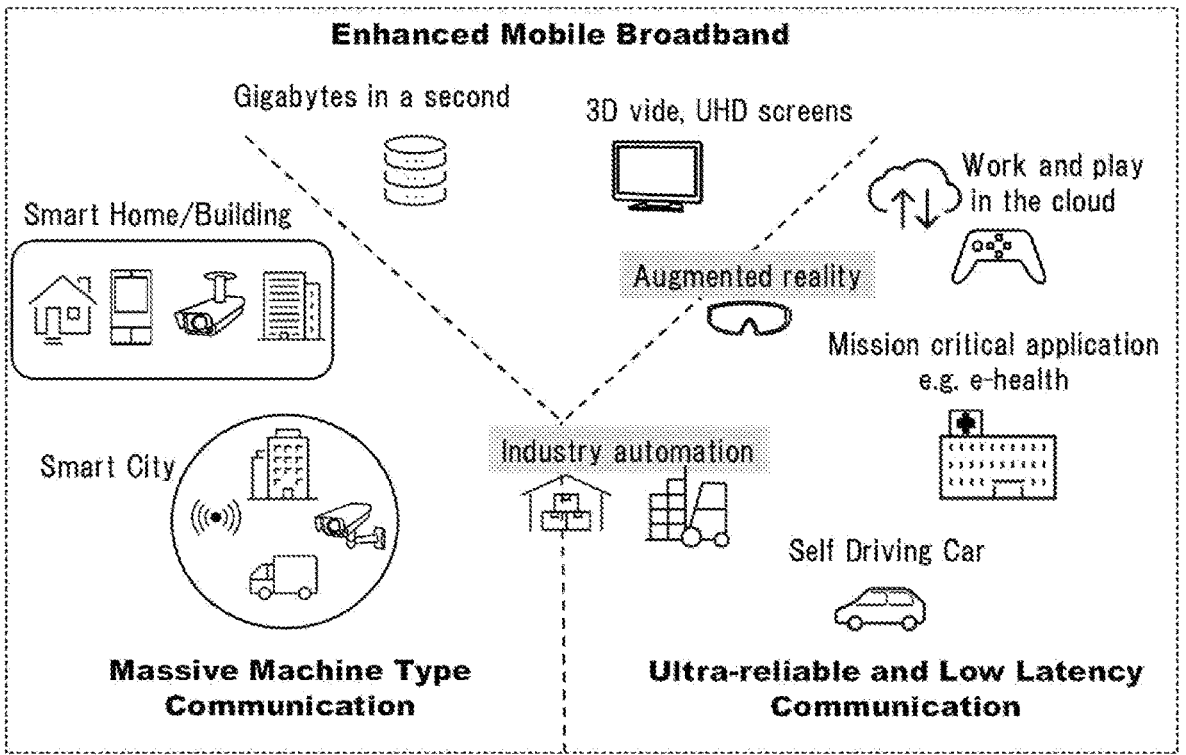
FIG. 33 schematically illustrates usage scenarios of enhanced Mobile BroadBand (eMBB), massive Machine Type Communications (mMTC), and Ultra Reliable and Low Latency Communications (URLLC)

FIG. 33 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 33 illustrates some examples of envisioned usage scenarios for IMT for 2020 and beyond (see ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet of 32 bytes with a user plane latency of 1 ms.

From the physical layer perspective, reliability an be unproved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), c-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 32. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 34:
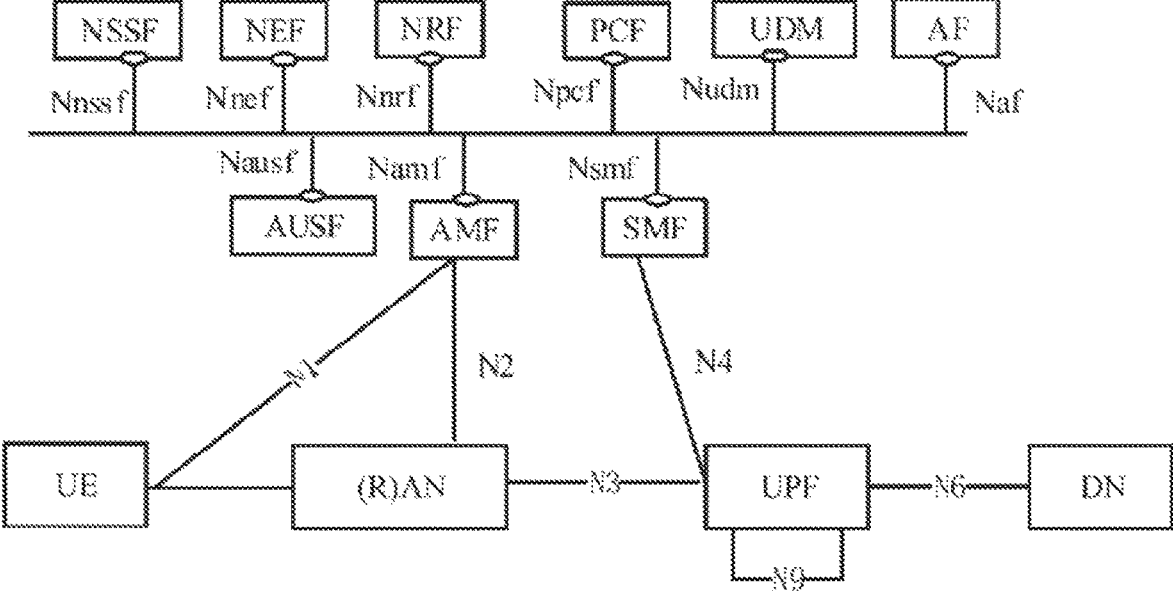
FIG. 34 is a block diagram illustrating an exemplary 5G system architecture for a non-roaming scenario.

FIG. 34 illustrates a 5G NR non-roaming reference architecture (see TS 23.501) v16.1.0, section 4.23). An Application Function (AF) (e.g., an external application server hosting 5G services, exemplarily described in FIG. 33) interacts with the 3GPP Core Network in order to provide services, for example to support application influencing on traffic routing, accessing Network Exposure Function (NEF) or interacting with the policy framework for policy, control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant. Network Functions.

FIG. 34 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement and control circuitry, which, in operation performs the services Lasing the established PDU session.

The present disclosure can be realized by software, hardware, or software in cooperation with hardware. Each functional block used in the description of each embodiment described above can be partly or entirely realized by an LSI such as an integrated circuit and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the fixture integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure; facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, determines via which of a first channel or a second channel uplink control information is transmitted, based on a unit of a certain symbol associated with a plurality of first symbols in at least one of the first channel and/or the second channel in uplink as a single unit, the certain symbol being referred to as a second symbol: and transmission circuitry, which, in operation, performs transmission of the uplink control information using the determined channel.

In an exemplary embodiment of the present disclosure, the control circuitry determines to multiplex the uplink control information with the second channel in a case where time resources overlap between the first channel and the second channel.

In an exemplary embodiment of the present disclosure, the unit of the second symbol corresponds to a repetition unit.

In an exemplary embodiment of the present disclosure, the control circuitry configures a resource amount to be allocated to the uplink control information in the second channel, based on the number of the plurality of first symbols in the first channel.

In an exemplary embodiment of the present disclosure, the control circuitry configures a resource amount to be allocated to the uplink control information in the second channel, based on the number of the plurality of first symbols in the second channel.

In an exemplary embodiment of the present disclosure, the control circuitry configures a resource amount to be allocated to the uplink control information in the second channel, based on a greater one of the number of the plurality of first symbols in the first channel and the number of the plurality of first symbols in the second channel.

In an exemplary embodiment of the present disclosure, the control circuitry determines whether to multiplex the uplink control information with the second channel, based on a relation between the number of the plurality of first symbols in the first channel and the number of the plurality of first symbols in the second channel.

In an exemplary embodiment of the present disclosure, the first channel is an uplink control channel, and the second channel is an uplink data channel.

A base station according to an exemplary embodiment of the present disclosure includes: control circuitry, which, in operation, determines via which of a first channel or a second channel uplink control information is received, based on a unit of a certain symbol associated with a plurality of first symbols in at least one of the first channel and/or the second channel in uplink as a single unit, the certain symbol being referred to as a second symbol; and reception circuitry, which, in operation, performs reception of the uplink control information using the determined channel.

A communication method according to an exemplary embodiment of the present disclosure includes: determining, by a terminal, via which of a first channel or a second channel uplink control information is transmitted, based on a unit of a certain symbol associated with a plurality of first symbols in at least one of the first channel and/or the second channel in uplink as a single unit, the certain symbol being referred to as a second symbol; and performing, by the terminal, transmission of the uplink control information using the determined channel.

A communication method according to an exemplary embodiment of the present disclosure includes: determining, by a base station, via which of a first channel or a second channel uplink control information is received, based on a unit of a certain symbol associated with a plurality of first symbols in at least one of the first channel and/or the second channel in uplink as a single unit, the certain symbol being referred to as a second symbol; and performing, by the base station, reception of the uplink control information using the determined channel.

The disclosure of Japanese Patent Application No. 2020-171394, filed on Oct. 9, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:
control circuitry, which, in operation, determines whether to transmit uplink control information via an uplink control channel or an uplink data channel based on a unit of a second symbol associated with a plurality of first symbols in at least one of the uplink control channel and the uplink data channel as a single unit; and transmission circuitry, which, in operation, performs transmission of the uplink control information using the determined channel, wherein, the control circuitry, in operation, determines to multiplex the uplink control information with the uplink data channel in a case where time resources overlap between the uplink control channel and the uplink data channel, and the control circuitry, in operation, configures a resource amount to be allocated to the uplink control information in the uplink data channel based on the number of the plurality of first symbols included in the at least one of the uplink control channel and the uplink data channel.

2. The terminal according to claim 1, wherein the control circuitry determines whether to multiplex the uplink control information with the uplink data channel, based on a relation between the number of the plurality of first symbols in the uplink control channel and the number of the plurality of first symbols in the uplink data channel.

3. The terminal according to claim 1, wherein the unit of the second symbol corresponds to a repetition unit.

4. The terminal according to claim 1, wherein the control circuitry configures a resource amount to be allocated to the uplink control information in the uplink data channel, based on the number of the plurality of first symbols in the uplink control channel.

5. The terminal according to claim 1, wherein the control circuitry configures a resource amount to be allocated to the uplink control information in the uplink data channel, based on the number of the plurality of first symbols in the uplink data channel.

6. The terminal according to claim 1, wherein the control circuitry configures a resource amount to be allocated to the uplink control information in the uplink data channel, based on a greater one of the number of the plurality of first symbols in the uplink control channel and the number of the plurality of first symbols in the uplink data channel.

7. A communication method, comprising:
determining, by a base station, whether uplink control information is received via an uplink control channel or an uplink data channel based on a unit of a second symbol associated with a plurality of first symbols in at least one of the uplink control channel and the uplink data channel as a single unit, the certain symbol being referred to as a second symbol; and
performing, by the base station, reception of the uplink control information using the determined channel,
multiplexing the uplink control information with the uplink data channel is determined in a case where time resources overlap between the uplink control channel and the uplink data channel, and
a resource amount to be allocated to the uplink control information is configured in the uplink data channel based on the number of the plurality of first symbols included in the at least one of the uplink control channel and the uplink data channel.

8. A communication method, comprising:
determining, by a terminal, whether to transmit uplink control information via an uplink control channel or an uplink data channel based on a unit of a second symbol associated with a plurality of first symbols in at least one of the uplink control channel and the uplink data channel as a single unit; and performing, by the terminal, transmission of the uplink control information using the determined channel, wherein multiplexing the uplink control information with the uplink data channel is determined in a case where time resources overlap between the uplink control channel and the uplink data channel, and a resource amount to be allocated to the uplink control information in the uplink data channel is configured based on the number of the plurality of first symbols included in the at least one of the uplink control channel and the uplink data channel.

9. A base station, comprising:

control circuitry, which, in operation, determines whether uplink control information is received via an uplink control channel or an uplink data channel, based on a unit of a second symbol associated with a plurality of first symbols in at least one of the uplink control channel and the uplink data channel as a single unit; and reception circuitry, which, in operation, performs reception of the uplink control information using the determined channel, wherein, the control circuitry determines the uplink control information is multiplexed with the uplink data channel in a case where time resources overlap between the uplink control channel and the uplink data channel, and the control circuitry configures a resource amount to be allocated to the uplink control information in the uplink data channel, based on the number of the plurality of first symbols included in the at least one of the uplink control channel and the uplink data channel.

\* \* \* \* \*